(12) United States Patent
Anderson et al.

(10) Patent No.: US 8,483,018 B2
(45) Date of Patent: Jul. 9, 2013

(54) BRAILLE WATCH

(76) Inventors: Nicholas Leon Anderson, Eau Claire, WI (US); John P Puccinelli, Cottage Grove, WI (US); Chandresh Singh, Brookfield, WI (US); Kyle St. John Jamar, Hibbing, MN (US); Taylor Ann Milne, Mundelein, IL (US)

( * ) Notice: Subject to any disclaimer, the term of this patent is extended or adjusted under 35 U.S.C. 154(b) by 18 days.

(21) Appl. No.: 13/314,835

(22) Filed: Dec. 8, 2011

(65) Prior Publication Data
US 2013/0149674 A1 Jun. 13, 2013

(51) Int. Cl.
*G04B 19/06* (2006.01)
(52) U.S. Cl.
USPC ........................................... 368/230
(58) Field of Classification Search
USPC ................. 368/230, 76–77, 223; 968/245
See application file for complete search history.

(56) References Cited

U.S. PATENT DOCUMENTS

| | | | | |
|---|---|---|---|---|
| 2,091,146 A | * | 8/1937 | Hamilton | 368/230 |
| 2,915,874 A | * | 12/1959 | Ferguson, Jr. | 368/230 |
| 7,079,454 B2 | * | 7/2006 | Wellen | 368/230 |

OTHER PUBLICATIONS

Anderson et al., Digital Braille Watch, Dec. 7, 2010, University of Wisconsin—Madison: Biomedical Engineering.
Jamar et al., Digital Braille Watch, May 4, 2011, University of Wisconsin Madison: Department of Biomedical Engineering.

* cited by examiner

*Primary Examiner* — Edwin A. Leon
(74) *Attorney, Agent, or Firm* — Bell & Manning, LLC

(57) ABSTRACT

A Braille watch is provided that includes a first disk including a first raised surface, a first pin, a second pin, a third pin, and a fourth pin, a top plate, and an actuator to rotate the first disk. The top plate includes a first hole, a second hole, a third hole, and a fourth hole, wherein the first pin is mounted to slide within the first hole, the second pin is mounted to slide within the second hole, the third pin is mounted to slide within the third hole, and the fourth pin is mounted to slide within the fourth hole. The first pin, the second pin, the third pin, and the fourth pin are mounted above the first disk to extend above a top surface of the top plate when the first raised surface is positioned below the respective pin.

20 Claims, 63 Drawing Sheets

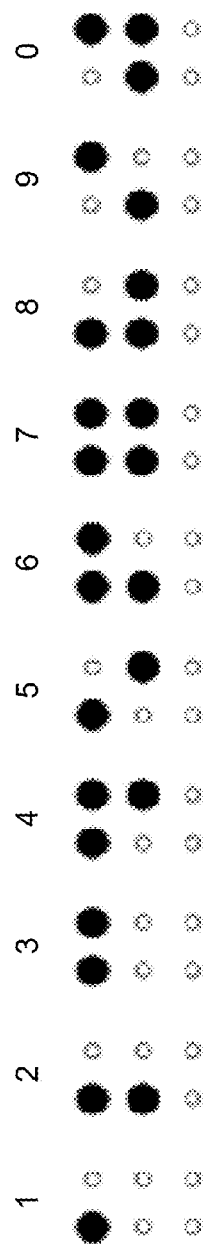
Fig. 2
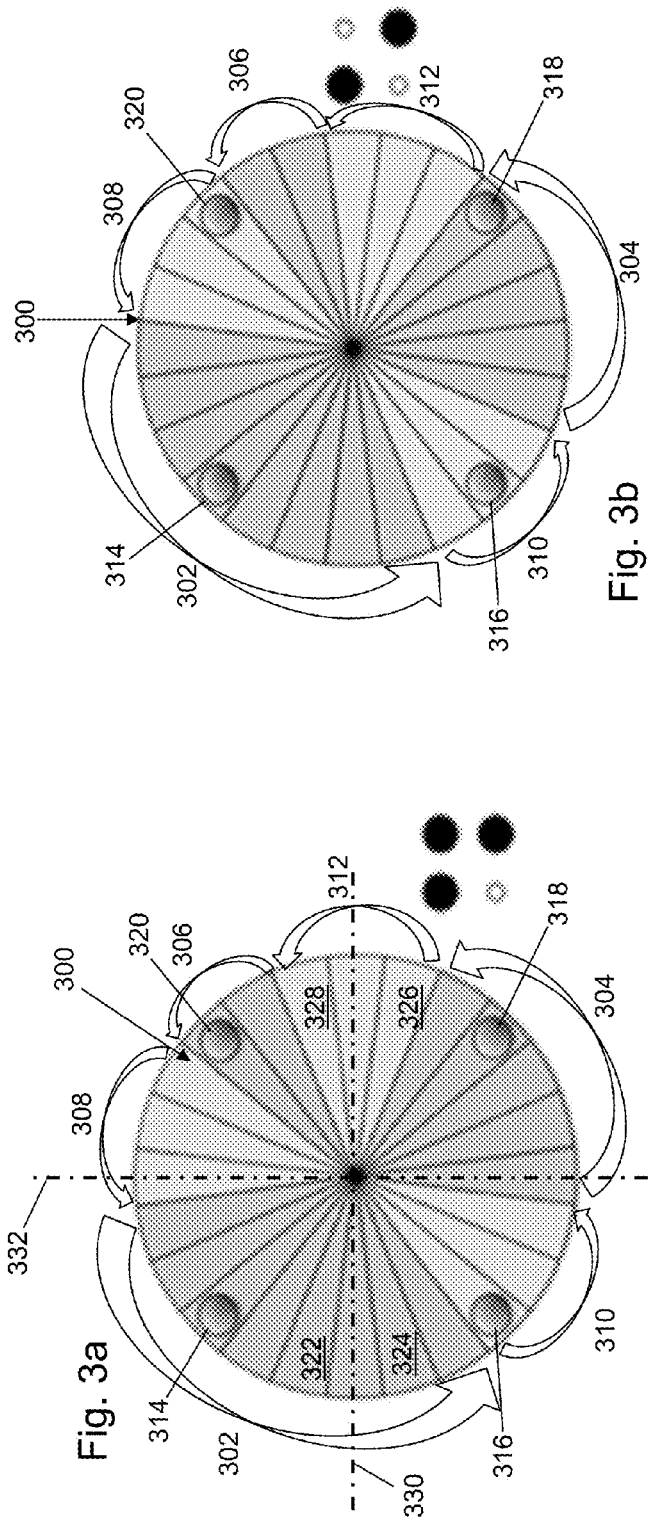

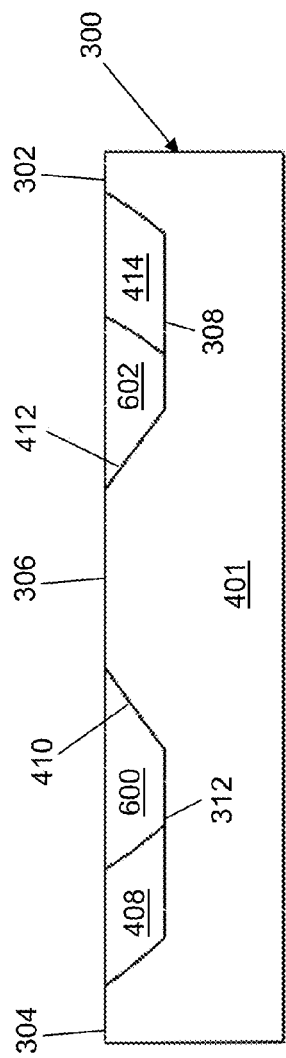
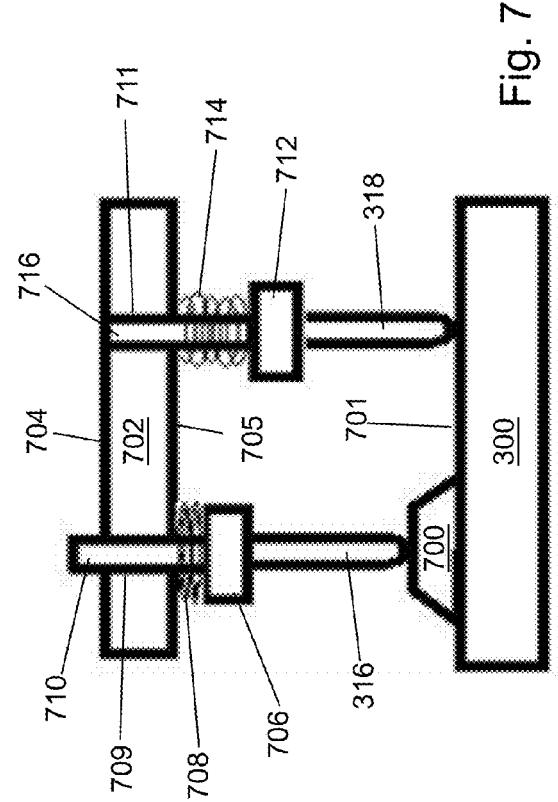

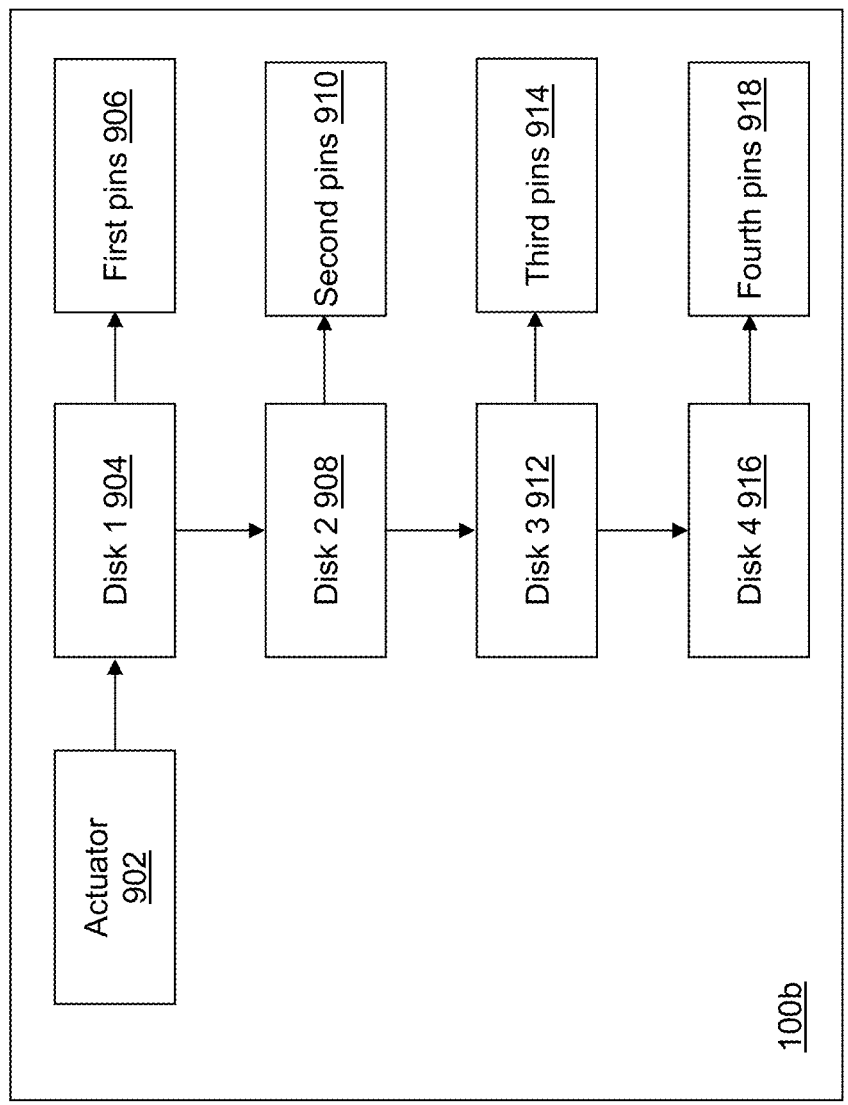

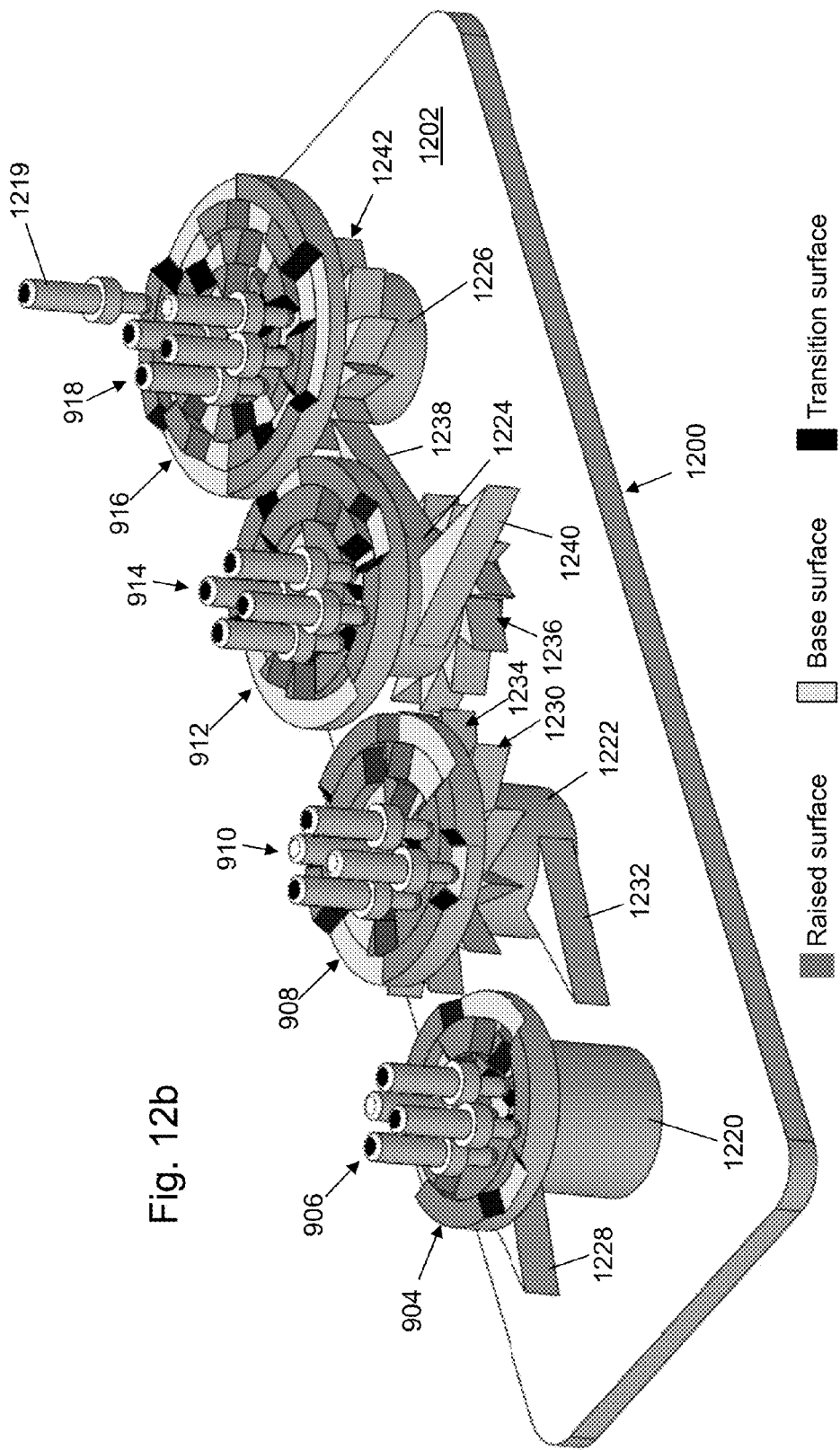

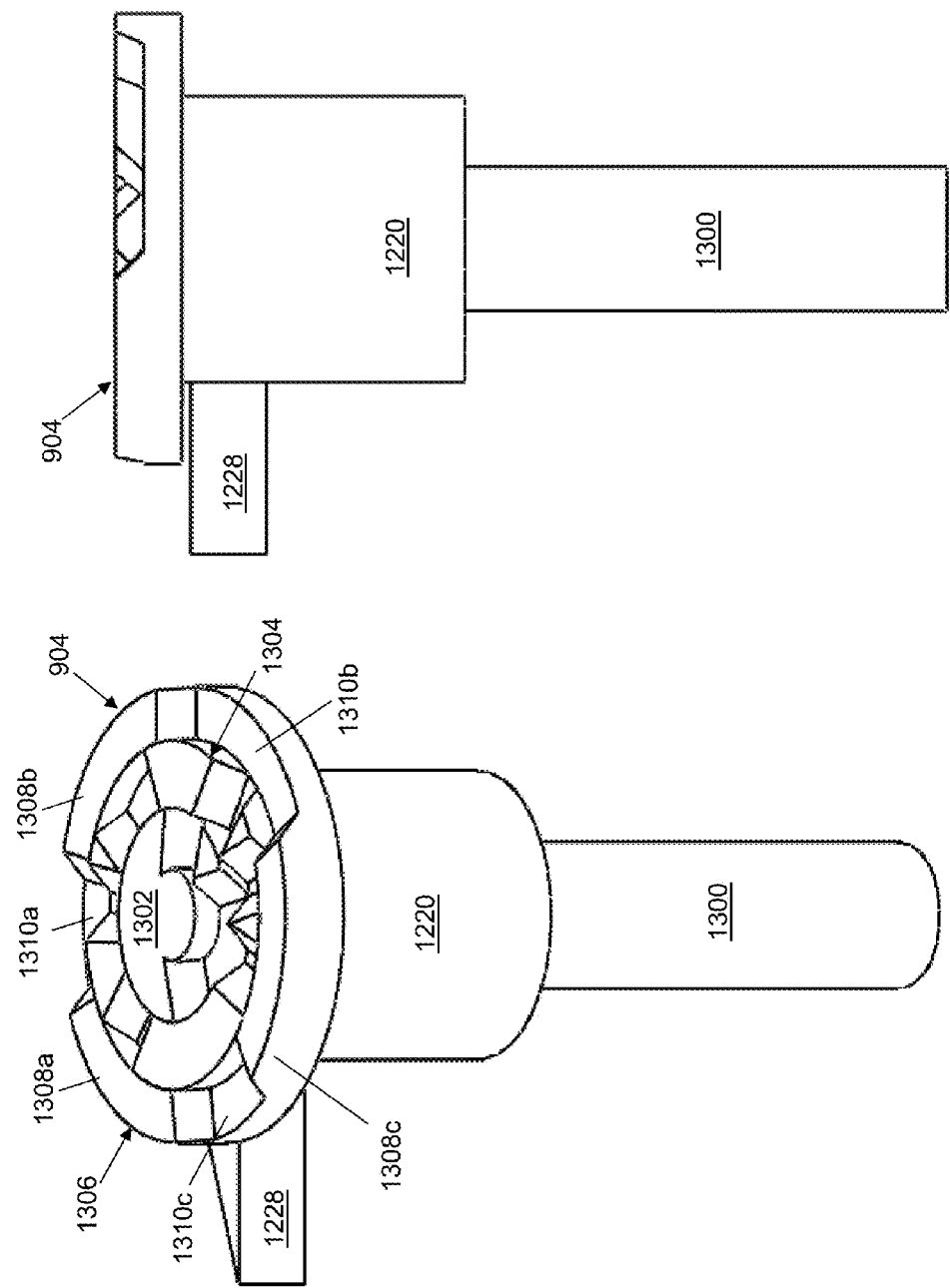

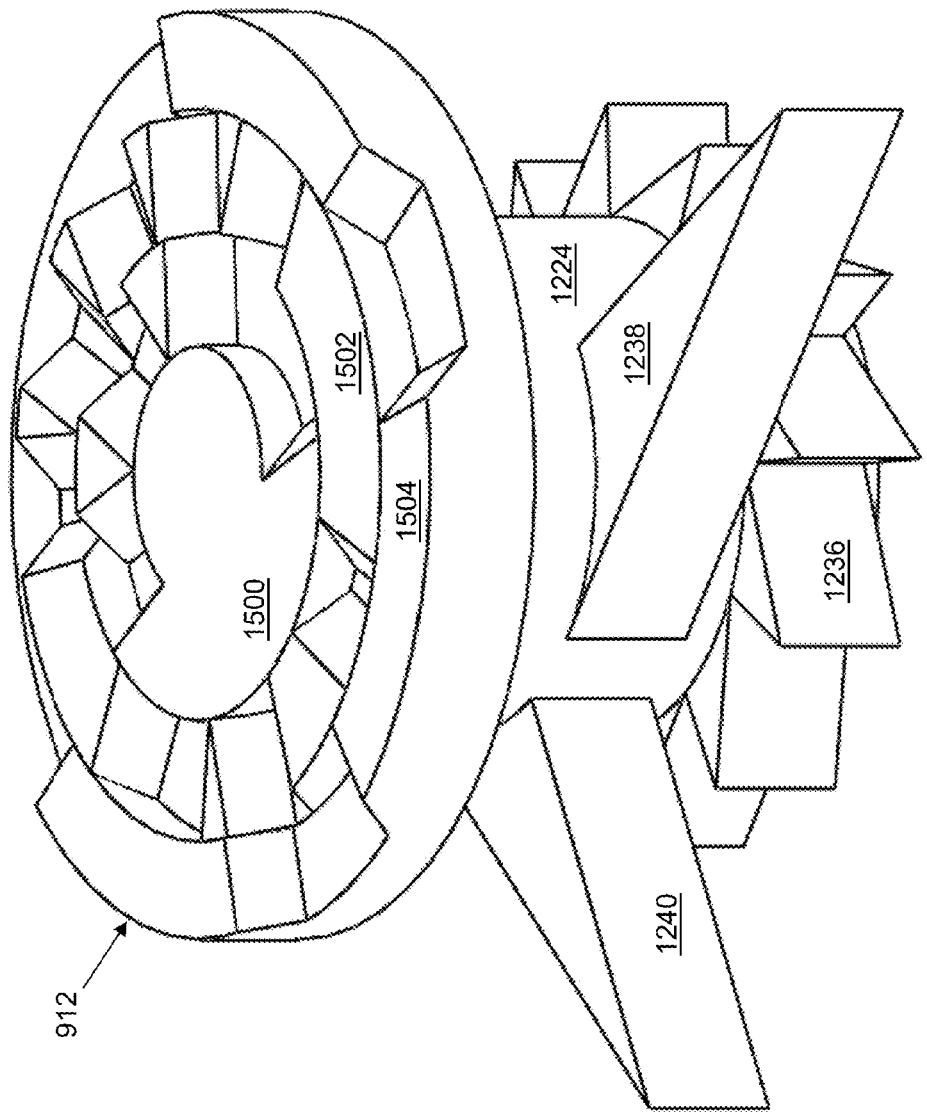

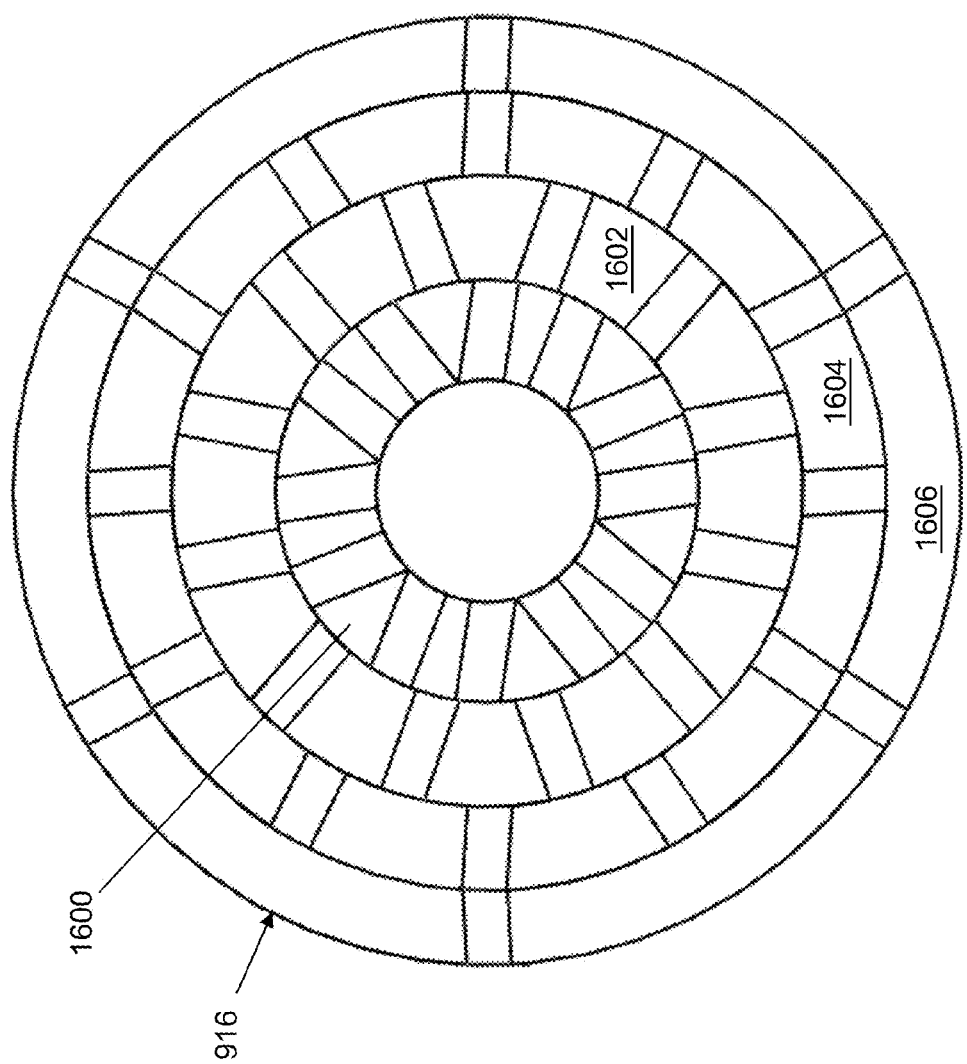

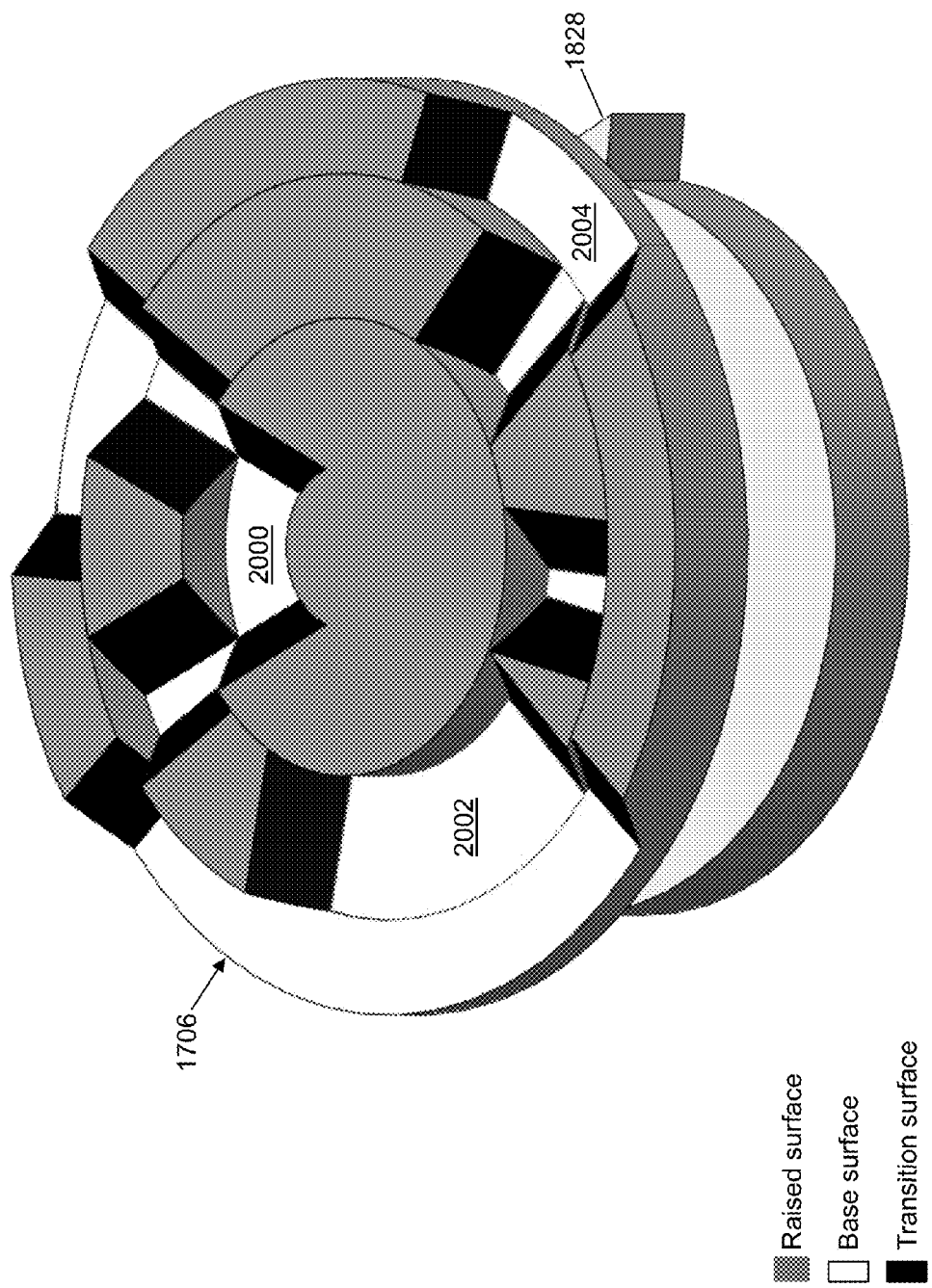

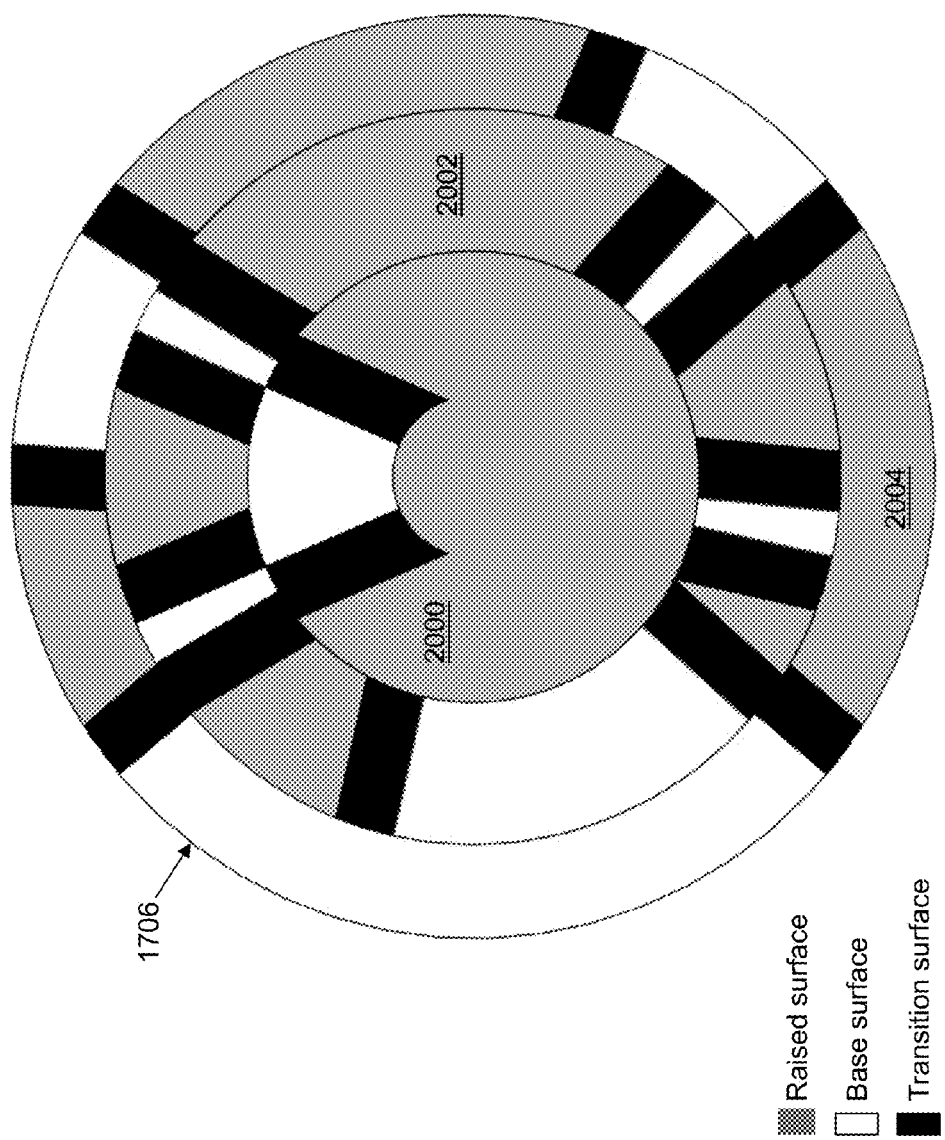

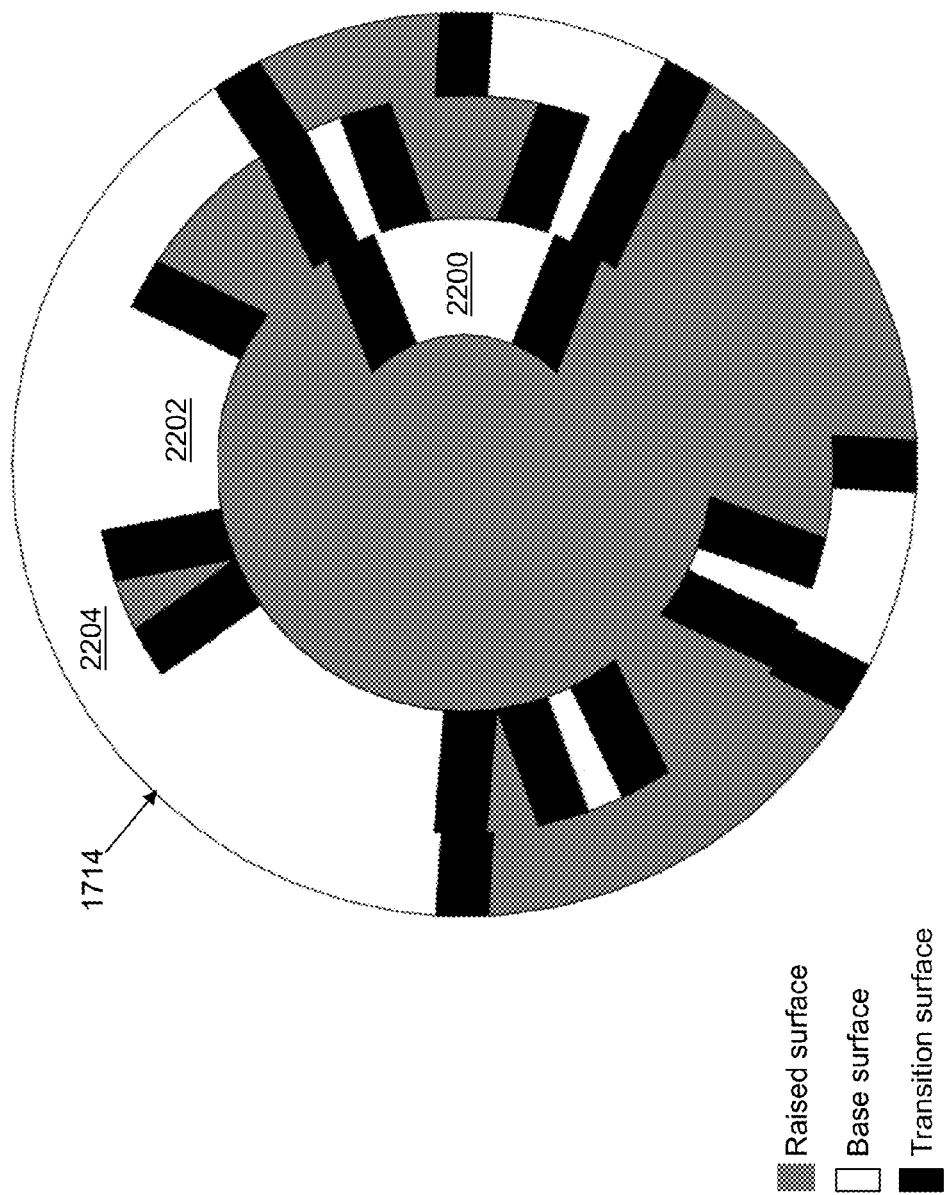

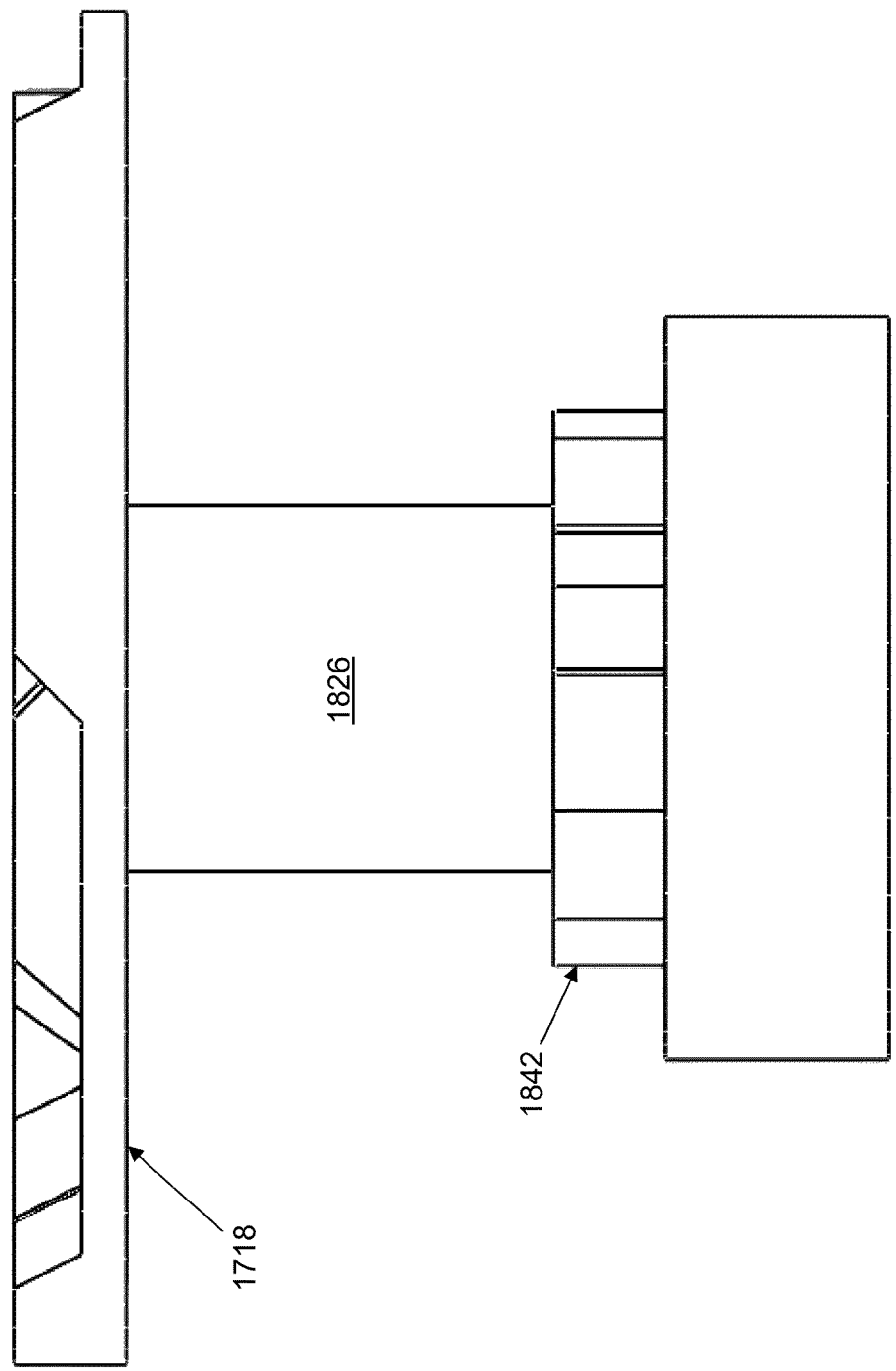

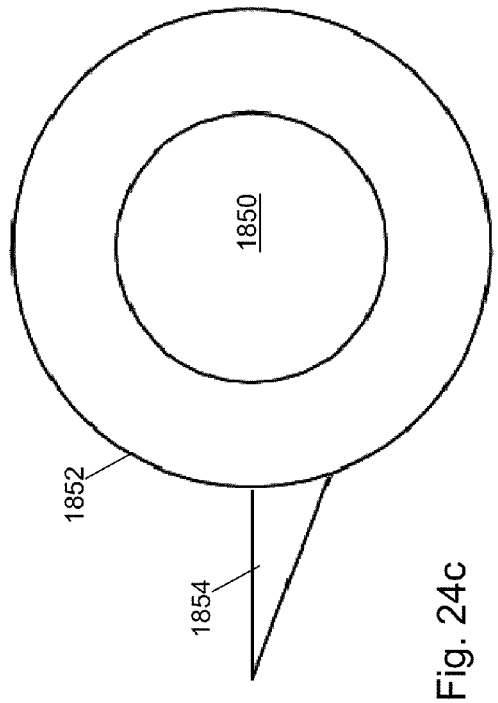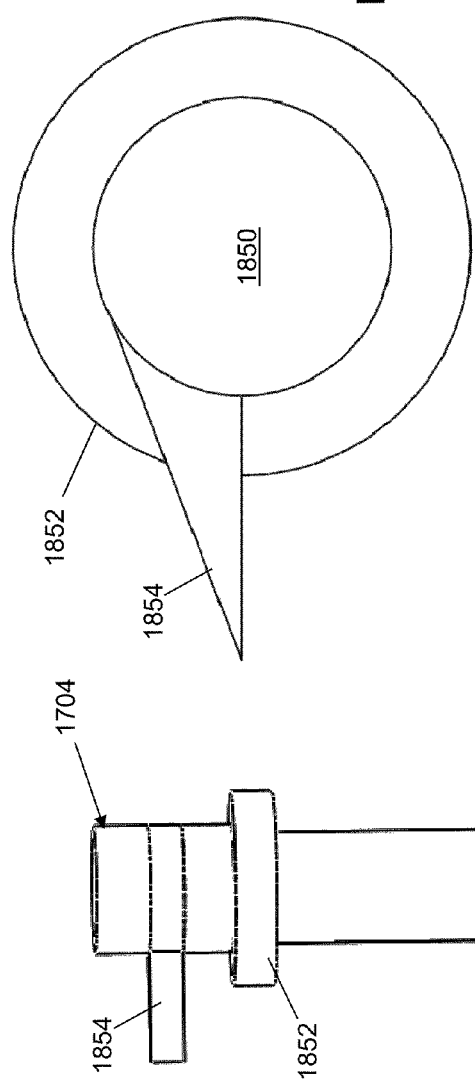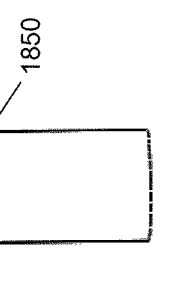

BRAILLE WATCH

BACKGROUND

The Braille language is the universally accepted form of written communication for the visually impaired. It utilizes a system of dots arrayed in a three row by two column grid. Raised dots are located in any combination of the six positions in the grid, to display different letters, numbers, and symbols based on the configuration of the raised dots. Worldwide, the Braille system provides millions of visually impaired individuals with a method for reading and writing.

For this method of communication to be accurate and precise, universal specifications have been developed. Each dot has a base diameter of 1.44 millimeters (0.057 in.) while being 0.48 millimeters (0.019 in.) in height. Within each individual grid, the dots are 2.34 millimeters (0.092 in.) apart, measured center-to-center, and each individual character is of 6.22 millimeters (0.245 in.) away from the neighboring character.

The distance between two Braille pins is at least 2.34 millimeters apart because this is the minimal distance required to distinguish between two points with the fingertip. This minimal distance is determined by mechanoreceptors located on the skin, which are activated by the slightest deformation of the skin due to contact. To discriminate between two points, there must be a deactivated receptor located between two activated receptors. Without the presence of a deactivated receptor, the brain would perceive the contact of the two points as one stimulus.

No device yet exists that allows the visually impaired to read the time in Braille. To tell time, the visually impaired currently rely on either talking or tactile watches. Talking watches function by verbally relaying the time to the user whenever the user presses a button. This method is effective in communicating the time; however, it can be disruptive to others and draws attention to the user. Tactile watches, on the other hand, are silent. They function much like traditional analog watches, except the user touches the face of the watch to feel where the hands are located. There are also raised markings on the tactile watch that indicate the positions of the numbers; however, there is no standard format for these markings and they vary from product to product. Tactile watches can be difficult to read. Also, the hands of tactile watches are exposed while the user is telling the time, and therefore they can be easily broken or damaged. Thus, talking watches are disruptive, while tactile watches are difficult to read and fragile.

SUMMARY

In an example embodiment, a Braille watch is provided. The Braille watch includes a first disk, a first plurality of pins, a top plate, and an actuator. The first disk includes a first raised surface. The first plurality of pins includes a first pin, a second pin, a third pin, and a fourth pin. The top plate includes a first hole, a second hole, a third hole, and a fourth hole, wherein the first pin is mounted to slide within the first hole, the second pin is mounted to slide within the second hole, the third pin is mounted to slide within the third hole, and the fourth pin is mounted to slide within the fourth hole. The first pin is mounted above the first disk to extend above a top surface of the top plate when a portion of the first raised surface is positioned below the first pin. The second pin is mounted above the first disk to extend above the top surface of the top plate when a second portion of the first raised surface is positioned below the second pin. The third pin is mounted above the first disk to extend above the top surface of the top plate when a third portion of the first raised surface is positioned below the third pin. The fourth pin is mounted above the first disk to extend above the top surface of the top plate when a fourth portion of the first raised surface is positioned below the fourth pin. The actuator is mounted to rotate the first disk to form a Braille number with one or more of the first plurality of pins.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 2 depicts the Braille symbols for the numbers 0-9.

FIGS. 3a and 3b depict disk and pin configurations to form the numbers 4 and 5, respectively, using Braille symbols in accordance with the first illustrative embodiment.

FIG. 6 is a side view of the disk of FIG. 4 in accordance with the first illustrative embodiment.

FIG. 7 is a side view of a disk and pin assembly showing a first pin in a raised position and a second pin in a lowered position in accordance with an illustrative embodiment.

FIG. 9 depicts a block diagram of a Braille watch in accordance with a second illustrative embodiment.

FIGS. 12a, 12b, 12c, and 12d show a front perspective view, a top back perspective view, a top view, and a front side view, respectively, of four disk and pin assemblies arranged to indicate the Braille number "0754" and "PM" in accordance with the second illustrative embodiment.

FIGS. 13a, 13b, 13c, and 13d show a perspective view, a side view, a top view, and a bottom view, respectively, of a first disk of the four disk and pin assemblies of FIG. 9 in accordance with the second illustrative embodiment.

FIGS. 15a, 15b, 15c, and 15d show a perspective view, a side view, a top view, and a bottom view, respectively, of a third disk of the four disk and pin assemblies of FIG. 9 in accordance with the second illustrative embodiment.

FIGS. 16a, 16b, 16c, and 16d show a perspective view, a side view, a top view, and a bottom view, respectively, of a fourth disk of the four disk and pin assemblies of FIG. 9 in accordance with the second illustrative embodiment.

FIGS. 20a, 20b, 20c, and 20d show a perspective view, a side view, a top view, and a bottom view, respectively, of a first disk of the four disk and pin assemblies of FIG. 17 in accordance with the third illustrative embodiment.

FIGS. 22a, 22b, 22c, and 22d show a perspective view, a side view, a top view, and a bottom view, respectively, of a third disk of the four disk and pin assemblies of FIG. 17 in accordance with the third illustrative embodiment.

FIGS. 23a, 23b, 23c, and 23d show a perspective view, a side view, a top view, and a bottom view, respectively, of a fourth disk of the four disk and pin assemblies of FIG. 17 in accordance with the third illustrative embodiment.

FIGS. 24a, 24b, and 24c show a side view, a top view, and a bottom view, respectively, of a drive gear of the four disk and pin assemblies of FIG. 17 in accordance with the third illustrative embodiment.

DETAILED DESCRIPTION

Figure 1:
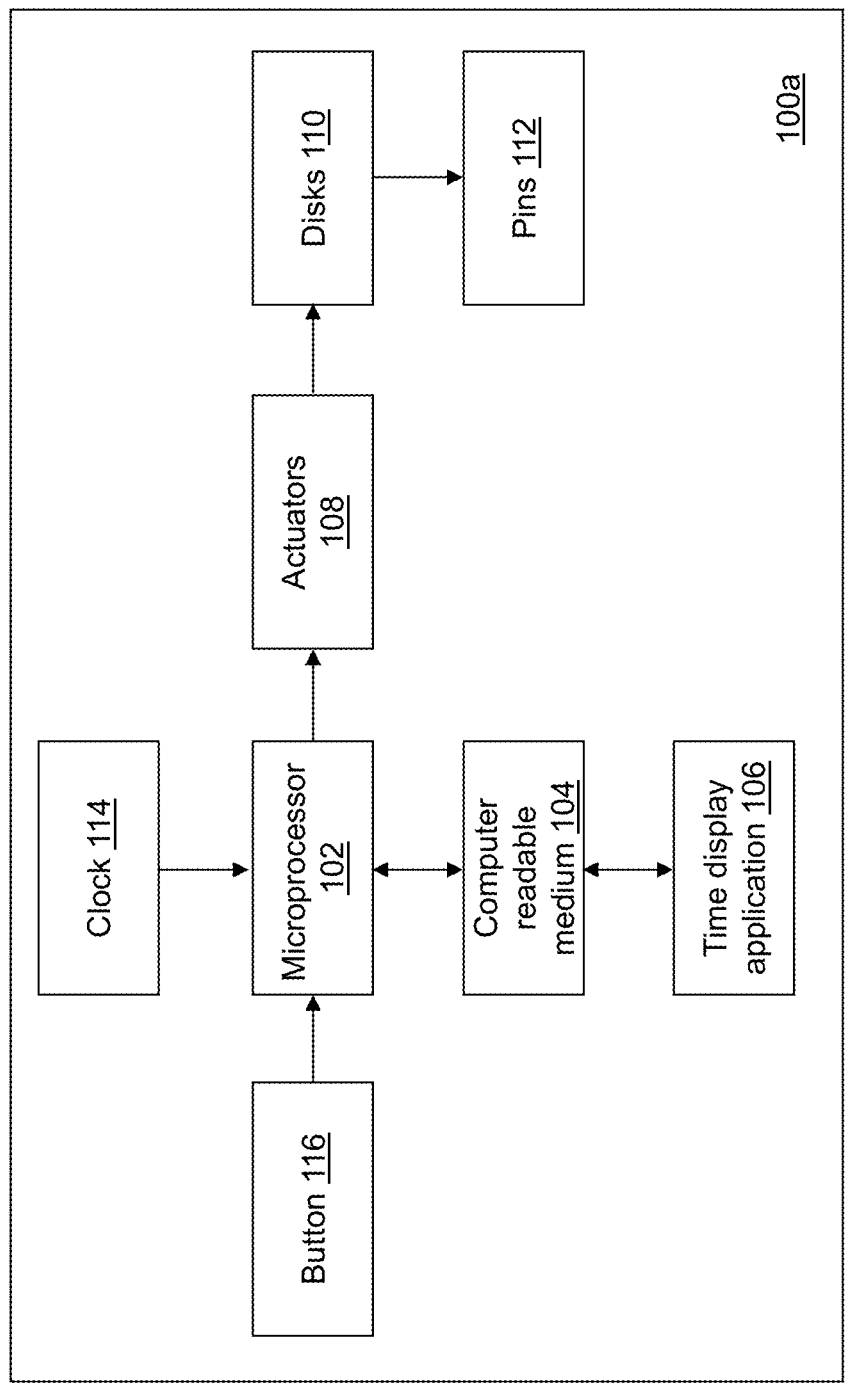
FIG. 1 depicts a block diagram of a Braille watch in accordance with a first illustrative embodiment.

With reference to FIG. 1, a block diagram of a Braille watch 100a is shown in accordance with a first illustrative embodiment. In the first illustrative embodiment, Braille watch 100a may include a microprocessor 102, a computer-readable medium 104, a time display application 106, a plurality of actuators 108, a plurality of disks 110, a plurality of pins 112, a clock 114, and one or more buttons 116. Different and additional or fewer components may be incorporated into Braille watch 100a. For example, Braille watch 100a also includes a power source (not shown) to power the electrical components of Braille watch 100a. Microprocessor 102, computer-readable medium 104, the plurality of actuators 108, clock 114, and/or the one or more buttons 116 may be integrated to form one or more integrated circuits that may be mounted on one or more circuit boards. The mechanical components of Braille watch 100a may be formed of a variety of materials including metal, plastic, wood, etc.

As used in this disclosure, the term "mount" includes join, unite, connect, couple, associate, insert, hang, hold, affix, attach, fasten, bind, paste, secure, bolt, screw, rivet, solder, weld, glue, abut, and other like terms. The phrases "mounted on" and "mounted to" include any interior or exterior portion of the element referenced. These phrases also encompass direct mounting (in which the referenced elements are in direct contact) and indirect mounting (in which the referenced elements are not in direct contact and are mounted together via intermediate elements).

Microprocessor 102 executes instructions as known to those skilled in the art. The instructions may be carried out by a special purpose computer, logic circuits, or hardware circuits. Thus, microprocessor 102 may be implemented in hardware, firmware, or any combination of these methods and/or in combination with software. The term "execution" is the process of running an application or the carrying out of the operation called for by an instruction. The instructions may be written using one or more programming language, scripting language, assembly language, etc. Microprocessor 102 executes an instruction, meaning that it performs/controls the operations called for by that instruction. Microprocessor 102 operably couples with computer-readable medium 104, the plurality of actuators 108, clock 114, and the one or more buttons 116 to receive, to send, and to process information. Microprocessor 102 may retrieve a set of instructions from a permanent memory device and copy the instructions in an executable form to a temporary memory device that is generally some form of random access memory (RAM). Braille watch 100a may include a plurality of microprocessors that use the same or a different processing technology.

Computer-readable medium 104 is an electronic holding place or storage for information so that the information can be accessed by microprocessor 102 as known to those skilled in the art. Computer-readable medium 104 can include, but is not limited to, any type of RAM, any type of read only memory (ROM), any type of flash memory, etc. such as magnetic storage devices, optical disks, smart cards, flash memory devices, etc. Braille watch 100a may have one or more computer-readable media that use the same or a different memory media technology. Merely for illustration, an ATMega328 microcontroller manufactured by Atmel Corporation may be used to provide microprocessor 102 and computer-readable medium 104.

Time display application 106 performs operations associated with setting the date and/or time, determining the date and/or time, and/or determining an amount of rotation of the plurality of disks 110. The time displayed may be based on either a 12 or a 24 hour clock. Some or all of the operations described herein may be embodied in time display application 106. The operations may be implemented using hardware, firmware, software, or any combination of these methods. With reference to the example embodiment of FIG. 1, time display application 106 is implemented in software (comprised of computer-readable and/or computer-executable instructions) stored in computer-readable medium 104 and accessible by microprocessor 102 for execution of the instructions that embody the operations of time display application 106. Time display application 106 may be written using one or more programming languages, assembly languages, scripting languages, etc.

The plurality of actuators 108 control movement of the plurality of disks 110. In the first illustrative embodiment, an actuator is mounted to control movement of a single disk. Thus, there are the same number of actuators and disks. Illustrative actuators include an electric motor, a servo, stepper, or piezo motor, a pneumatic actuator, a gas motor, etc. In the first illustrative embodiment, the actuator provides at least 165 degrees of rotation of each disk. Merely for illustration, an HS-55 sub-micro servo motor manufactured by Hitec RCD USA, Inc. may be used. The HS-55 sub-micro servo motor provides up to 180 degrees of rotation using pulse-width modulation.

In an illustrative embodiment, the plurality of pins 112 include four pins associated with each disk of the plurality of disks 110. The four pins are mounted to form the two by two dot grid needed to represent the numbers 0-9 in the Braille language as shown with reference to FIG. 2. A disk may be associated with each number displayed using Braille watch 100a. In another illustrative embodiment, a disk may be associated with more than one Braille number and a disk may be associated with one or more pins used to form a Braille number. For example, to represent the time in hours and minutes, four disks may be used, two to display the hours from 1 to 12 and two to display the minutes from 0 to 59; to represent the time in hours, minutes, and seconds, six disks may be used; to represent the date in day, month, and year, six or eight disks may be used; to represent the date in day and month, four disks may be used; to represent the time in minutes and seconds, such as in a stop watch, four disks may be used. Braille watch 100a need not include a plurality of disks if only the digits 0-9 are needed, for example, in a kitchen timer that can be set for a maximum of nine minutes. Thus, the number of the plurality of disks 110 depends on the time and/or date parameters selected for display using Braille watch 100a. If a 12 hour clock is used for the time, the plurality of pins 112 may include an am/pm pin associated with one of the plurality of disks to represent that the time is either am or pm.

With continuing reference to FIG. 1, clock 114 interfaces with microprocessor 102 to provide the current time and/or date. Merely for illustration, clock 114 may include a DS1307 real time clock manufactured by Maxim Integrated Products. Clock 114 may initially be programmed to the current time and date.

In an illustrative embodiment, the one or more buttons 116 include a first button to change the mode of Braille watch 100a and a second button to update the display. Braille watch 100a may include three modes. In the first mode, Braille watch 100a shows the time in hours and minutes. In the second mode, Braille watch 100a shows the time in minutes and seconds. In the third mode, Braille watch 100a shows the month and day. Depression of the first button switches between the three modes. Other time parameter combinations may be selectable or presented by default. Thus, time parameters include a second, a minute, an hour, a day, a month, and a year, which may be in a four- or a two-digit format. One or more time parameter may be selected for display by Braille watch 100a using the first button to toggle between modes. When the second button is depressed, the updated information associated with the currently selected mode is displayed. In an illustrative embodiment, the plurality of actuators 108 do not move unless the first button or the second button is depressed to reduce the amount of power consumed by the plurality of actuators 108. Merely for illustration, the first button and the second button include COM-09190 momentary push button switches manufactured by Sparkfun™ Electronics.

In an illustrative embodiment, microprocessor 102 receives a signal that either of the first button or the second button is depressed. In response, microprocessor 102 interfaces with clock 114 to request the current time information and to receive the requested time information. Microprocessor 102 executing time display application 106 determines the amount of rotation for each of the plurality of actuators 108 based on the received information and the mode selected by the user. Each disk of the plurality of disks 110 is mounted to an actuator of the plurality of actuators 108. Microprocessor 102 interfaces with the plurality of actuators 108 to rotate the plurality of disks 110 to display the requested information to the user through the plurality of pins 112. For example, time display application 106 determines the appropriate signal to each actuator of the plurality of actuators 108. In response to receipt of the signal, a respective actuator rotates the associated disk to the desired angle, forming the pin configuration that displays the correct Braille number for the selected one or more time parameters.

With reference to FIGS. 3a and 3b, a first disk 300 of the plurality of disks 110 is shown in accordance with an illustrative embodiment. In the illustrative embodiment, first disk 300 includes a first raised surface 302, a second raised surface 304, a third raised surface 306, a first surface 308, a second surface 310, and a third surface 312. First raised surface 302, second raised surface 304, and third raised surface 306 extend out of the surface of the page relative to first surface 308, second surface 310, and third surface 312. Thus, first surface 308, second surface 310, and third surface 312 form a base surface. First raised surface 302, second raised surface 304, and third raised surface 306 are elevated above the base surface. First disk 300 further includes a transition surface that provides a sloped surface between first raised surface 302, second raised surface 304, and third raised surface 306 and the base surface.

Associated with first disk 300 are a first pin 314, a second pin 316, a third pin 318, and a fourth pin 320 of the plurality of pins 112. When first pin 314, second pin 316, third pin 318, and/or fourth pin 320 are positioned above first raised surface 302, second raised surface 304, or third raised surface 306, the head of each respective pin can be detected by the user. The plurality of pins 112 are mounted to be approximately flush with a top surface of a top plate when the base surface is positioned below one or more of the plurality of pins 112.

For example, with reference to FIG. 7, a side view of first disk 300 is shown in accordance with an illustrative embodiment. In the illustrative embodiment, a raised surface 700 extends above a base surface 701 of first disk 300. For example, raised surface 700 may include first raised surface 302, second raised surface 304, or third raised surface 306, and base surface 701 of first disk 300 may include first surface 308, second surface 310, and third surface 312. At the orientation shown in FIG. 7, first disk 300 has been rotated such that second pin 316 is positioned above raised surface 700 and third pin 318 is positioned above base surface 701 of first disk 300. First pin 314, second pin 316, third pin 318, and fourth pin 320 are mounted between first disk 300 and a top plate 702. First pin 314, second pin 316, third pin 318, and fourth pin 320 are mounted to extend through holes in top plate 702. For example, second pin 316 extends through a first hole 709 in top plate 702, and third pin 318 extends through a second hole 711 in top plate 702.

In the orientation shown in FIG. 7, a head portion 710 of second pin 316 extends above a top surface 704 of top plate 702 so that head portion 710 of second pin 316 can be perceived by the user. A head portion 716 of third pin 318 does not extend above top surface 704 so that head portion 716 of third pin 318 is not perceived by the user. A top of head portion 716 of third pin 318 is generally flush with top surface 704 when third pin 318 is positioned above base surface 701 of first disk 300. When first disk 300 rotates to different positions, different combinations of first pin 314, second pin 316, third pin 318, and fourth pin 320 are raised above top surface 704. In this way, the numbers 0-9 in the Braille language can be displayed by controlling the rotation angle of first disk 300.

To hold first pin 314, second pin 316, third pin 318, and fourth pin 320 inside a casing of Braille watch 100a, biasing members are mounted between a bottom surface 705 of top plate 702 and a platform mounted to each pin. For example, with reference to FIG. 7, a first platform 706 is mounted to second pin 316 and a first biasing member 708 is mounted to extend between bottom surface 705 of top plate 702 and a top of first platform 706. First platform 706 is mounted to encircle a shaft of first pin 314. First biasing member 708 is mounted around a portion of the shaft of first pin 314 between first platform 706 and bottom surface 705 of top plate 702. A second platform 712 is mounted to third pin 318 and a second biasing member 714 is mounted to extend between bottom surface 705 of top plate 702 and a top of second platform 712. In an illustrative embodiment, first biasing member 708 and second biasing member 714 are springs that are uncompressed when the respective pin is resting on base surface 701 of first disk 300 and compressed when the respective pin is resting on top raised surface 700 of first disk 300.

In an illustrative embodiment, the plurality of pins 112 are circular and the platforms mounted to each of the plurality of pins 112 are circular though other shapes may be used. The platforms provide a surface for the biasing members to rest on and prevent the respective pin from falling out if Braille watch 100a is overturned. The plurality of pins 112 may include a rounded bottom to easily slide up and down slopes on first disk 300. The head portion of each pin may also be rounded. In an illustrative embodiment, each pin of the plurality of pins 112 is less than 0.25 inches (in.) tall and approximately 0.06 in. in diameter.

With continuing reference to FIG. 3a, first disk 300 is rotated to form the Braille number 4 because first pin 314 is positioned above first raised surface 302, third pin 318 is positioned above second raised surface 304, and fourth pin 320 is positioned above third raised surface 306 while second pin 316 is positioned above second surface 310. As a result, the head portions of first pin 314, third pin 318, and fourth pin 320 extend above top surface 704 of top plate 702 to form the Braille number 4.

The surface of first disk 300 can be defined to have a first quadrant area 322, a second quadrant area 324, a third quadrant area 326, and a fourth quadrant area 328 formed by a first axis 330 extending through a center of first disk 300 in a first direction and a second axis 332 extending through the center of first disk 300 in a second direction perpendicular to first axis 330. First quadrant area 322, second quadrant area 324, third quadrant area 326, and fourth quadrant area 328 are non-overlapping. First pin 314 is mounted above first quadrant area 322. Second pin 316 is mounted above second quadrant area 324. Third pin 318 is mounted above third quadrant area 326. Fourth pin 320 is mounted above fourth quadrant area 328.

With continuing reference to FIG. 3b, first disk 300 is rotated clockwise to form the Braille number 5 because first pin 314 is positioned above first raised surface 302 and third pin 318 is positioned above second raised surface 304, while second pin 316 is positioned above second surface 310 and fourth pin 320 is positioned above first surface 308. As a result, the head portions of first pin 314 and third pin 318 extend above top surface 704 of top plate 702 to form the Braille number 5. The remaining Braille numbers are formed by rotating first disk 300 in a similar manner. Thus, the selected Braille number is formed by controlling the angle of rotation of first disk 300. In the illustrative embodiment, only 165 degrees of rotation is needed to form Braille numbers 0-9.

Figure 4:
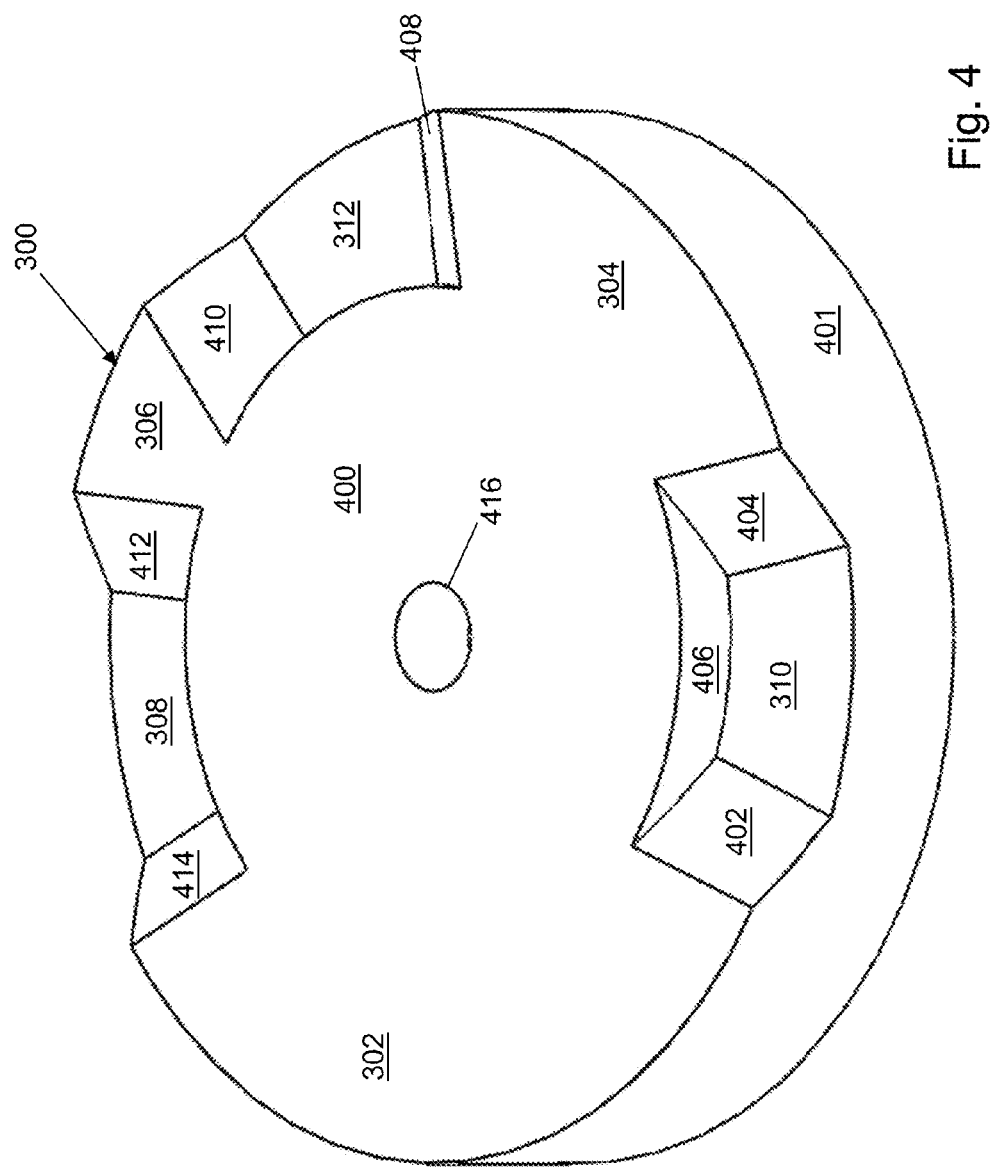
FIG. 4 is a top perspective view of the disk of FIGS. 3a and 3b in accordance with the first illustrative embodiment.

With reference to FIG. 4, a perspective view of first disk 300 is shown in accordance with an illustrative embodiment. First disk 300 includes a top surface 400, a wall 401, and a bottom surface (not shown). The bottom surface may be generally flat. Though shown as circular, disk 300 may form other shapes including polygons and ellipses. Wall 401 forms the circumference of first disk 300. The interior of first disk 300 may be solid or hollow as long as first disk 300 is sufficiently strong to support the raising and lowering of the plurality of pins 112. Top surface 400 may include first raised surface 302, second raised surface 304, and third raised surface 306. In an illustrative embodiment, first surface 308, second surface 310, and third surface 312 may be formed by etching top surface 400. In another illustrative embodiment, first raised surface 302, second raised surface 304, and third raised surface 306 may be formed by layering of additional material above first surface 308, second surface 310, and third surface 312.

A first transition surface 402 extends between first raised surface 302 and second surface 310. A second transition surface 404 extends between second raised surface 304 and second surface 310. A third transition surface 404 extends between top surface 400 and second surface 310. A fourth transition surface 408 extends between second raised surface 304 and third surface 312. A fifth transition surface 410 extends between third raised surface 306 and third surface 312. A sixth transition surface 600 (shown with reference to FIG. 6) extends between top surface 400 and third surface 312. A seventh transition surface 412 extends between third raised surface 306 and first surface 308. An eighth transition surface 414 extends between first raised surface 302 and first surface 308. A ninth transition surface 602 (shown with reference to FIG. 6) extends between top surface 400 and first surface 308. The transition surfaces may form a variety of angles between approximately 0 degrees and approximately 90 degrees. To allow the plurality of pins 112 to easily transition between the recessed and raised surfaces, a slope of approximately 45 degrees may be used for transition surfaces 402, 404, 408, 410, 412, and 414.

A shaft mounting surface 416 is formed in a center of first disk 300 and may extend partially or entirely through first disk 300. A shaft may be mounted between an actuator and first disk 300 to rotate first disk 300. In another illustrative embodiment, first disk 300 is directly mounted for rotation to the actuator.

Figure 5:
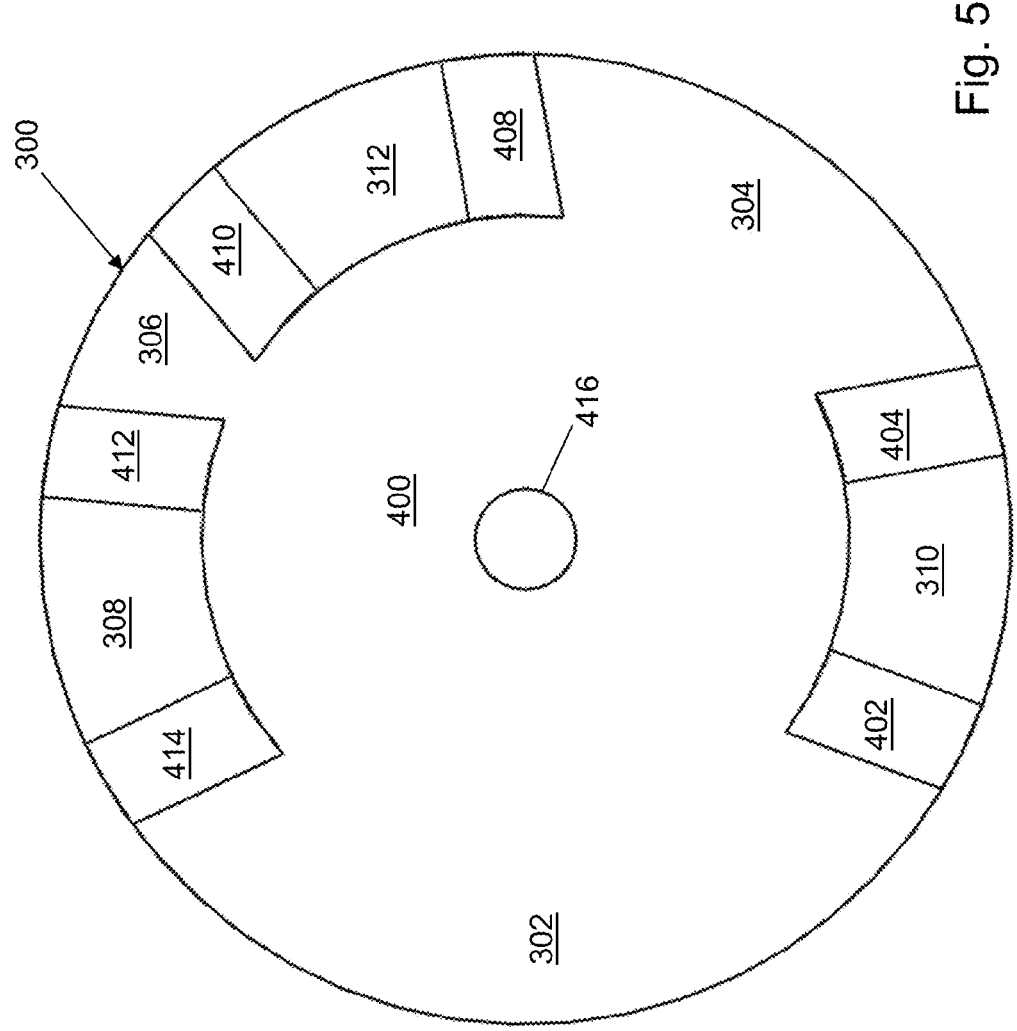
FIG. 5 is a top view of the disk of FIG. 4 in accordance with the first illustrative embodiment.

With reference to FIG. 5, a top view of first disk 300 is shown in accordance with the illustrative embodiment of FIG. 4. With reference to FIG. 6, a side view of first disk 300 is shown in accordance with the illustrative embodiment of FIG. 4.

A casing in which Braille watch 100a is housed may be formed of one or more walls to form a polygonal, circular, or elliptical housing. Top plate 702 may be mounted to the housing a variety of mounting methods. Additionally, one or more plates may be positioned between the surfaces of first disk 300 and top plate 702 to stabilize the plurality of pins 112.

Figure 8A:
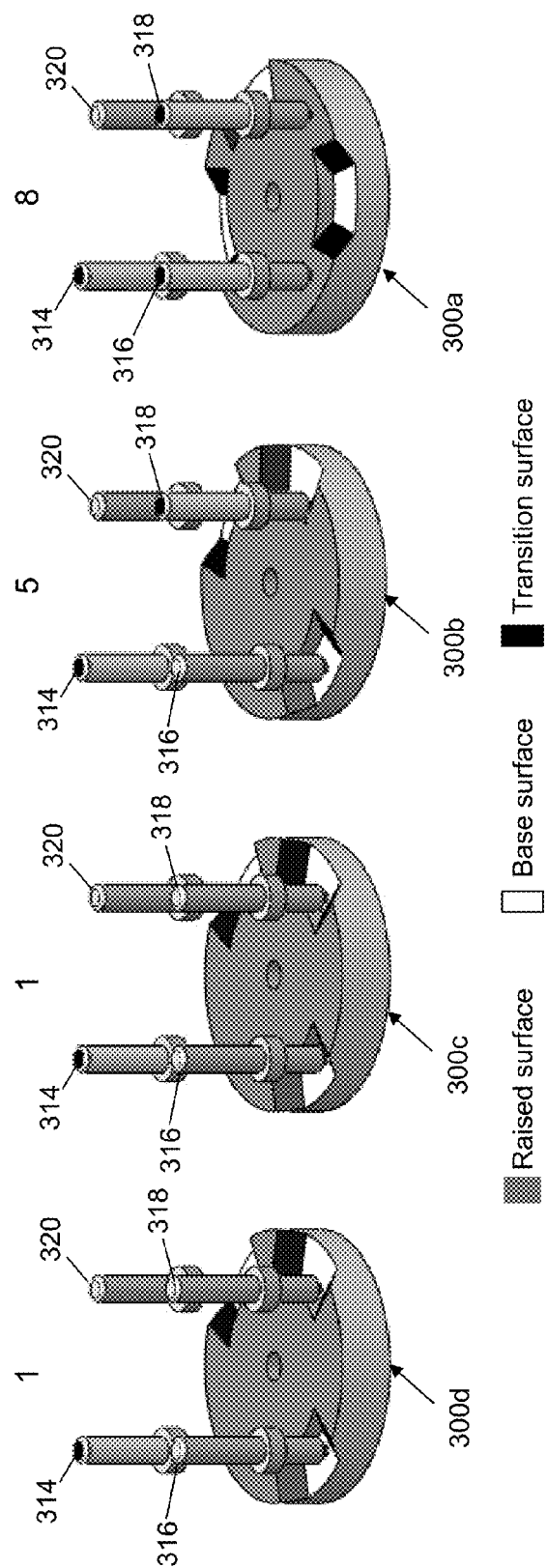
FIGS. 8a, 8b, and 8c show a side perspective view, a top view, and a side view, respectively, of four disk and pin assemblies arranged to indicate the Braille number "1158" in accordance with the first illustrative embodiment.
Figure 8B:
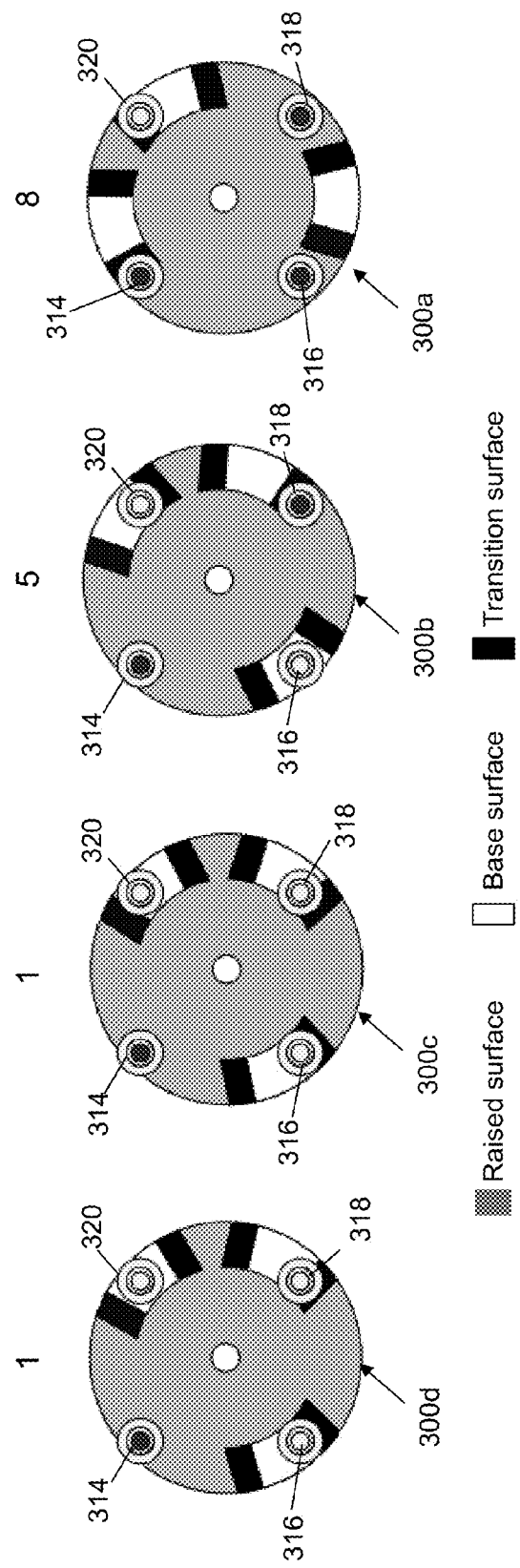
Figure 8C:
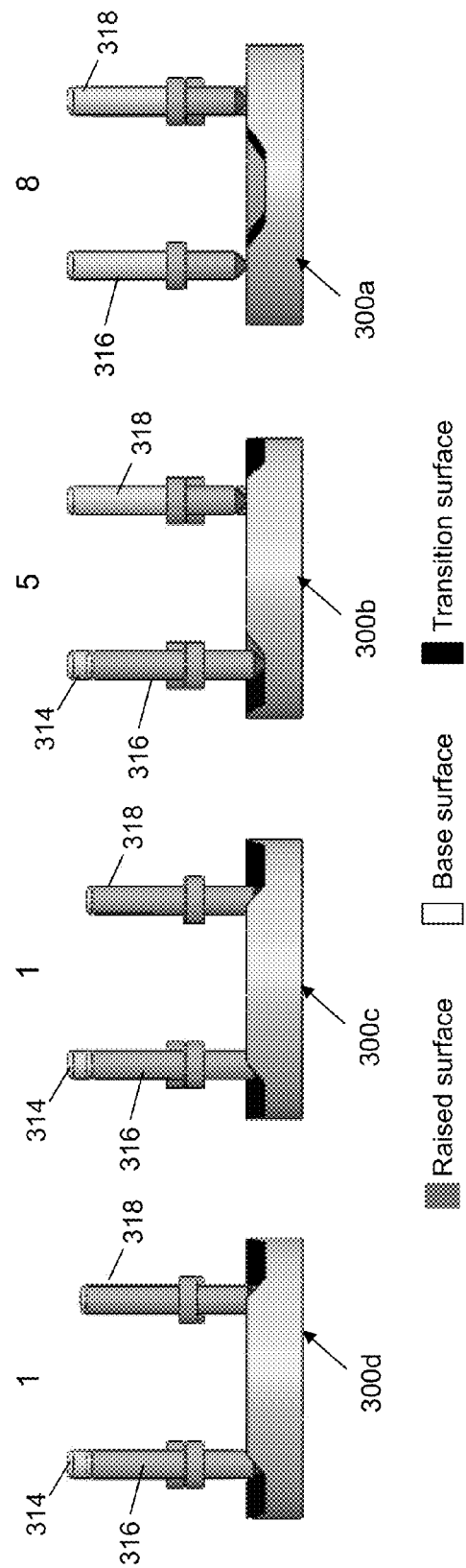

With reference to FIGS. 8a, 8b, and 8c a side perspective view, a top view, and a side view, respectively, of four disk and pin assemblies arranged to indicate the Braille number "1158" in accordance with the first illustrative embodiment are shown. The raised surface is shown with gray shading, the transition surface is shown with black shading, and the base surface is shown in white.

With reference to FIG. 9, a block diagram of a second Braille watch 100b is shown in accordance with a second illustrative embodiment. In the second illustrative embodiment, second Braille watch 100b may include an actuator 902, a plurality of disks, and a plurality of pins associated with each of the plurality of disks. Different and additional or fewer components may be incorporated into Braille watch 100b. For example, second Braille watch 100b also includes a power source (not shown) to power the electrical components of second Braille watch 100b. The mechanical components of second Braille watch 100a may be formed of a variety of materials including metal, plastic, wood, etc.

Similar to Braille watch 100a, the number of the plurality of disks of second Braille watch 100b depends on the time parameters selected for display using second Braille watch 100b. In the illustrative embodiment, the plurality of disks of second Braille watch 100b include a first disk 904, a second disk 908, a third disk 912, and a fourth disk 916, which display the time in hours and minutes though the same principles described herein can be applied to include additional or fewer disks and to display different time parameter information such as the seconds, the day, the month, the year, etc.

A first plurality of pins 906 are mounted to first disk 904. In the second illustrative embodiment, the first plurality of pins 906 include four pins used to display a single number in the Braille language in a manner similar to that discussed previously using raised surfaces. A second plurality of pins 910 are mounted to second disk 908. In the second illustrative embodiment, the second plurality of pins 910 include four pins used to display a single number in the Braille language in a manner similar to that discussed previously using raised, transition, and base surfaces. A third plurality of pins 914 are mounted to third disk 912. In the second illustrative embodiment, the third plurality of pins 914 include four pins used to display a single number in the Braille language in a manner similar to that discussed previously using raised surfaces. A fourth plurality of pins 918 are mounted to fourth disk 916. In the second illustrative embodiment, the fourth plurality of pins 918 include five pins used to display a single number in the Braille language in a manner similar to that discussed previously using raised surfaces and an am/pm pin to indicate that the time is either am or pm.

In the second illustrative embodiment, each of first disk 904, second disk 908, third disk 912, and fourth disk 916 rotate 360 degrees and are linked through one or more gear arms and a plurality of gear teeth. As a result, actuator 902 controls rotation of first disk 904, which in turn controls rotation of second disk 908 through the one or more gear arms and the plurality of gear teeth. Second disk 908 in turn controls rotation of third disk 912 through the one or more gear arms and the plurality of gear teeth, and third disk 912 in turn controls rotation of fourth disk 916 through the one or more gear arms and the plurality of gear teeth. Using the one or more gear arms and the plurality of gear teeth, actuator 902 may rotate at a constant angular velocity appropriate based on the time parameter displayed with first disk 904.

In the illustrative embodiment, the surface of each of first disk 904, second disk 908, and third disk 912, is divided into three rings: an outer ring, a middle ring, and an inner ring, each of which contain raised, transition, and base surfaces formed in the face of the respective disk. The surface of fourth disk 916 is divided into four rings: an outer ring, a first middle ring, a second middle ring, and an inner ring, each of which contain raised, transition, and base surfaces formed in the face of fourth disk 916. As first disk 904, second disk 908, third disk 912, and fourth disk 916 rotate through the gear mechanism interconnecting the disks, the associated pins are raised and lowered to display the desired numbers. As described with reference to Braille watch 100a, if a pin is positioned on the raised surface, the head portion of the pin extends above a top surface of second Braille watch 100b a sufficient amount to be perceived by a user. If not, the head portion of the pin remains approximately flush with the top surface of second Braille watch 100b. When the associated disk rotates to different positions, different combinations of pins are raised or lowered.

Each disk surface may be unique because each disk displays a different set of numbers when the hours and minutes are displayed. First disk 904 displays numbers 0-9, second disk 908 displays numbers 0-5, third disk 912 displays numbers 1-9 and 0-2, and fourth disk 916 displays numbers 0-1. Fourth disk 916 also contains a fourth ring for an am/pm pin. In an illustrative embodiment, a raised am/pm pin may signify PM and a lowered am/pm pin may signify AM though, of course, this may be reversed. Additionally, if military time is used, fourth disk 916 may not include the fourth ring for the am/pm pin. Some disk surfaces may be the same if the same sequence of numbers is displayed.

If second Braille watch 100b is structured to present the seconds time parameter, a first disk may display numbers 0-9 and a second disk may display numbers 0-5 similar to the minutes time parameter. If second Braille watch 100b is structured to present the day time parameter, a first disk may display numbers 1-9, 0-9, 0-9, and 0-1 and a second disk may display numbers 0-3. If second Braille watch 100b is structured to present the month time parameter, a first disk may display numbers 1-9 and 0-2 and a second disk may display numbers 0-1 similar to the hours time parameter. If second Braille watch 100b is structured to present the year time parameter in two digits, a first disk may display numbers 0-9 and a second disk may display numbers 0-9. If second Braille watch 100b is structured to present the year time parameter in four digits, a first disk may display numbers 0-9, a second disk may display numbers 0-9, a third disk may display numbers 0-9, and a fourth disk may display numbers 1-2.

Figure 10:
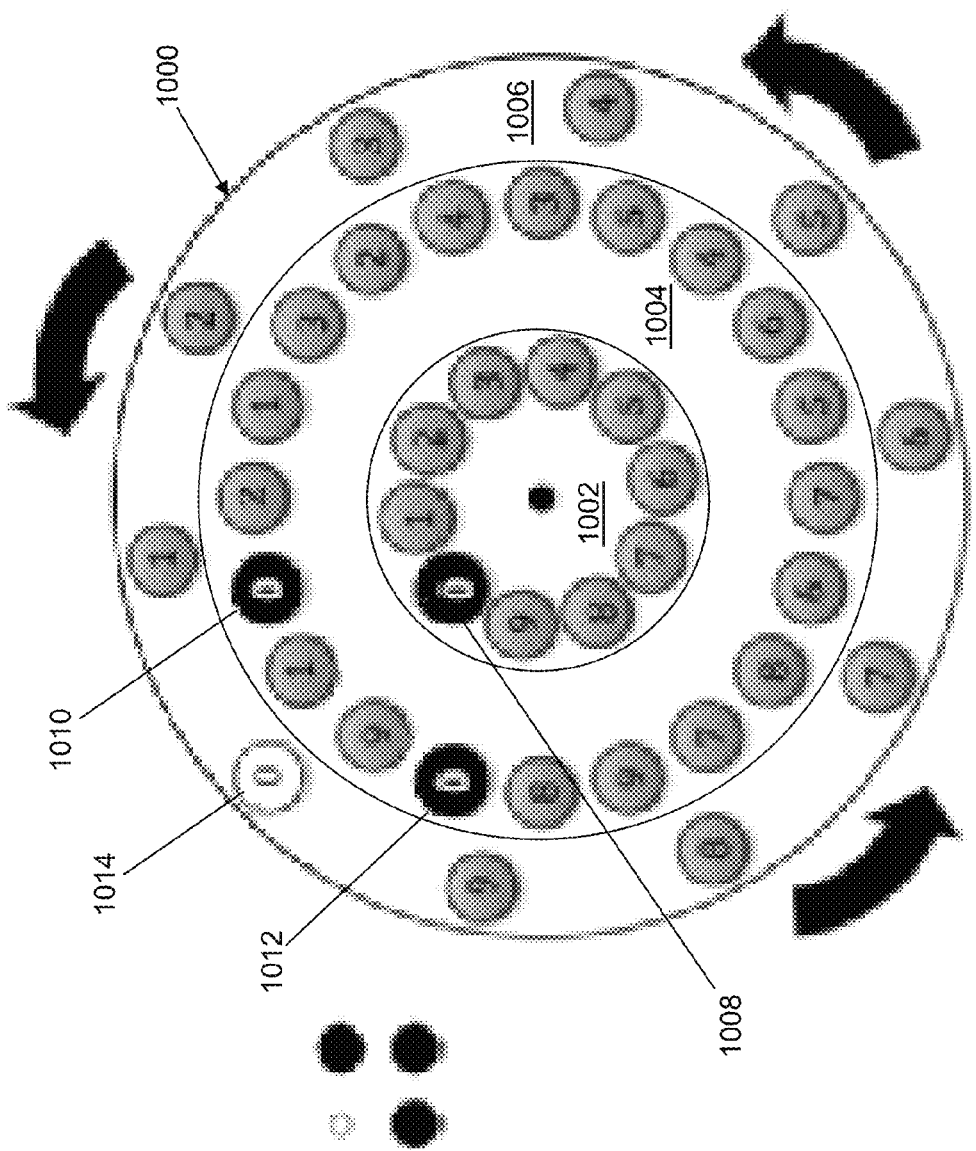
FIG. 10 depicts a disk for use in the Braille watch of FIG. 9 and indicates an arrangement of three rings and four pin locations use to form each Braille number 0-9 by rotating the disk in accordance with the second illustrative embodiment.

With reference to FIG. 10, a first disk 1000 is shown to indicate which surface locations are used to form the numbers 0-9. Associated with each of the numbers 0-9 are four pin locations used to form the associated Braille number. The actual shape of the raised surface is defined based on the characteristics of each number. The two by two grid of pins is overlayed on first disk 1000 so that the four pins follow three different rings. First disk 1000 includes a first ring 1002, a second ring 1004, and a third ring 1006. First ring 1002 is closest to a center of first disk 1000. Second ring 1004 encircles first ring 1002, and third ring 1006 encircles second ring 1004. First ring 1002 comprises a first portion of a first raised surface, second ring 1004 comprises a second portion of the first raised surface and a third portion of the first raised surface, and third ring 1006 comprises a fourth portion of the first raised surface. For example, to form the Braille number "0" as indicated in FIG. 10, a first pin 1008 is positioned over a first raised portion of the first raised surface positioned in first ring 1002, a second pin 1010 is positioned over a second raised portion of the first raised surface positioned in second ring 1004, a third pin 1012 is positioned over a third raised portion of the first raised surface positioned in second ring 1004, and a fourth pin 1014 is positioned over a base surface positioned in third ring 1006 so that fourth pin 1014 is lowered relative to first pin 1008, second pin 1010, and third pin 1012. In the illustrative embodiment, the Braille numbers 0-9 are formed by continuously rotating first disk 1000 in the same direction rather than rotating first disk 1000 to specific angles as described with reference to first disk 300.

Figure 11:
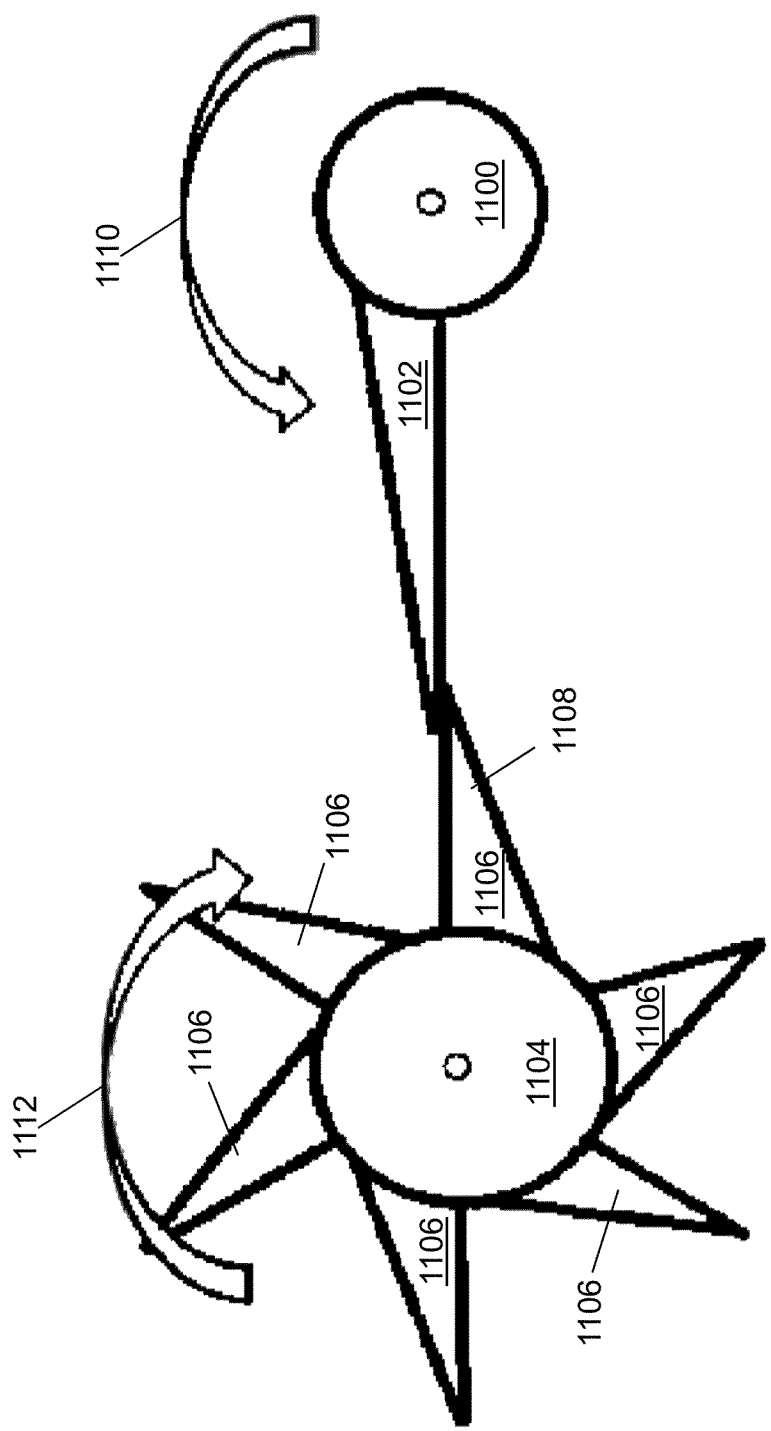
FIG. 11 depicts a gear arm and gear teeth for use in the Braille watch of FIG. 9 in accordance with the second illustrative embodiment.
Figure 12A:
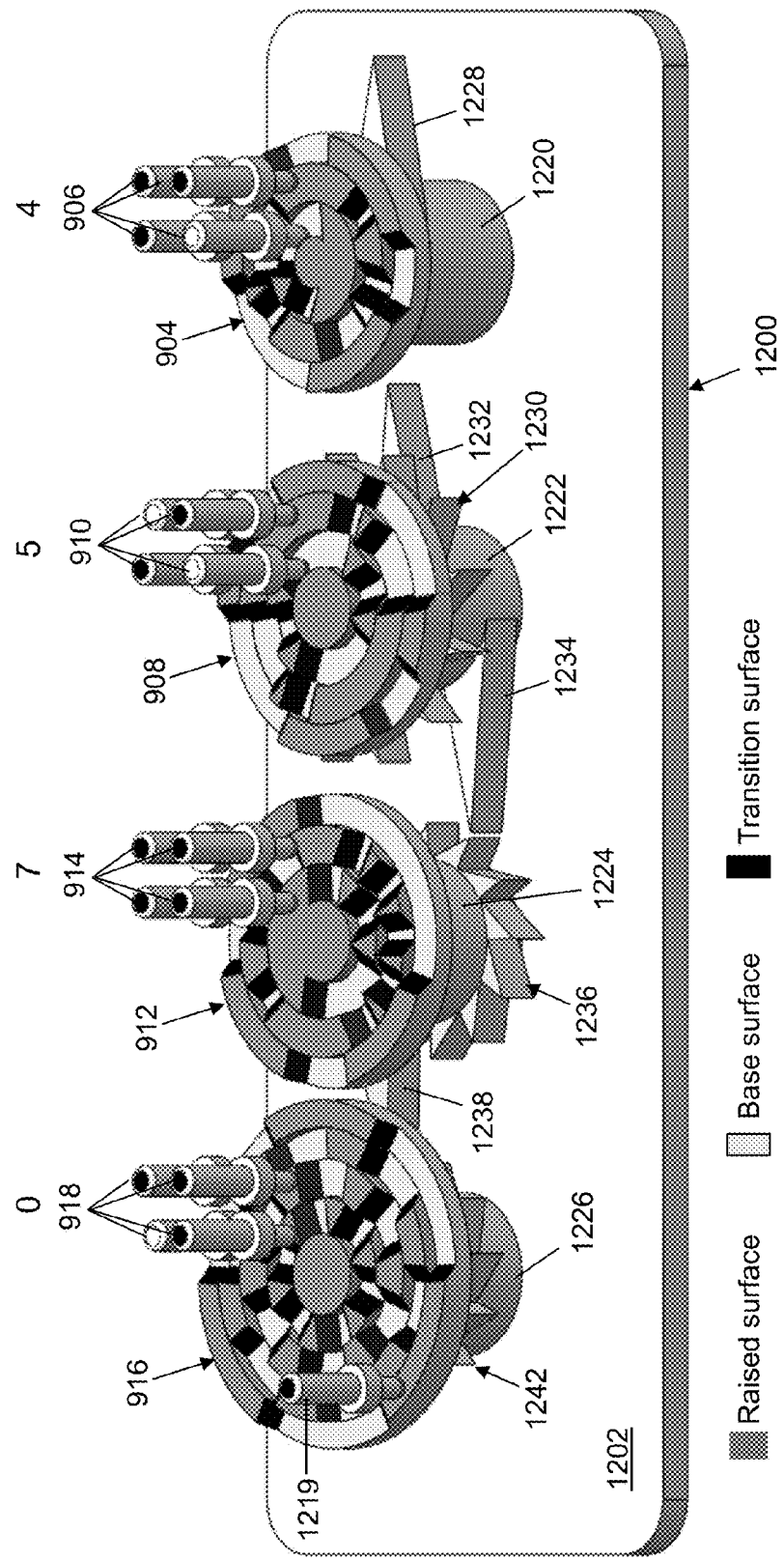
Figure 12C:
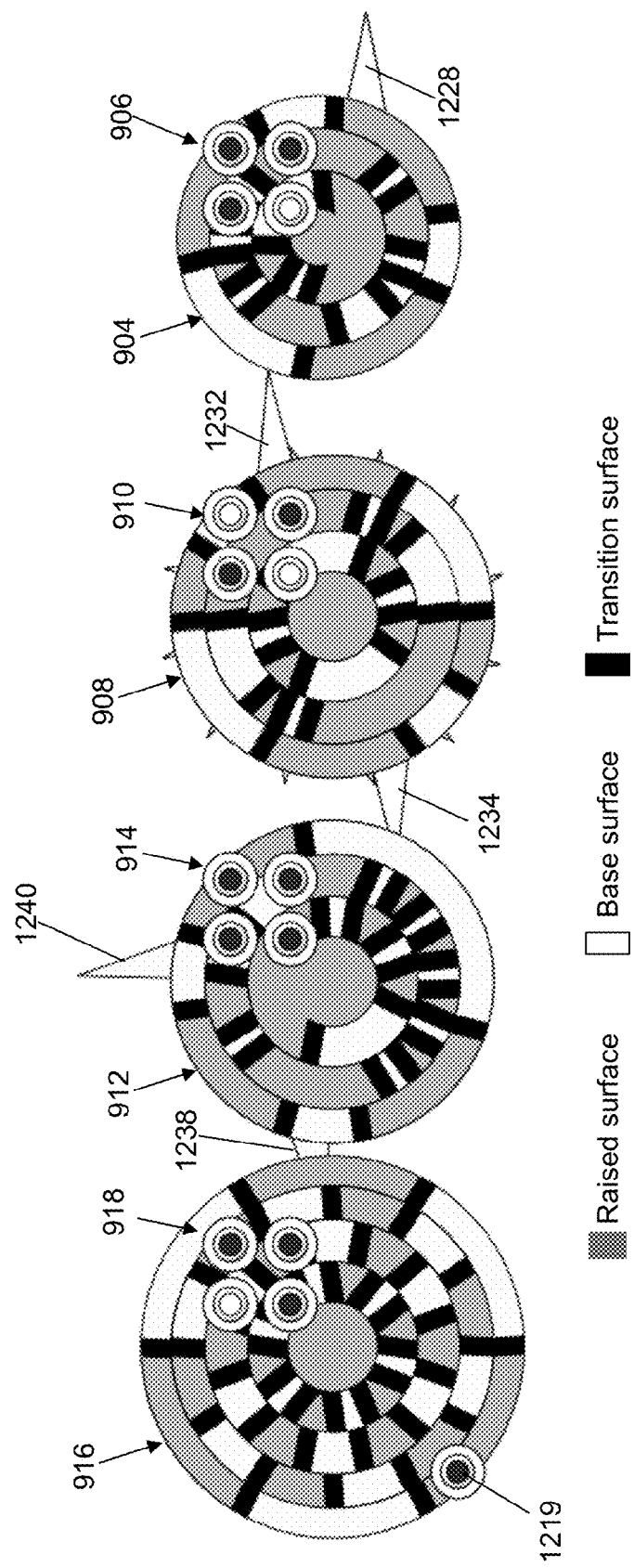
Figure 12D:
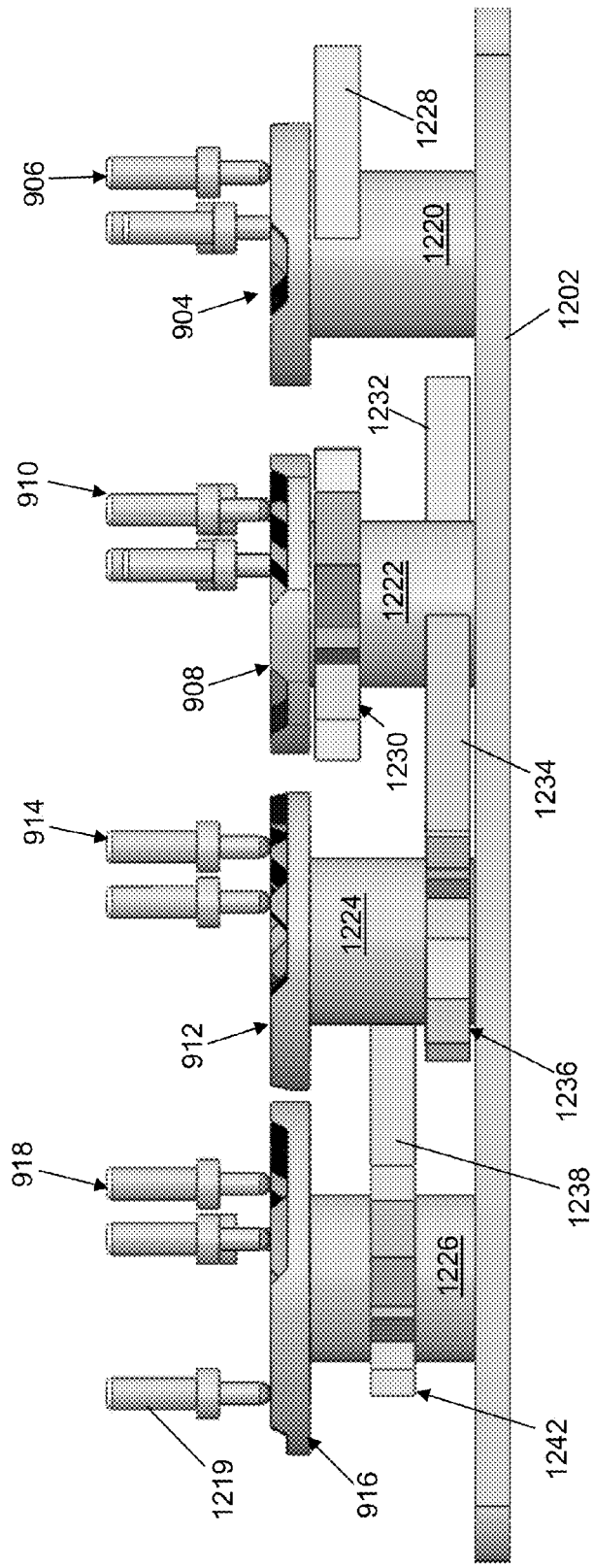
Figure 13C:
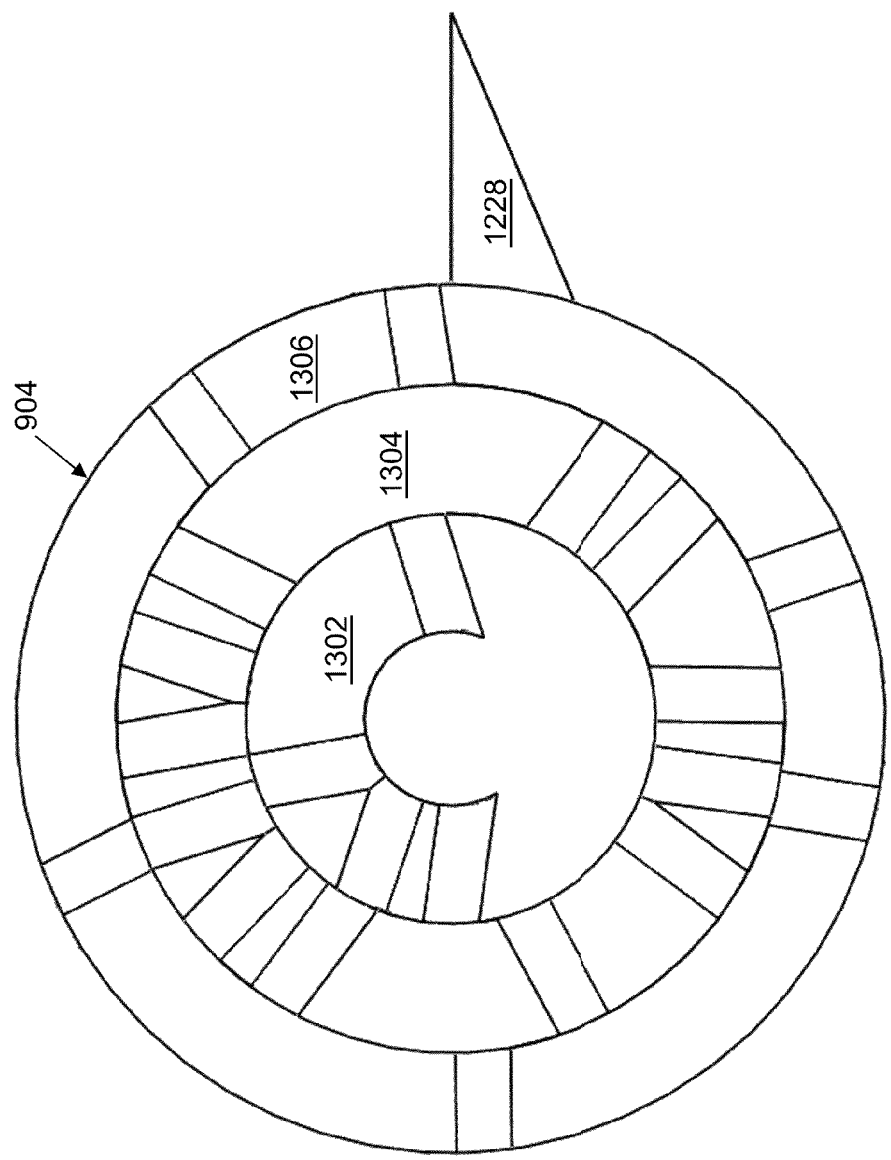
Figure 13D:
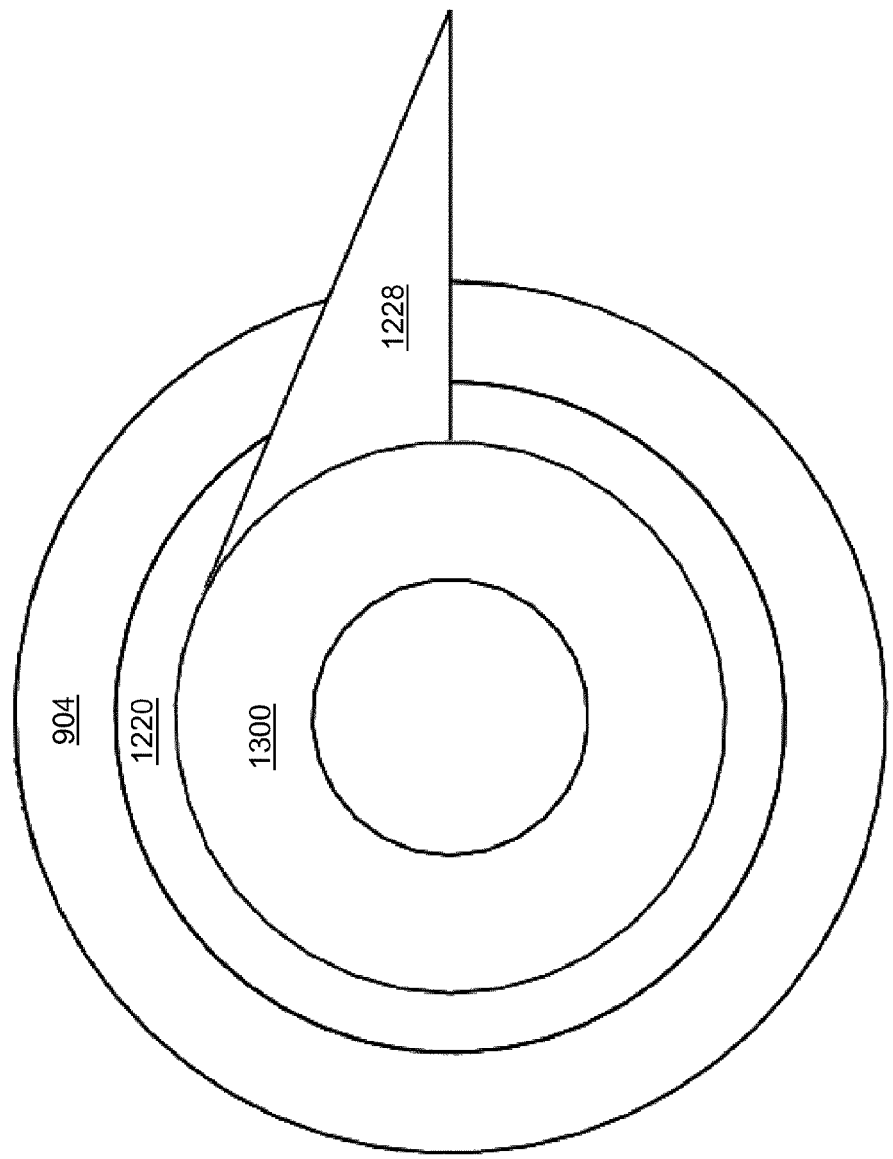
Figure 14A:
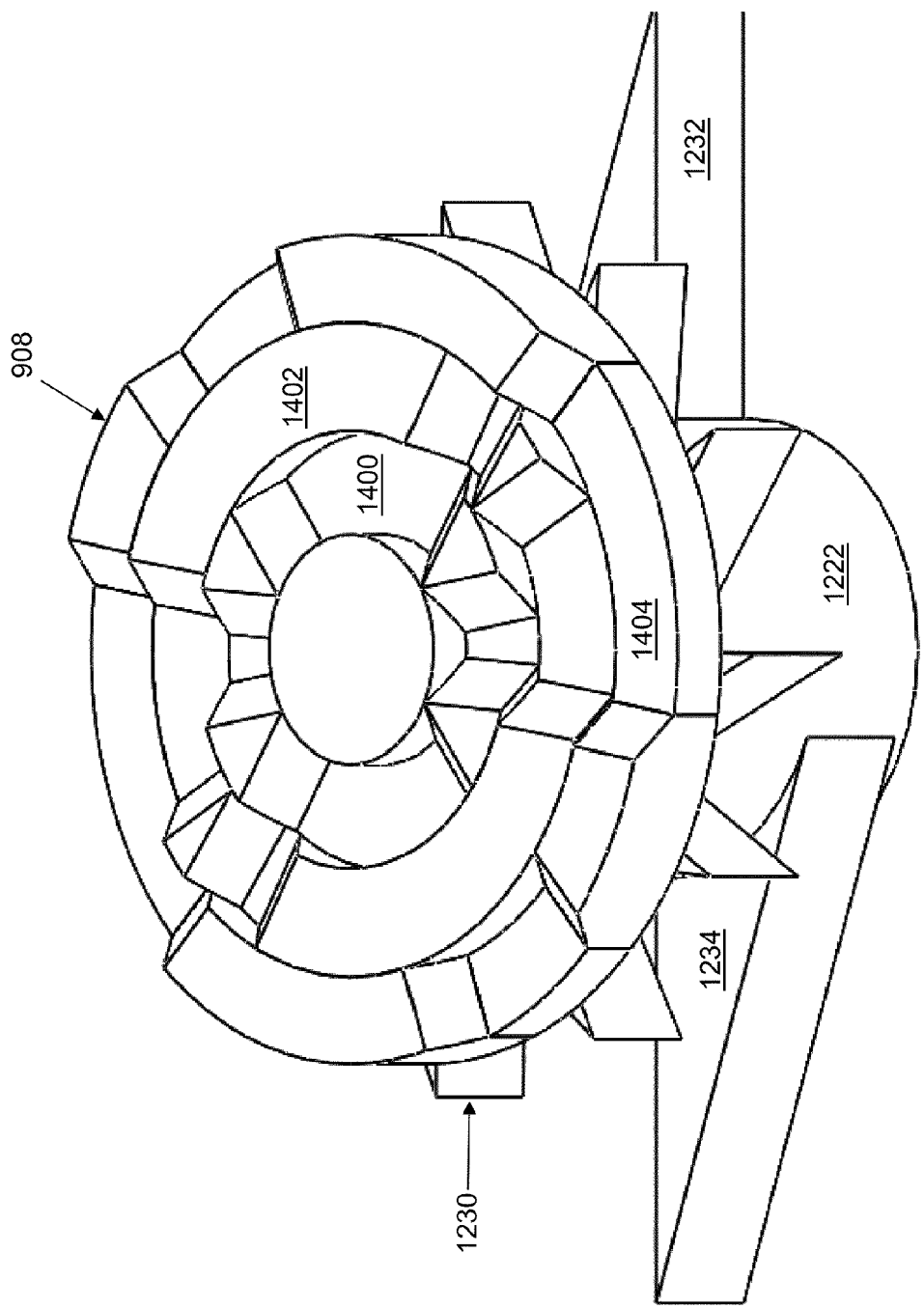
FIGS. 14a, 14b, 14c, and 14d show a perspective view, a side view, a top view, and a bottom view, respectively, of a second disk of the four disk and pin assemblies of FIG. 9 in accordance with the second illustrative embodiment.
Figure 14B:
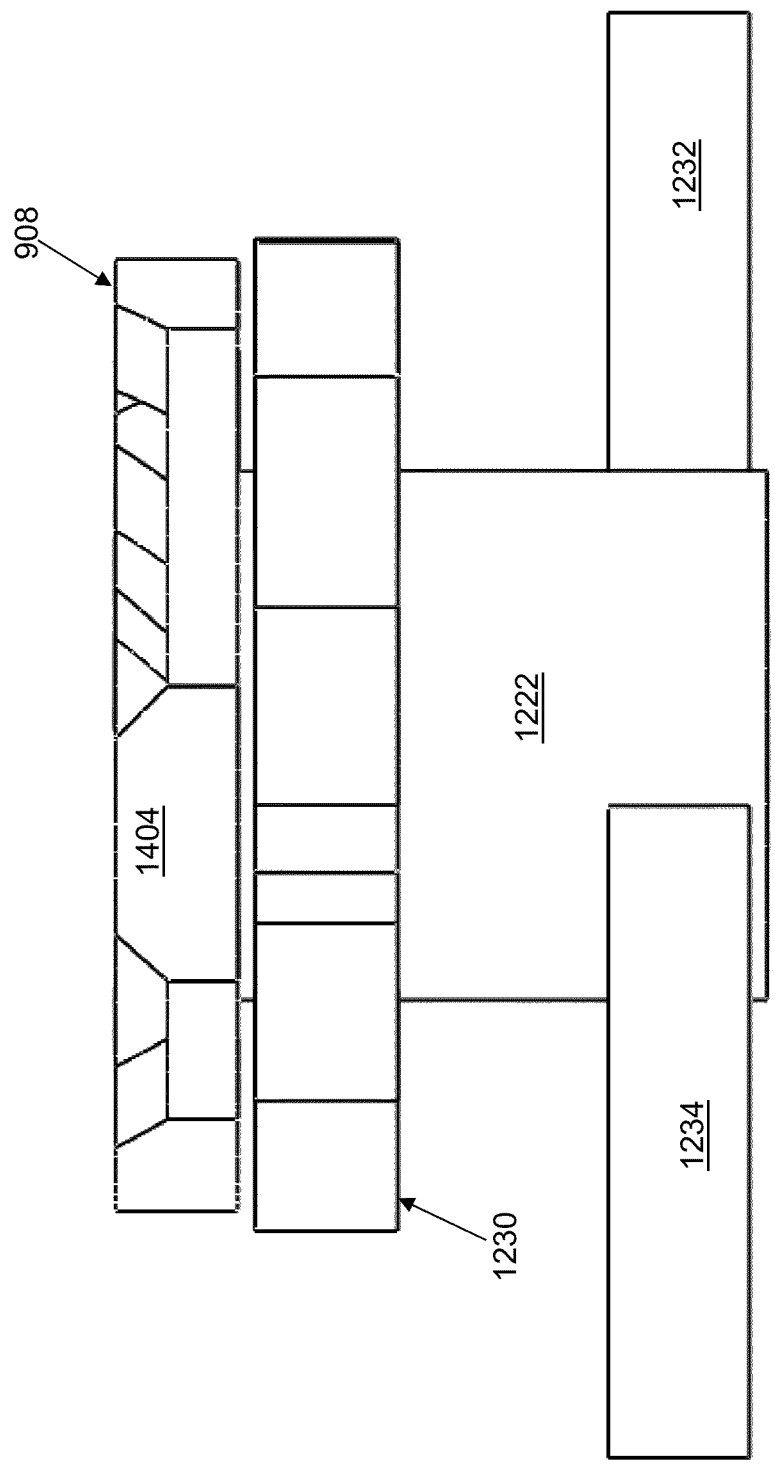
Figure 14C:
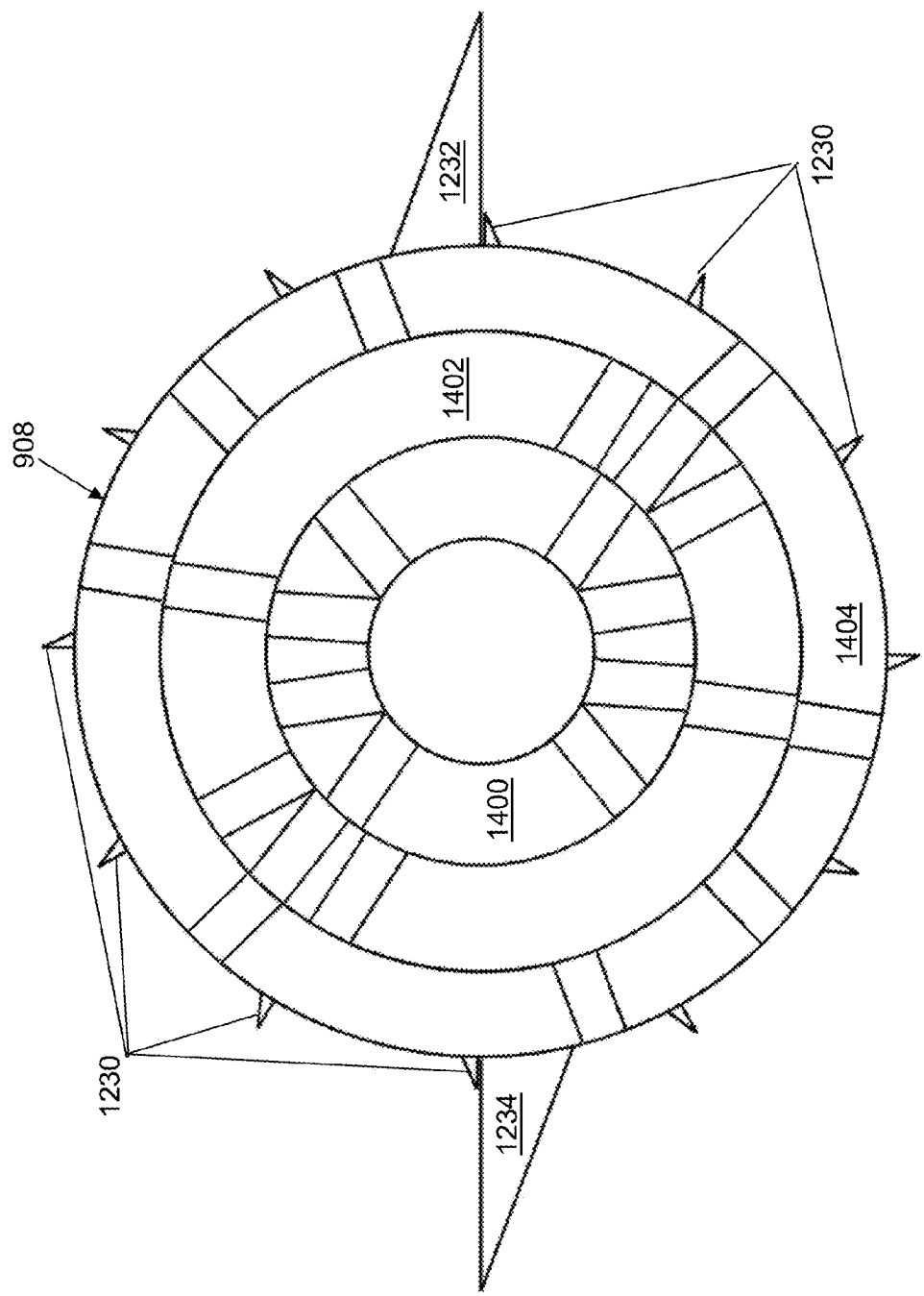
Figure 14D:
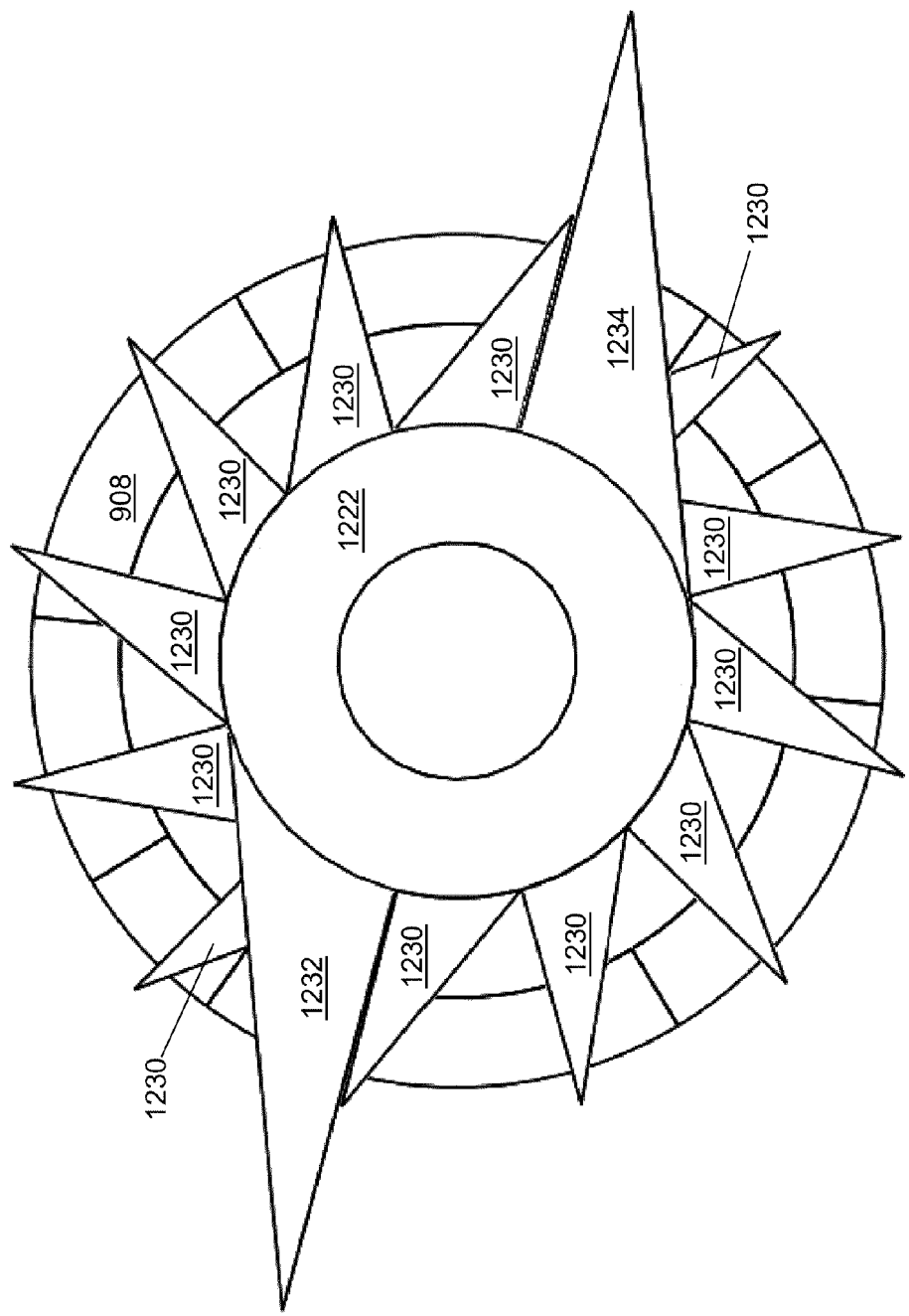
Figure 15B:
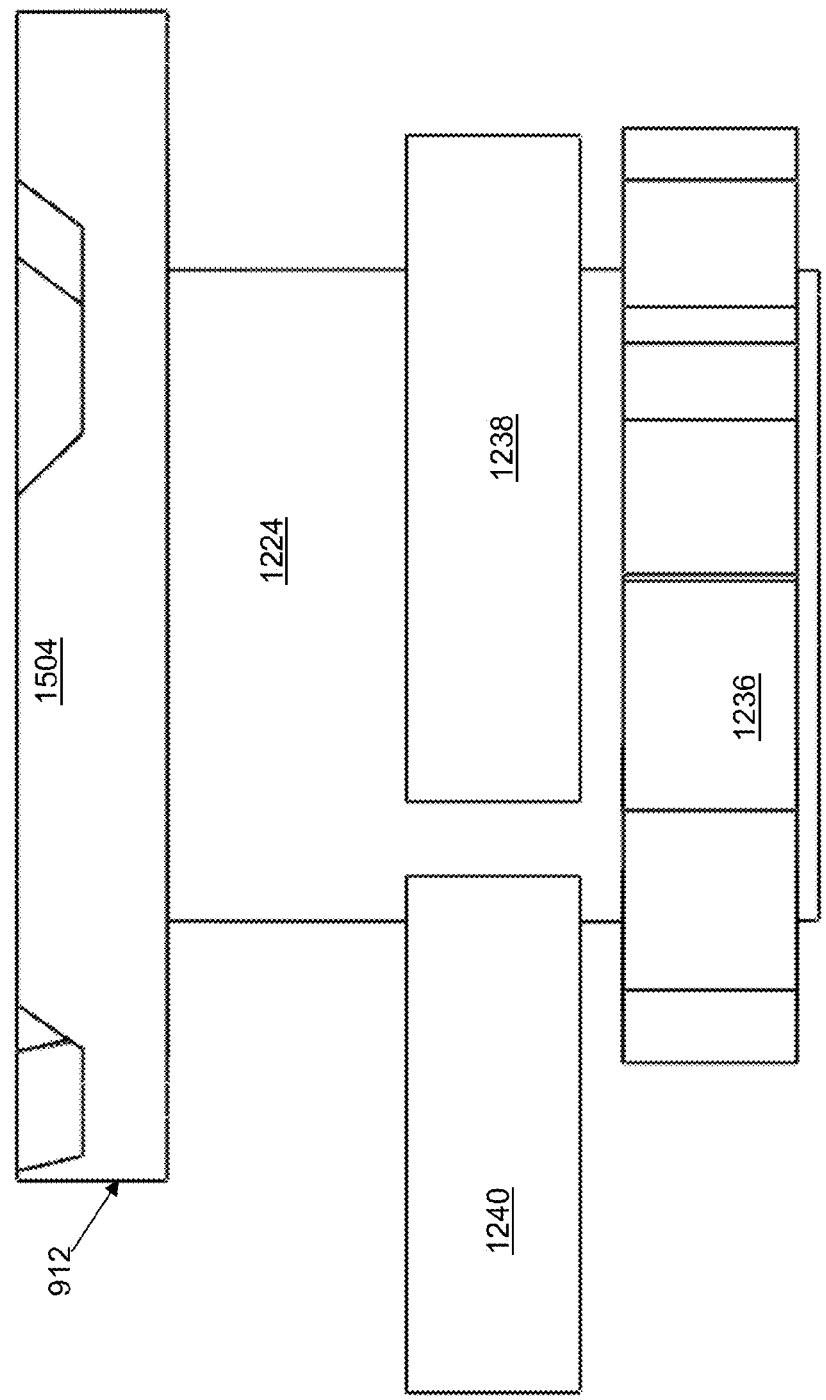
Figure 15C:
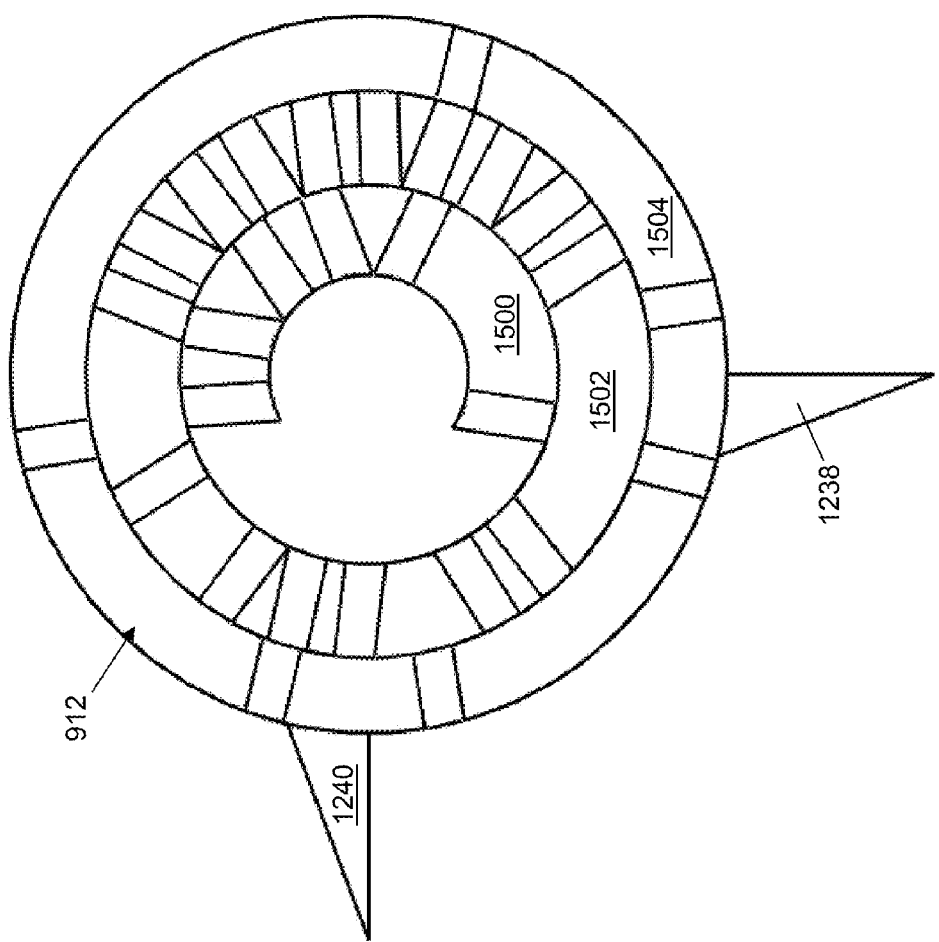
Figure 15D:
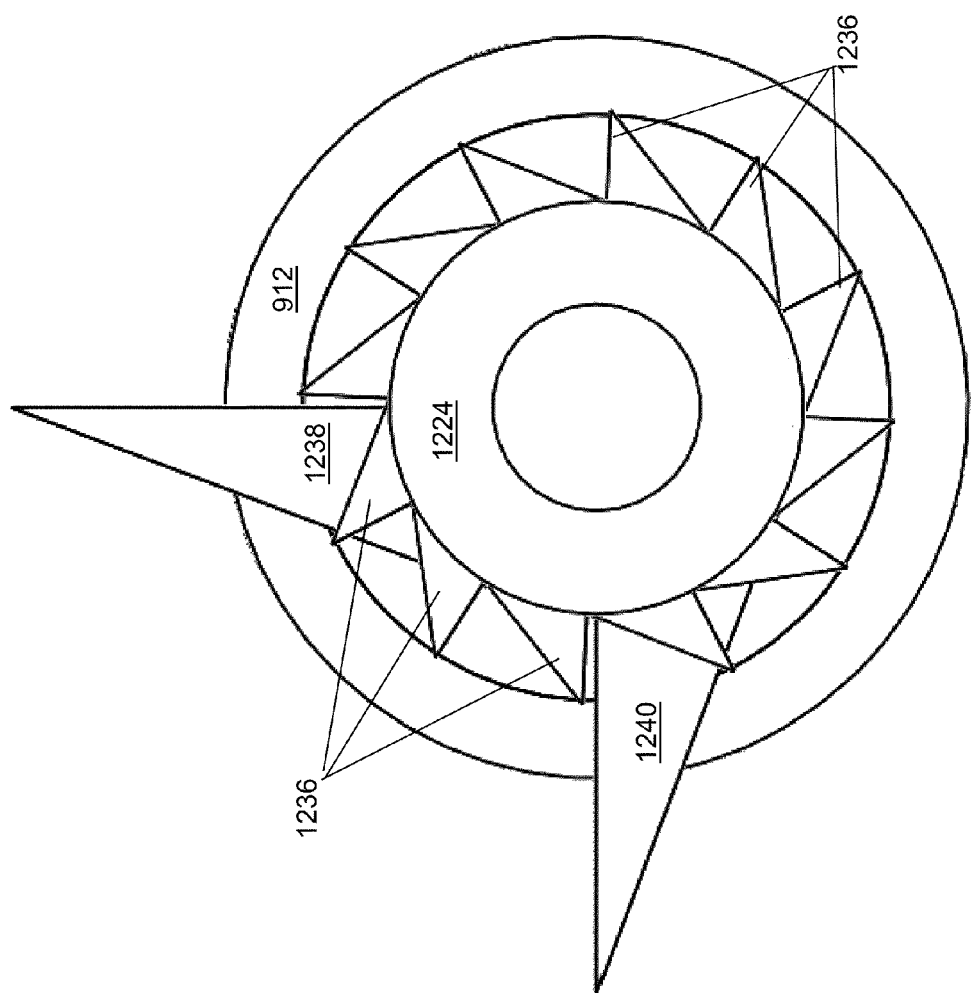
Figure 16A:
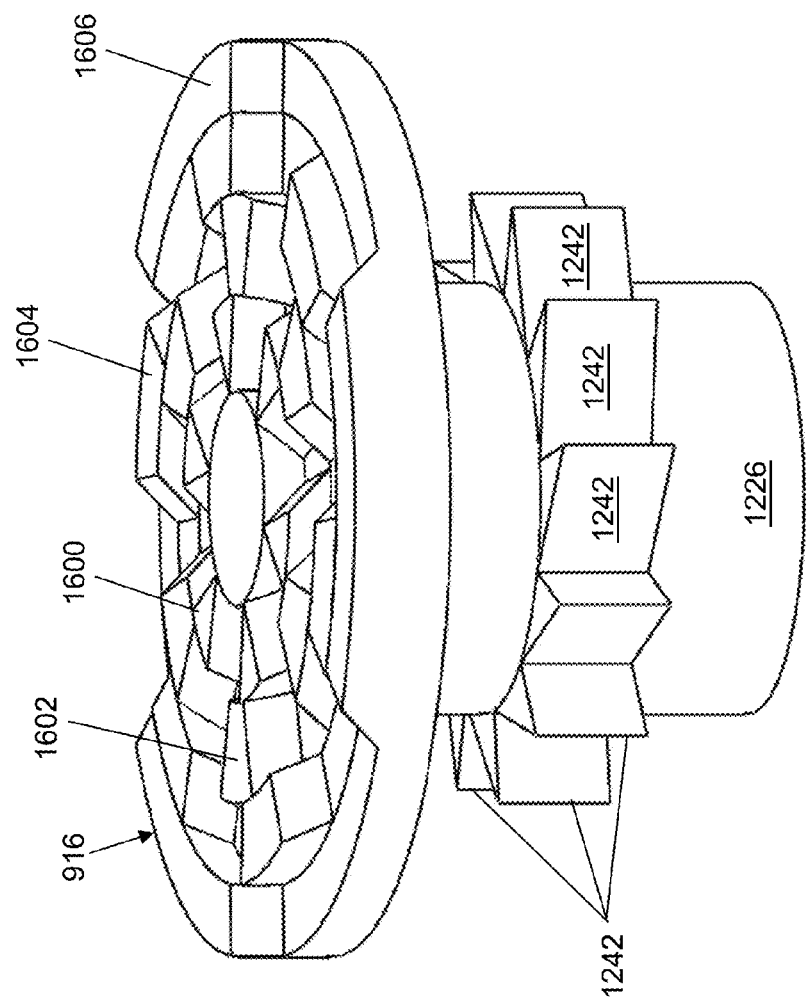
Figure 16B:
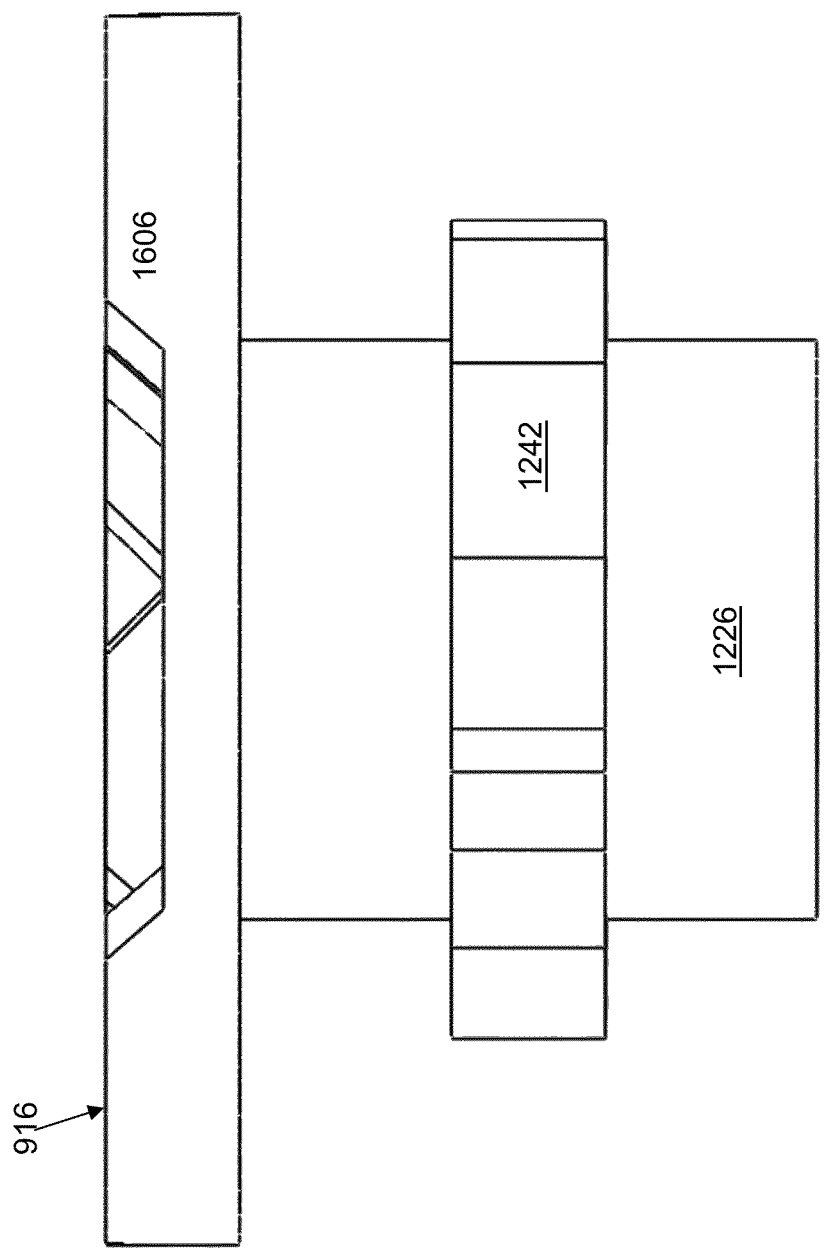
Figure 16D:
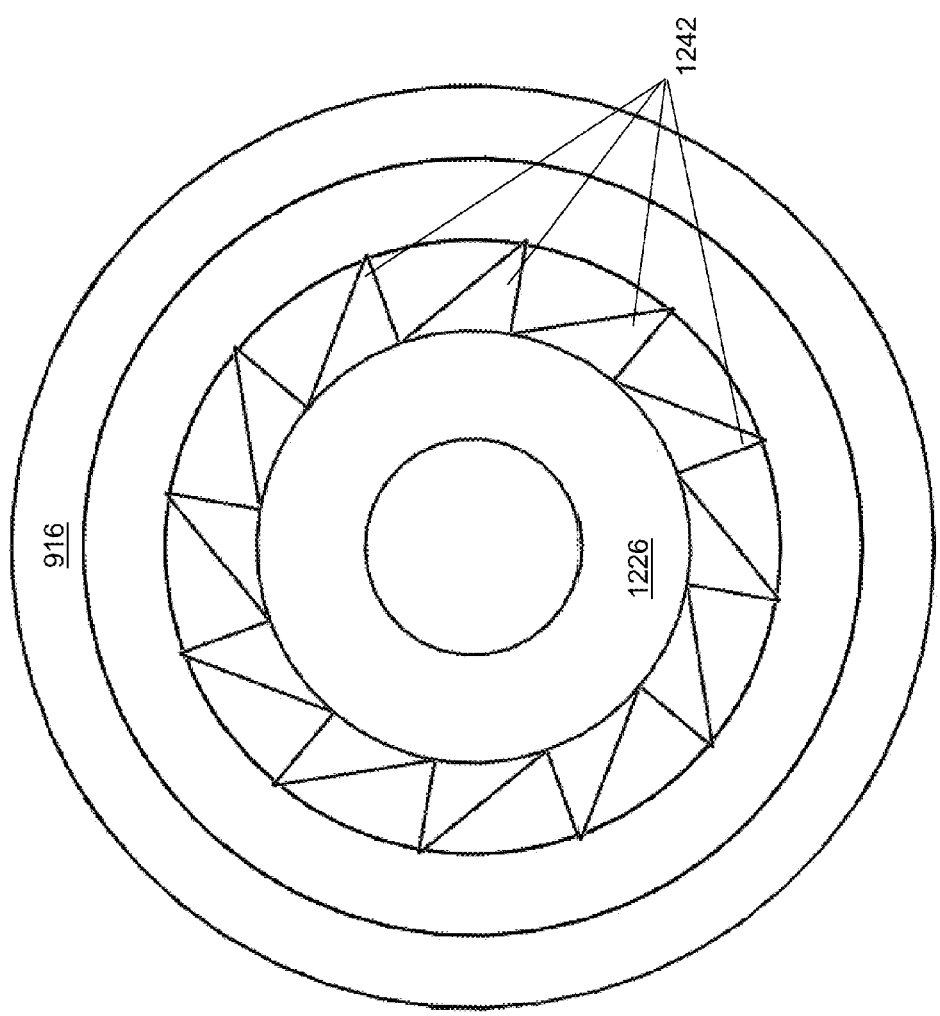

With reference to FIG. 11, a gear arm and a plurality of gear teeth are shown in accordance with an illustrative embodiment. A gear arm 1102 is mounted to a first rotating shaft 1100 to rotate in a first direction 1110. A plurality of gear teeth 1106 are mounted to a second rotating shaft 1104 to rotate in a second direction 1112 when gear arm 1102 contacts one of the plurality of gear teeth 1106. For example, in the illustrative embodiment of FIG. 11, gear arm 1102 is contacting a tooth 1108 of the plurality of gear teeth 1106 which causes second rotating shaft 1104 to rotate through an angle in second direction 1112. The plurality of gear teeth 1106 are equally distributed about the circumference of second rotating shaft 1104. Thus, the number of the plurality of gear teeth 1106 defines the angle by which gear 1102 rotates second rotating shaft 1104. For example, in the illustrative embodiment of FIG. 11, the plurality of gear teeth 1106 includes six teeth. Thus, gear arm 1102 rotates second rotating shaft 1104 by 60 degrees when gear arm 1102 contacts tooth 1108.

With reference to FIGS. 12a, 12b, 12c, and 12d a front perspective view, a top back perspective view, a top view, and a front side view, respectively, of a four disk and pin assembly 1200 arranged to indicate the Braille number "0754" are shown in accordance with the second illustrative embodiment. Four disk and pin assembly 1200 may include first disk 904, second disk 908, third disk 912, fourth disk 916, the first plurality of pins 906, the second plurality of pins 910, the third plurality of pins 914, and the fourth plurality of pins 918, and a base plate 1202. The fourth plurality of pins 918 include a fifth pin 1219 used to indicate whether the time is am or pm. A first shaft 1220 mounts first disk 904 to base plate 1202. A second shaft 1222 mounts second disk 908 to base plate 1202. A third shaft 1224 mounts third disk 912 to base plate 1202. A fourth shaft 1226 mounts fourth disk 916 to base plate 1202. A first gear arm 1228 is mounted to first shaft 1220 to rotate with first shaft 1220 and first disk 904. A first plurality of gear teeth 1230 are mounted to second shaft 1222 to rotate second shaft 1222 when first gear arm 1228 contacts one tooth of the first plurality of gear teeth 1230. A second gear arm 1232 and a third gear arm 1234 are mounted to second shaft 1222 to rotate with second shaft 1222 and second disk 908. A second plurality of gear teeth 1236 are mounted to third shaft 1224 to rotate third shaft 1224 when either second gear arm 1232 or third gear arm 1234 contact one tooth of the second plurality of gear teeth 1236. A fourth gear arm 1238 and a fifth gear arm 1240 are mounted to third shaft 1224 to rotate with third shaft 1224 and third disk 912. A third plurality of gear teeth 1242 are mounted to fourth shaft 1226 to rotate fourth shaft 1226 when either fourth gear arm 1238 or fifth gear arm 1240 contact one tooth of the third plurality of gear teeth 1242.

Thus, in the illustrative embodiment of FIGS. 12a, 12b, 12c, and 12d, when first disk 904 rotates 360 degrees, first gear arm 1228 of first disk 904 contacts teeth of the first plurality of gear teeth 1230 causing second disk 908 to rotate. When second disk 908 rotates 180 degrees, second gear arm 1232 of second disk 908 contacts teeth of the second plurality of gear teeth 1236 of third disk 912 causing third disk 912 to rotate. When second disk 908 rotates another 180 degrees, third gear arm 1234 of second disk 908 contacts teeth of the second plurality of gear teeth 1236 of third disk 912 causing third disk 912 to rotate. When third disk 912 rotates 270 degrees, fourth gear arm 1238 of third disk 912 contacts teeth of the third plurality of gear teeth 1242 of fourth disk 916 causing fourth disk 916 to rotate. When third disk 912 rotates another 90 degrees, fifth gear arm 1240 of third disk 912 contacts teeth of the third plurality of gear teeth 1242 of fourth disk 916 causing fourth disk 916 to rotate. The first plurality of gear teeth 1230, the second plurality of gear teeth 1236, and the third plurality of gear teeth 1242 each include 12 teeth.

The surface of first disk 904, second disk 908, third disk 912, and fourth disk 916 can be defined to each have a first quadrant area (not shown), a second quadrant area (not shown), a third quadrant area (not shown), and a fourth quadrant area (not shown) as described with reference to FIG. 3a for first disk 300. The first plurality of pins 906, the second plurality of pins 910, the third plurality of pins 914, and the fourth plurality of pins 918 are each mounted over the same quadrant of first disk 904, second disk 908, third disk 912, and fourth disk 916 as shown for example in FIGS. 12a and 12c.

With reference to FIGS. 13a, 13b, 13c, and 13d a perspective view, a side view, a top view, and a bottom view, respectively, of first disk 904 are shown in accordance with the second illustrative embodiment. First disk 904 includes a first ring 1302, a second ring 1304, and a third ring 1306. First shaft 1220 mounts to a drive shaft 1300 which mounts to actuator 902 for rotation of first shaft 1220. First ring 1302 includes one or more first raised surfaces, one or more first base surfaces, and one or more first transitions surface between the one or more first raised surfaces and the one or more first base surfaces as discussed previously with reference to the first illustrative embodiment. Second ring 1304 includes one or more second raised surfaces, one or more second base surfaces, and one or more second transitions surface between the one or more second raised surfaces and the one or more second base surfaces as discussed previously with reference to the first illustrative embodiment. Third ring 1306 includes one or more third raised surfaces, one or more third base surfaces, and one or more third transitions surface between the one or more third raised surfaces and the one or more third base surfaces as discussed previously with reference to the first illustrative embodiment. For example, the one or more third raised surfaces include a first raised surface 1308a, a second raised surface 1308b, and a third raised surface 1308c. The one or more third base surfaces include a first base surface 1310a, a second base surface 1310b, and a third base surface 1310c.

With reference to FIGS. 14a, 14b, 14c, and 14d a perspective view, a side view, a top view, and a bottom view, respectively, of second disk 908 are shown in accordance with the second illustrative embodiment. Second disk 908 includes a first ring 1400, a second ring 1402, and a third ring 1404. First ring 1400 includes one or more first raised surfaces, one or more first base surfaces, and one or more first transitions surface between the one or more first raised surfaces and the one or more first base surfaces as discussed previously with reference to the first illustrative embodiment. Second ring 1404 includes one or more second raised surfaces, one or more second base surfaces, and one or more second transitions surface between the one or more second raised surfaces and the one or more second base surfaces as discussed previously with reference to the first illustrative embodiment. Third ring 1404 includes one or more third raised surfaces, one or more third base surfaces, and one or more third transitions surface between the one or more third raised surfaces and the one or more third base surfaces as discussed previously with reference to the first illustrative embodiment.

With reference to FIGS. 15a, 15b, 15c, and 15d a perspective view, a side view, a top view, and a bottom view, respectively, of third disk 912 are shown in accordance with the second illustrative embodiment. Third disk 912 includes a first ring 1500, a second ring 1502, and a third ring 1504. First ring 1500 includes one or more first raised surfaces, one or more first base surfaces, and one or more first transitions surface between the one or more first raised surfaces and the one or more first base surfaces as discussed previously with reference to the first illustrative embodiment. Second ring 1504 includes one or more second raised surfaces, one or more second base surfaces, and one or more second transitions surface between the one or more second raised surfaces and the one or more second base surfaces as discussed previously with reference to the first illustrative embodiment. Third ring 1504 includes one or more third raised surfaces, one or more third base surfaces, and one or more third transitions surface between the one or more third raised surfaces and the one or more third base surfaces as discussed previously with reference to the first illustrative embodiment.

With reference to FIGS. 16a, 16b, 16c, and 16d a perspective view, a side view, a top view, and a bottom view, respectively, of fourth disk 916 are shown in accordance with the second illustrative embodiment. Fourth disk 916 includes a first ring 1600, a second ring 1602, a third ring 1604, and a fourth ring 1606. First ring 1500 includes one or more first raised surfaces, one or more first base surfaces, and one or more first transitions surface between the one or more first raised surfaces and the one or more first base surfaces as discussed previously with reference to the first illustrative embodiment. Second ring 1502 includes one or more second raised surfaces, one or more second base surfaces, and one or more second transitions surface between the one or more second raised surfaces and the one or more second base surfaces as discussed previously with reference to the first illustrative embodiment. Third ring 1504 includes one or more third raised surfaces, one or more third base surfaces, and one or more third transitions surface between the one or more third raised surfaces and the one or more third base surfaces as discussed previously with reference to the first illustrative embodiment. Fourth ring 1506 includes one or more third raised surfaces, one or more third base surfaces, and one or more third transitions surface between the one or more third raised surfaces and the one or more third base surfaces as discussed previously with reference to the first illustrative embodiment.

Figure 17:
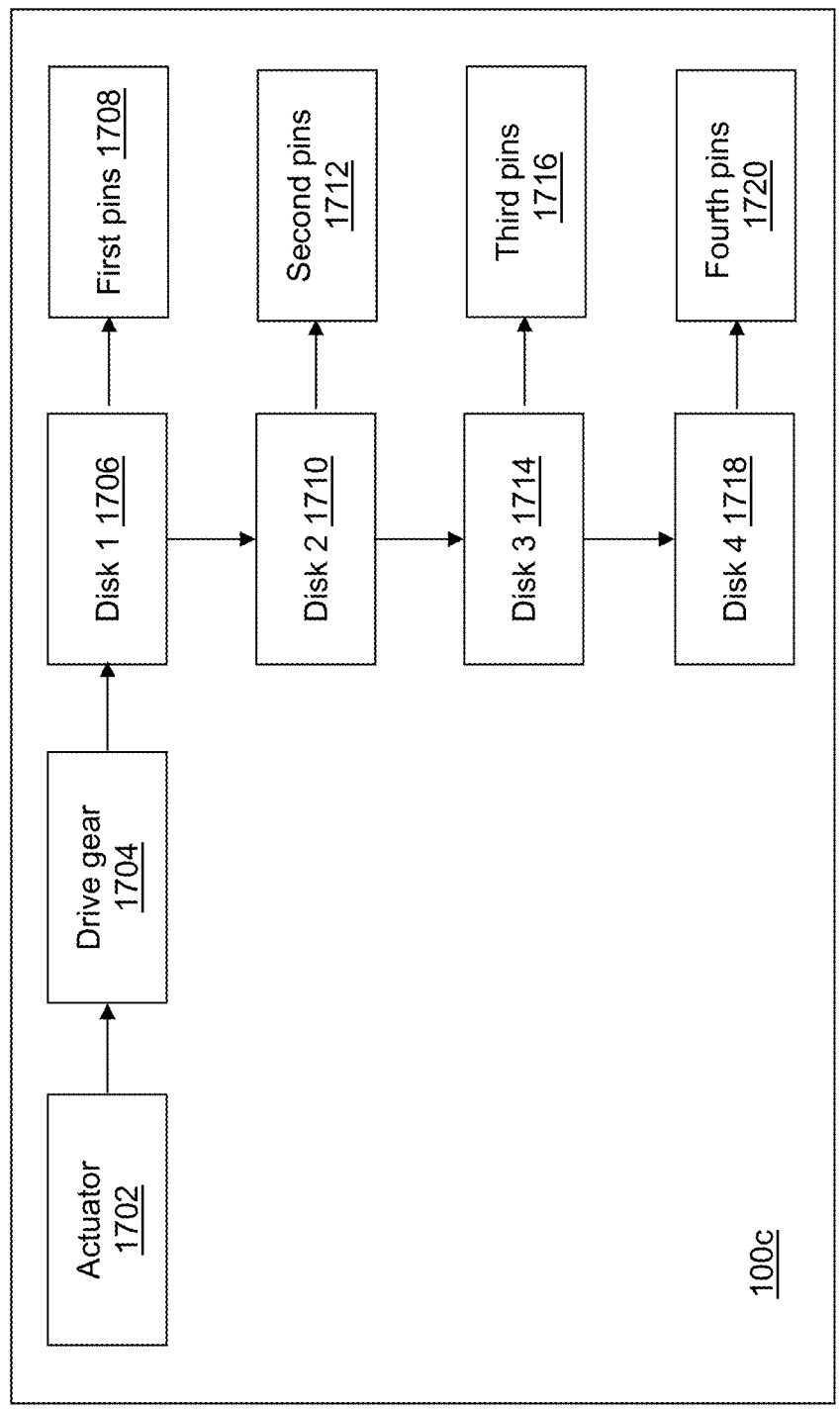
FIG. 17 depicts a block diagram of a Braille watch in accordance with a third illustrative embodiment.

With reference to FIG. 17, a block diagram of a third Braille watch 100c is shown in accordance with a third illustrative embodiment. In the third illustrative embodiment, third Braille watch 100c may include an actuator 1702, a drive gear 1704, a plurality of disks, and a plurality of pins associated with each of the plurality of disks. Different and additional or fewer components may be incorporated into Braille watch 100c. For example, third Braille watch 100c also includes a power source (not shown) to power the electrical components of third Braille watch 100c. The mechanical components of third Braille watch 100c may be formed of a variety of materials including metal, plastic, wood, etc.

Similar to Braille watch 100a, the number of the plurality of disks of third Braille watch 100c depends on the time parameters selected for display using third Braille watch 100c. In the illustrative embodiment, the plurality of disks of third Braille watch 100c include a first disk 1706, a second disk 1710, a third disk 1714, and a fourth disk 1718, which display the time in hours and minutes though the same principles described herein can be applied to include additional or fewer disks and to display different time parameter information such as the seconds, the day, the month, the year, etc.

A first plurality of pins 1708 are mounted to first disk 1706. In the third illustrative embodiment, the first plurality of pins 1708 include four pins used to display a single number in the Braille language in a manner similar to that discussed previously using raised surfaces. A second plurality of pins 1712 are mounted to second disk 1710. In the third illustrative embodiment, the second plurality of pins 1712 include four pins used to display a single number in the Braille language in a manner similar to that discussed previously using raised, transition, and base surfaces. A third plurality of pins 1716 are mounted to third disk 1714. In the third illustrative embodiment, the third plurality of pins 1716 include four pins used to display a single number in the Braille language in a manner similar to that discussed previously using raised surfaces. A fourth plurality of pins 1720 are mounted to fourth disk 1718. In the third illustrative embodiment, the fourth plurality of pins 1720 include five pins used to display a single number in the Braille language in a manner similar to that discussed previously using raised surfaces and an am/pm pin to indicate that the time is either am or pm.

In the third illustrative embodiment, each of first disk 1706, second disk 1710, third disk 1714, and fourth disk 1718 rotate 360 degrees and are linked through one or more gear arms and a plurality of gear teeth. Actuator 1702 controls rotation of drive gear 1704 which controls rotation of first disk 1706 through the one or more gear arms and the plurality of gear teeth. First disk 1706 in turn controls rotation of second disk 1710 through the one or more gear arms and the plurality of gear teeth. Second disk 1710 in turn controls rotation of third disk 1714 through the one or more gear arms and the plurality of gear teeth, and third disk 1714 in turn controls rotation of fourth disk 1718 through the one or more gear arms and the plurality of gear teeth. Using the one or more gear arms and the plurality of gear teeth, actuator 1702 may rotate at a constant angular velocity appropriate based on the time parameter displayed with first disk 1706 and the one or more gear arms and the plurality of gear teeth mounted to first disk 1706.

In the illustrative embodiment, the surface of each of first disk 1706, second disk 1710, and third disk 1714 is divided into three rings: an outer ring, a middle ring, and an inner ring, each of which contain raised, transition, and base surfaces formed in the face of the respective disk. The surface of fourth disk 1718 is divided into four rings: an outer ring, a first middle ring, a second middle ring, and an inner ring, each of which contain raised, transition, and base surfaces formed in the face of fourth disk 1718. As first disk 1706, second disk 1710, and third disk 1714 rotate through the gear mechanism interconnecting the disks, the associated pins are raised and lowered to display the desired numbers. As described with reference to Braille watch 100a, if a pin is positioned on the raised surface, the head portion of the pin extends above a top surface of third Braille watch 100c a sufficient amount to be perceived by a user. If not, the head portion of the pin remains approximately flush with the top surface of third Braille watch 100c. When the associated disk rotates to different positions, different combinations of pins are raised or lowered.

Each disk surface may be unique because each disk displays a different set of numbers when the hours and minutes are displayed. First disk 1706 displays numbers 0-9, second disk 1710 displays numbers 0-5, third disk 1714 displays numbers 1-9 and 0-2, and fourth disk 1718 displays numbers 0-1. Fourth disk 1718 also contains a fourth ring for an am/pm pin. In an illustrative embodiment, a raised am/pm pin may signify PM and a lowered am/pm pin may signify AM though, of course, this may be reversed.

If third Braille watch 100c is structured to present the seconds time parameter, a first disk may display numbers 0-9 and a second disk may display numbers 0-5 similar to the minutes time parameter. If third Braille watch 100c is structured to present the day time parameter, a first disk may display numbers 1-9, 0-9, 0-9, and 0-1 and a second disk may display numbers 0-3. If third Braille watch 100c is structured to present the month time parameter, a first disk may display numbers 1-9 and 0-2 and a second disk may display numbers 0-1 similar to the hours time parameter. If third Braille watch 100c is structured to present the year time parameter in two digits, a first disk may display numbers 0-9 and a second disk may display numbers 0-9. If third Braille watch 100c is structured to present the year time parameter in four digits, a first disk may display numbers 0-9, a second disk may display numbers 0-9, a third disk may display numbers 0-9, and a fourth disk may display numbers 1-2. Of course, Braille watch 100a, second Braille watch 100b, and third Braille watch 100c may include from one to 10 disks or more depending on the set of time parameters to be displayed.

With reference to FIGS. 18a, 18b, 18c, and 18d show a front perspective view, a top view, a right side perspective view, and a front side view, respectively, of four disk and pin assemblies arranged to indicate the Braille number "0916" in accordance with the third illustrative embodiment. FIG. 18e shows a front perspective view of a gearing mechanism of the four disk and pin assemblies of FIGS. 18a, 18b, 18c, and 18d in accordance with the third illustrative embodiment.

With reference to FIGS. 18a, 18b, 18c, and 18d a front perspective view, a top view, a right side perspective view, and a front side view, respectively, of a four disk and pin assembly 1800 arranged to indicate the Braille number "0916" are shown in accordance with the third illustrative embodiment. Four disk and pin assembly 1800 may include first disk 1706, second disk 1710, third disk 1714, fourth disk 1718, the first plurality of pins 1708, the second plurality of pins 1712, the third plurality of pins 1716, and the fourth plurality of pins 1720, and a base plate 1802. The fourth plurality of pins 1720 include a fifth pin 1819 used to indicate whether the time is am or pm. A first shaft 1820 mounts first disk 1706 to base plate 1802. A second shaft 1822 mounts second disk 1710 to base plate 1802. A third shaft 1824 mounts third disk 1714 to base plate 1802. A fourth shaft 1826 mounts fourth disk 1718 to base plate 1802. A first gear arm 1828 is mounted to first shaft 1820 to rotate with first shaft 1820 and first disk 1706. A first plurality of gear teeth 1830 are mounted to second shaft 1822 to rotate second shaft 1822 when first gear arm 1828 contacts one tooth of the first plurality of gear teeth 1830. A second gear arm 1832 and a third gear arm 1834 are mounted to second shaft 1822 to rotate with second shaft 1822 and second disk 1710. A second plurality of gear teeth 1836 are mounted to third shaft 1824 to rotate third shaft 1824 when either second gear arm 1832 or third gear arm 1834 contact one tooth of the second plurality of gear teeth 1836. A fourth gear arm 1838 and a fifth gear arm 1840 are mounted to third shaft 1824 to rotate with third shaft 1824 and third disk 1714. A third plurality of gear teeth 1842 are mounted to fourth shaft 1826 to rotate fourth shaft 1826 when either fourth gear arm 1838 or fifth gear arm 1840 contact one tooth of the third plurality of gear teeth 1842.

Thus, in the illustrative embodiment of FIGS. 18a, 18b, 18c, and 18d, when first disk 1706 rotates 360 degrees, first gear arm 1828 of first disk 1706 contacts teeth of the first plurality of gear teeth 1830 causing second disk 1710 to rotate. When second disk 1710 rotates 180 degrees, second gear arm 1832 of second disk 1710 contacts teeth of the second plurality of gear teeth 1836 of third disk 1714 causing third disk 1714 to rotate. When second disk 1710 rotates another 180 degrees, third gear arm 1834 of second disk 1710 contacts teeth of the second plurality of gear teeth 1836 of third disk 1714 causing third disk 1714 to rotate. When third disk 1714 rotates 270 degrees, fourth gear arm 1838 of third disk 1714 contacts teeth of the third plurality of gear teeth 1842 of fourth disk 1718 causing fourth disk 1718 to rotate. When third disk 1714 rotates another 90 degrees, fifth gear arm 1840 of third disk 1714 contacts teeth of the third plurality of gear teeth 1842 of fourth disk 1718 causing fourth disk 1718 to rotate. The first plurality of gear teeth 1830, the second plurality of gear teeth 1836, and the third plurality of gear teeth 1842 each include 12 teeth. Of course, other gear ratios may be used.

The surface of first disk 1706, second disk 1710, third disk 1714, and fourth disk 1718 can be defined to each have a first quadrant area (not shown), a second quadrant area (not shown), a third quadrant area (not shown), and a fourth quadrant area (not shown) as described with reference to FIG. 3a for first disk 300. The first plurality of pins 1708 and the third plurality of pins 1716 are each mounted over the same quadrant of first disk 904 and third disk 912 as shown for example in FIG. 18b. For example, with reference to the view of FIG. 18b, the first plurality of pins 1708 and the third plurality of pins 1716 are each mounted over a lower left quadrant of first disk 904 and third disk 912. The second plurality of pins 1712 and the fourth plurality of pins 1720 are each mounted over the same quadrant of second disk 908 and fourth disk 916 as shown for example in FIG. 18b as an upper right quadrant.

Figure 18A:
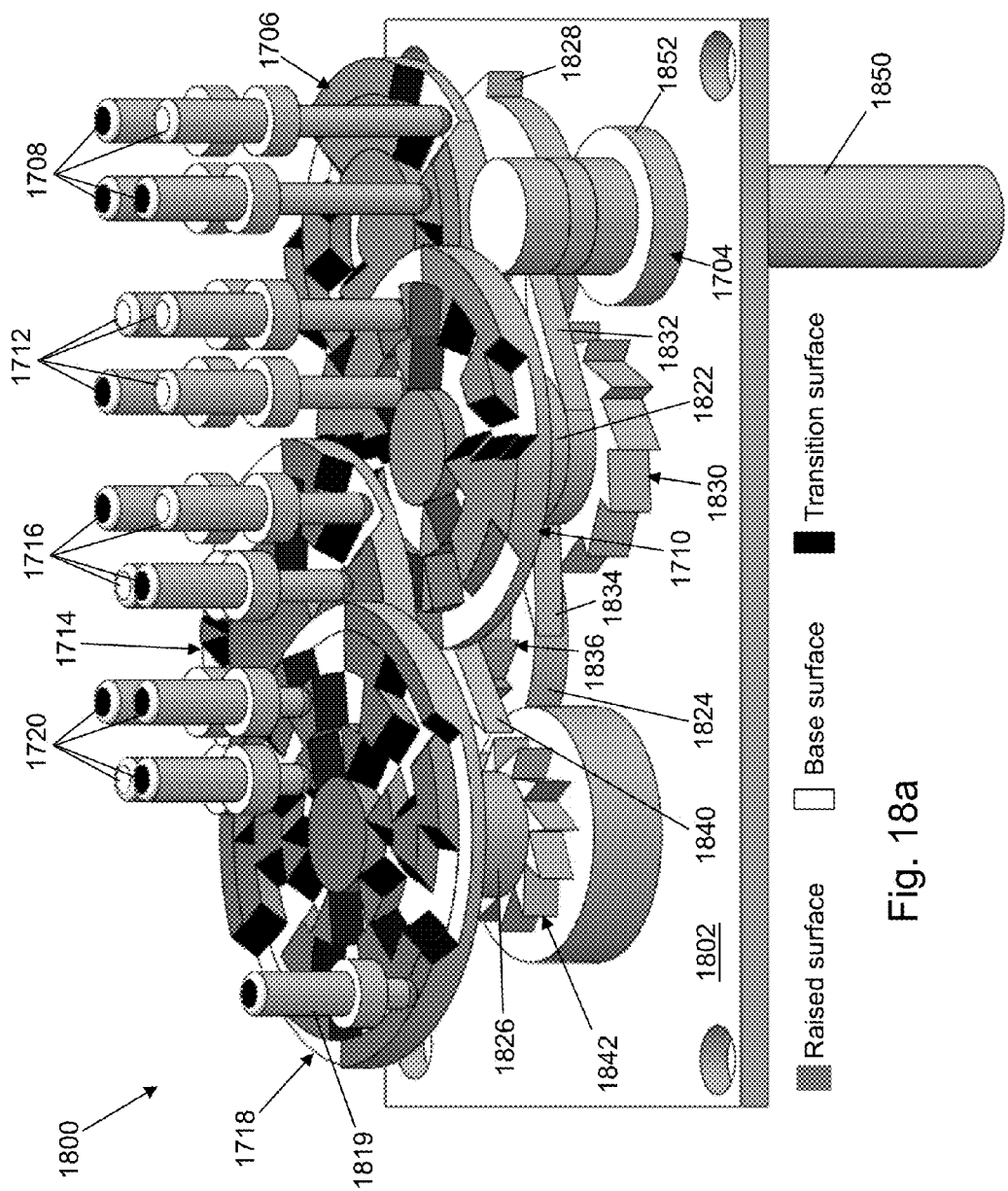
FIGS. 18a, 18b, 18c, and 18d show a front perspective view, a top view, a right side perspective view, and a front side view, respectively, of four disk and pin assemblies arranged to indicate the Braille number "0916" and "PM" in accordance with the third illustrative embodiment.
Figure 18B:
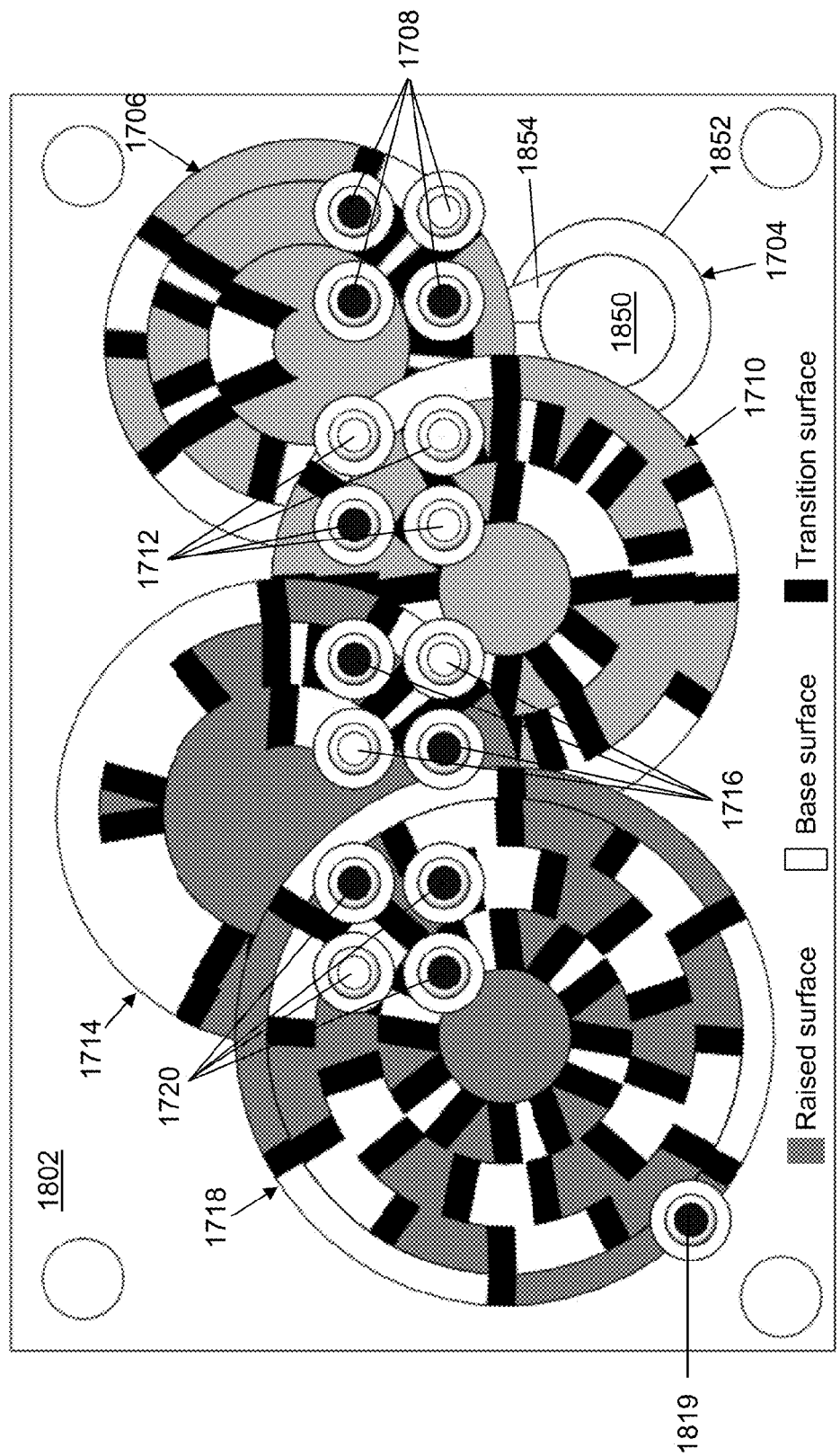
Figure 18C:
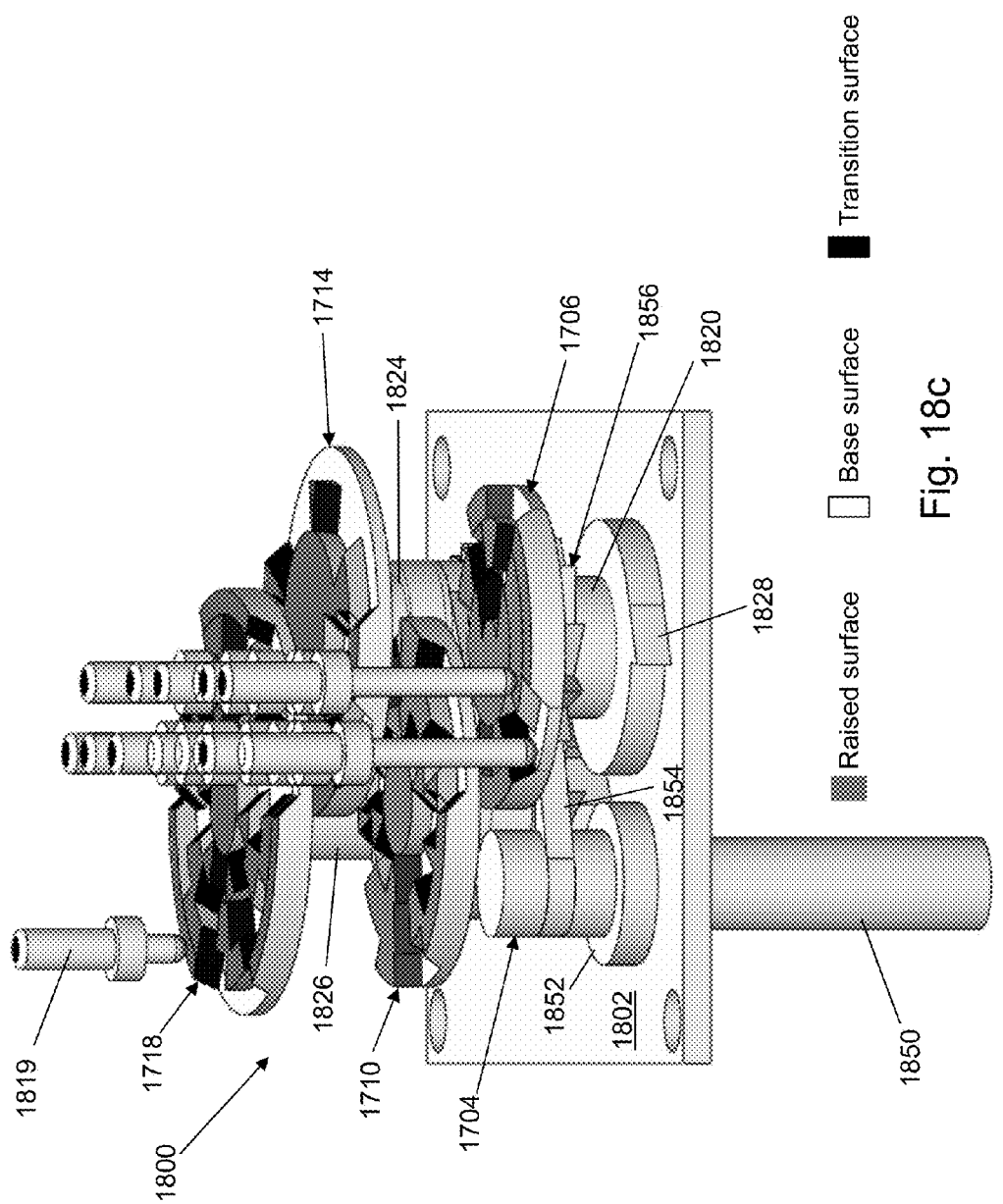
Figure 18D:
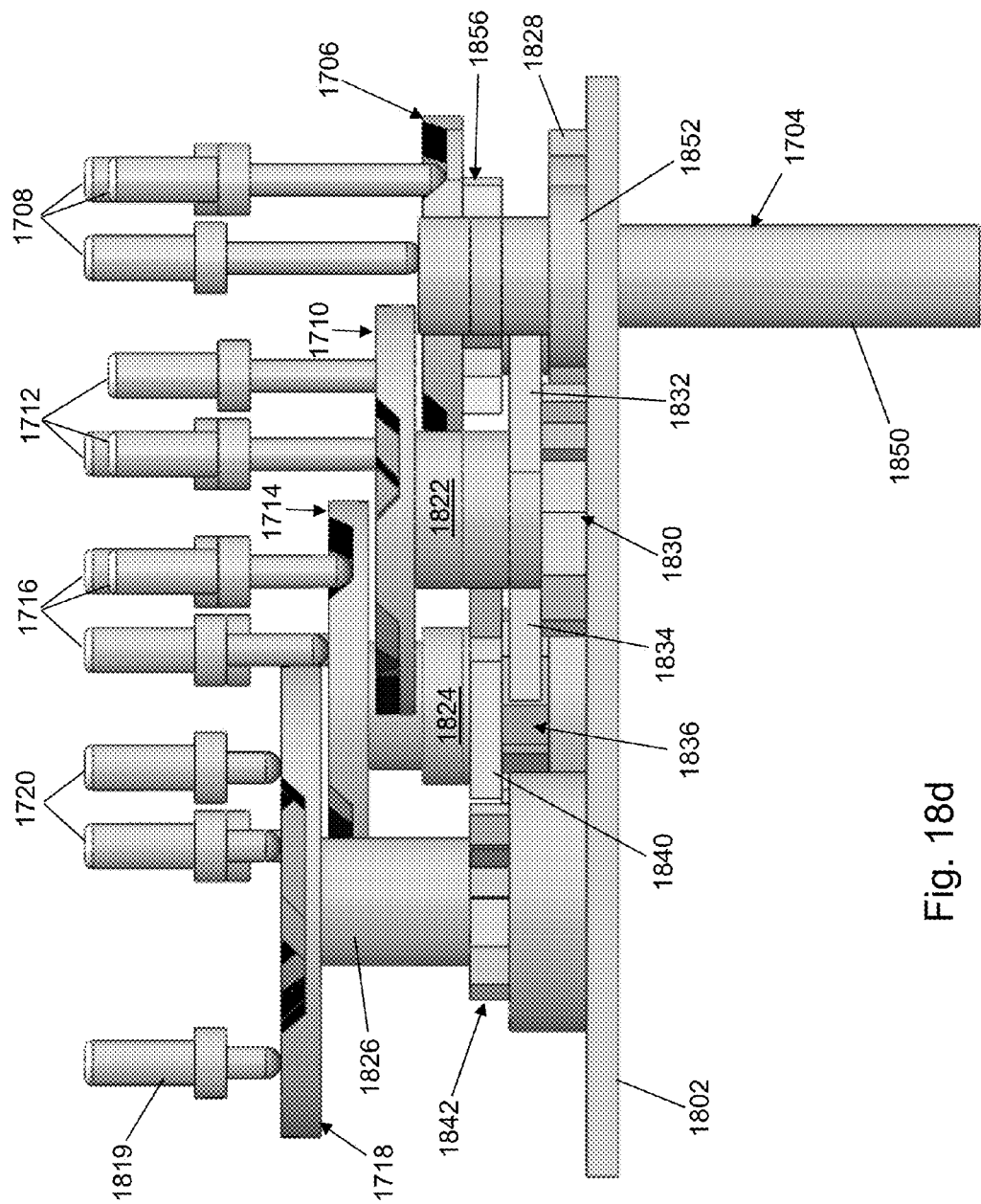
Figure 18E:
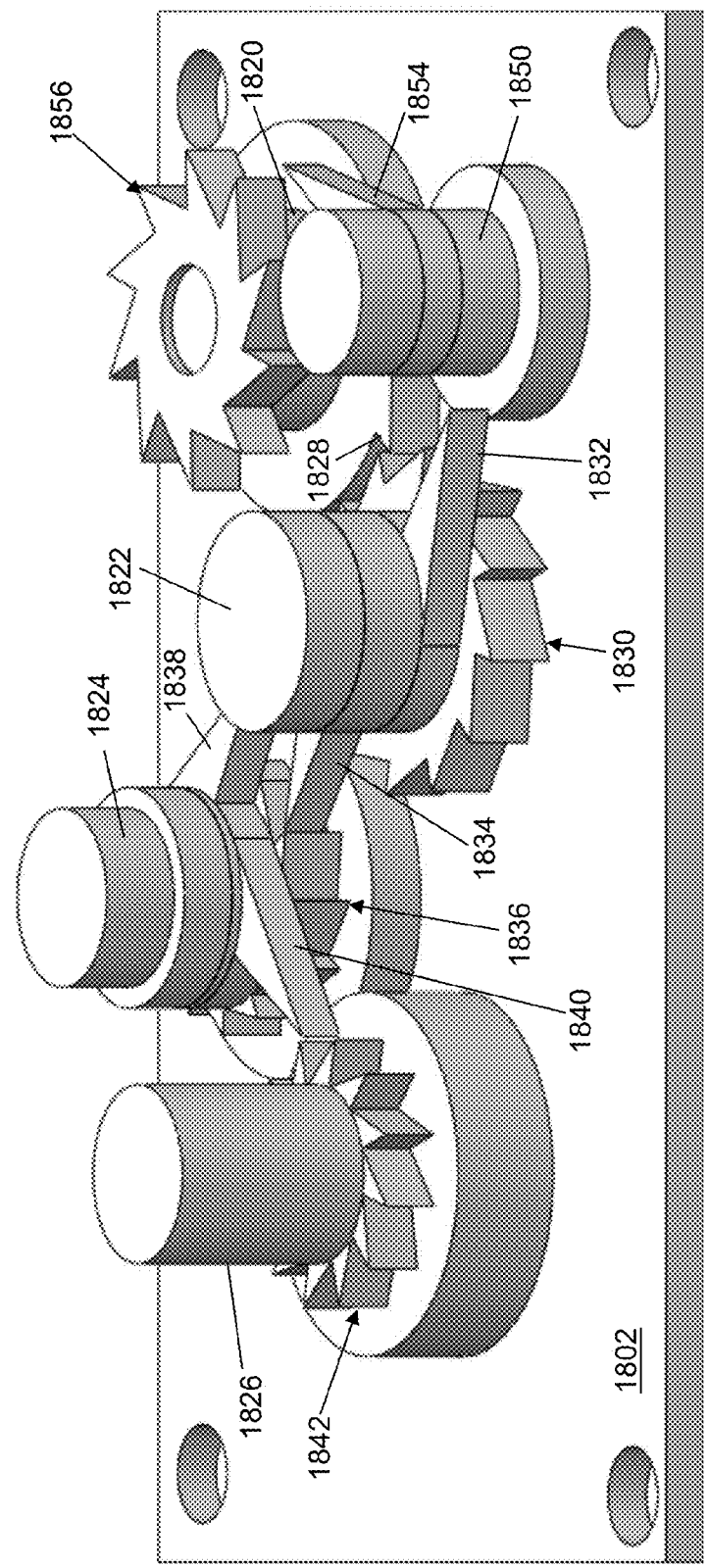
FIG. 18e shows a front perspective view of a gearing mechanism of the four disk and pin assemblies of FIGS. 18a, 18b, 18c, and 18d in accordance with the third illustrative embodiment.

Second disk 1710 is mounted to spatially overlap with first disk 1706 when viewed from above as shown in FIG. 18b. Third disk 1714 is mounted to spatially overlap with second disk 1710 when viewed from above as shown in FIG. 18b. Fourth disk 1718 is mounted to spatially overlap with second disk 1710 and with third disk 1714 when viewed from above as shown in FIG. 18b.

First disk 1706 is connected to drive gear 1704. Drive gear 1704 includes a drive shaft 1850, a drive platform 1852, and a drive arm 1854. Drive shaft 1850 connects to actuator 1702 for rotation of drive shaft 1850. Drive arm 1854 is mounted to drive shaft 1850 to rotate with drive shaft 1850. Drive platform 1852 is mounted to encircle drive shaft 1850 to keep drive gear 1704 from falling out of base plate 1802. A fourth plurality of gear teeth 1856 are mounted to first shaft 1820 to rotate first shaft 1820 when drive arm 1854 contacts one tooth of the fourth plurality of gear teeth 1856. In the illustrative embodiment, the fourth plurality of gear teeth 1856 includes 10 teeth.

Figure 19A:
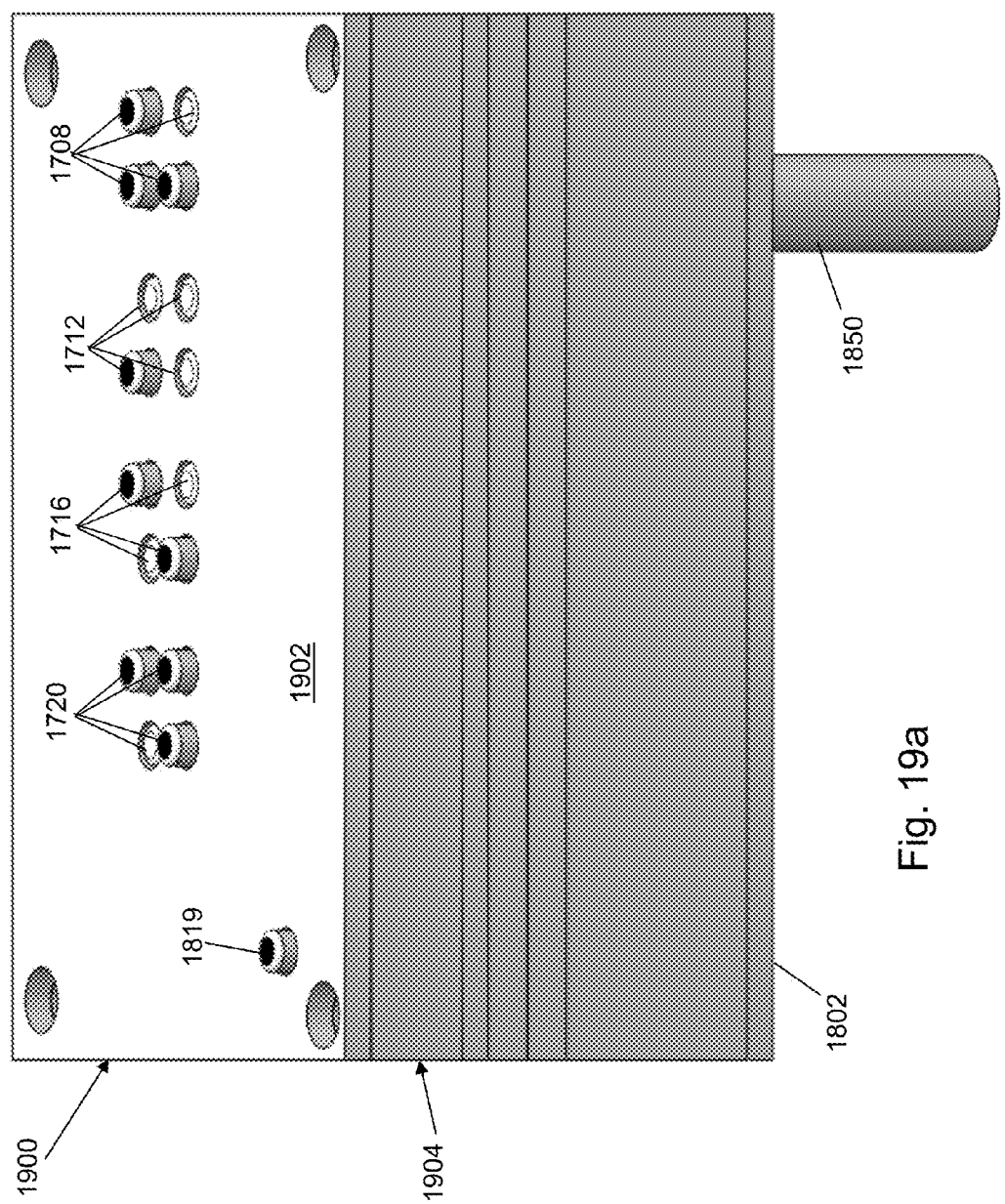
FIGS. 19a and 19b show a front perspective view and a top view, respectively, of a Braille watch assembly arranged to indicate the Braille number "0916" in accordance with the third illustrative embodiment.
Figure 19B:
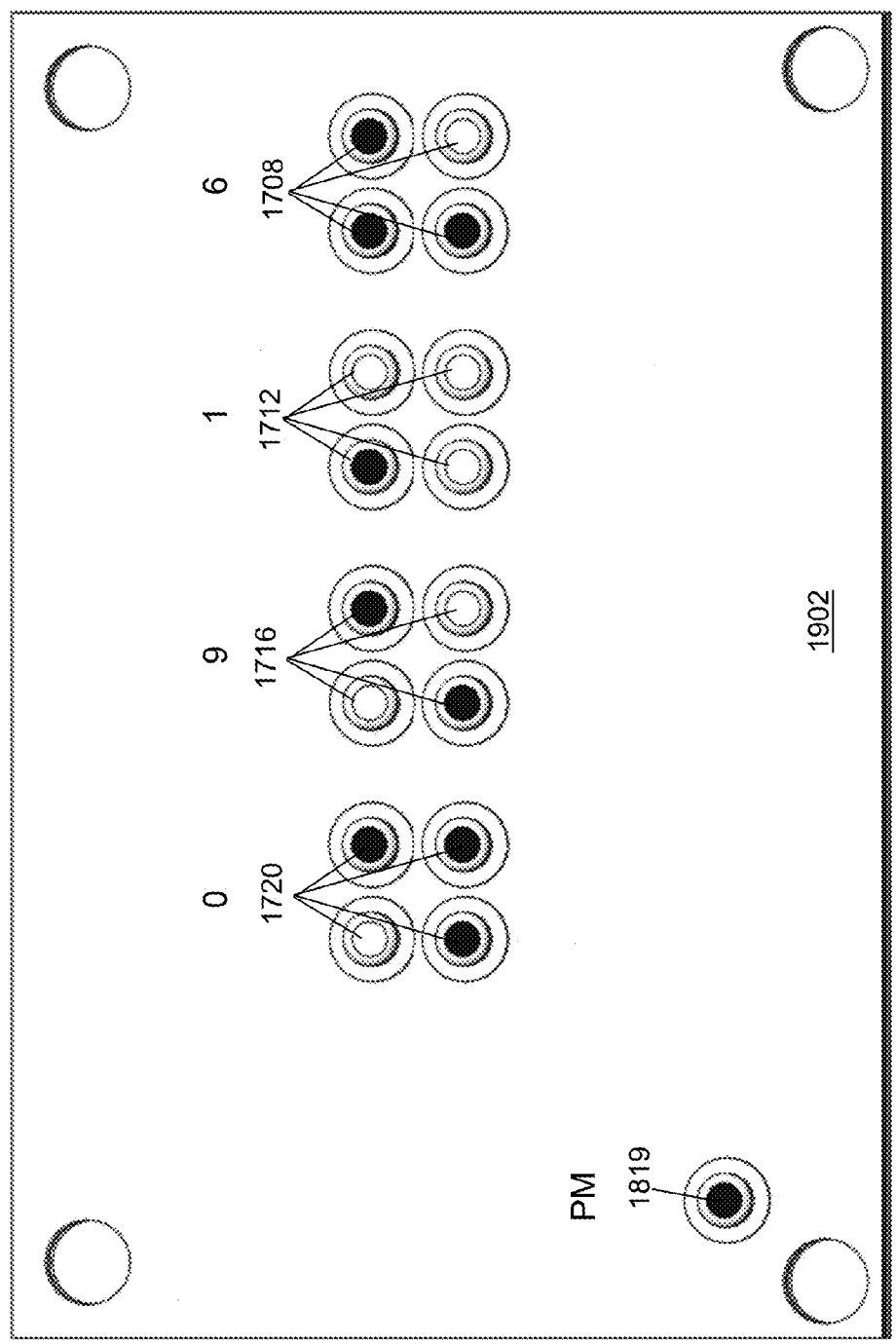

With reference to FIGS. 19a and 19b, a front perspective view and a top view, respectively, of a Braille watch assembly arranged to indicate the Braille number "0916" in accordance with the third illustrative embodiment. A housing 1900 of third Braille watch 100c includes base plate 1802, a top plate 1902, and a plurality of walls.

With reference to FIGS. 20a, 20b, 20c, and 20d a perspective view, a side view, a top view, and a bottom view, respectively, of first disk 1706 are shown in accordance with the third illustrative embodiment. First disk 1706 includes a first ring 2000, a second ring 2002, and a third ring 2004. First ring 2000 includes one or more first raised surfaces, one or more first base surfaces, and one or more first transitions surface between the one or more first raised surfaces and the one or more first base surfaces as discussed previously with reference to the first illustrative embodiment. Second ring 2002 includes one or more second raised surfaces, one or more second base surfaces, and one or more second transitions surface between the one or more second raised surfaces and the one or more second base surfaces as discussed previously with reference to the first illustrative embodiment. Third ring 2004 includes one or more third raised surfaces, one or more third base surfaces, and one or more third transitions surface between the one or more third raised surfaces and the one or more third base surfaces as discussed previously with reference to the first illustrative embodiment.

Figure 20B:
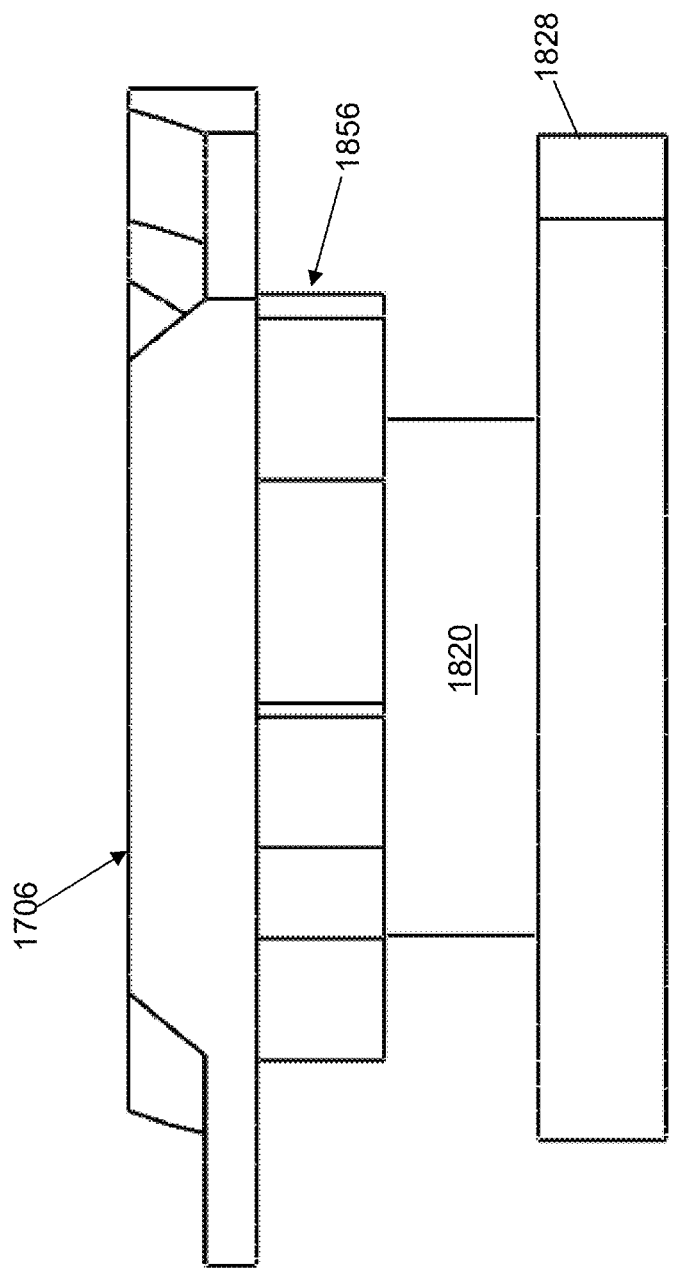
Figure 20D:
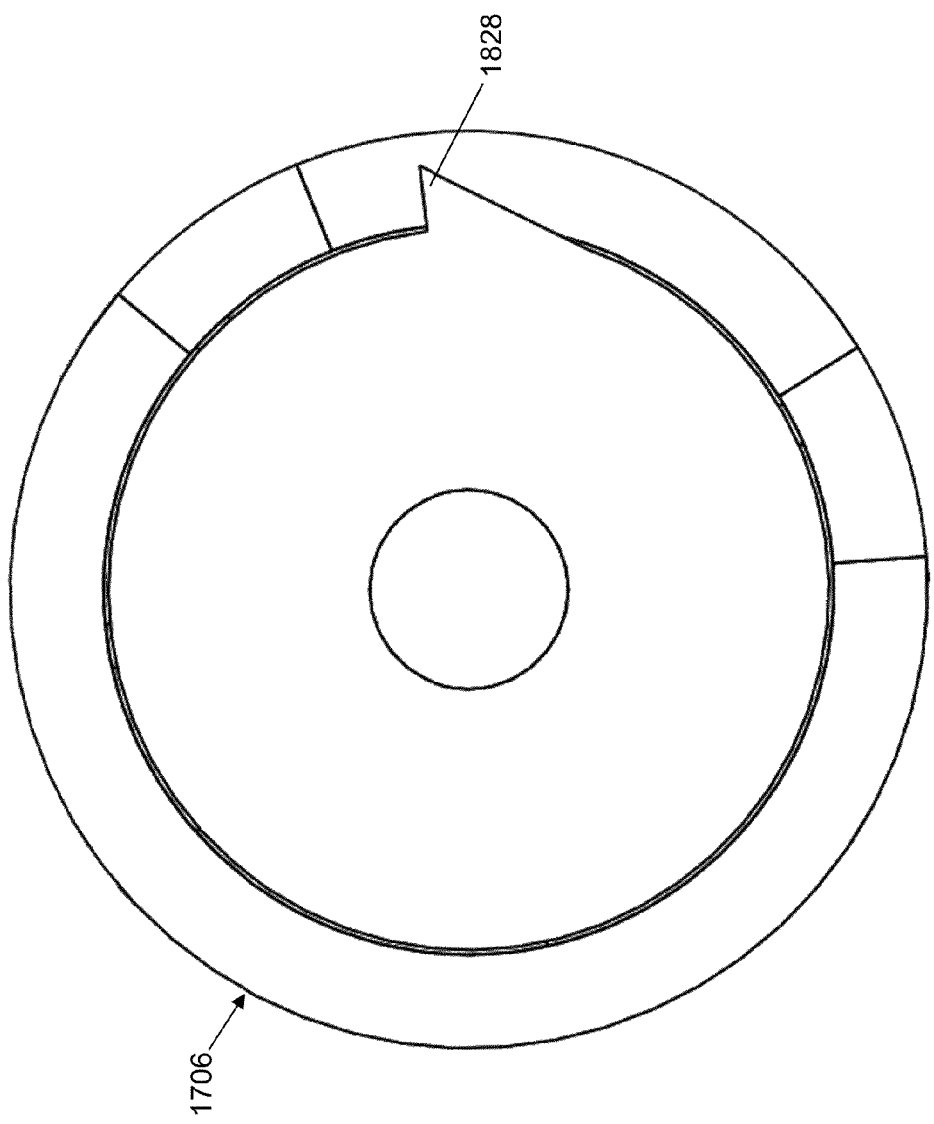
Figure 20E:
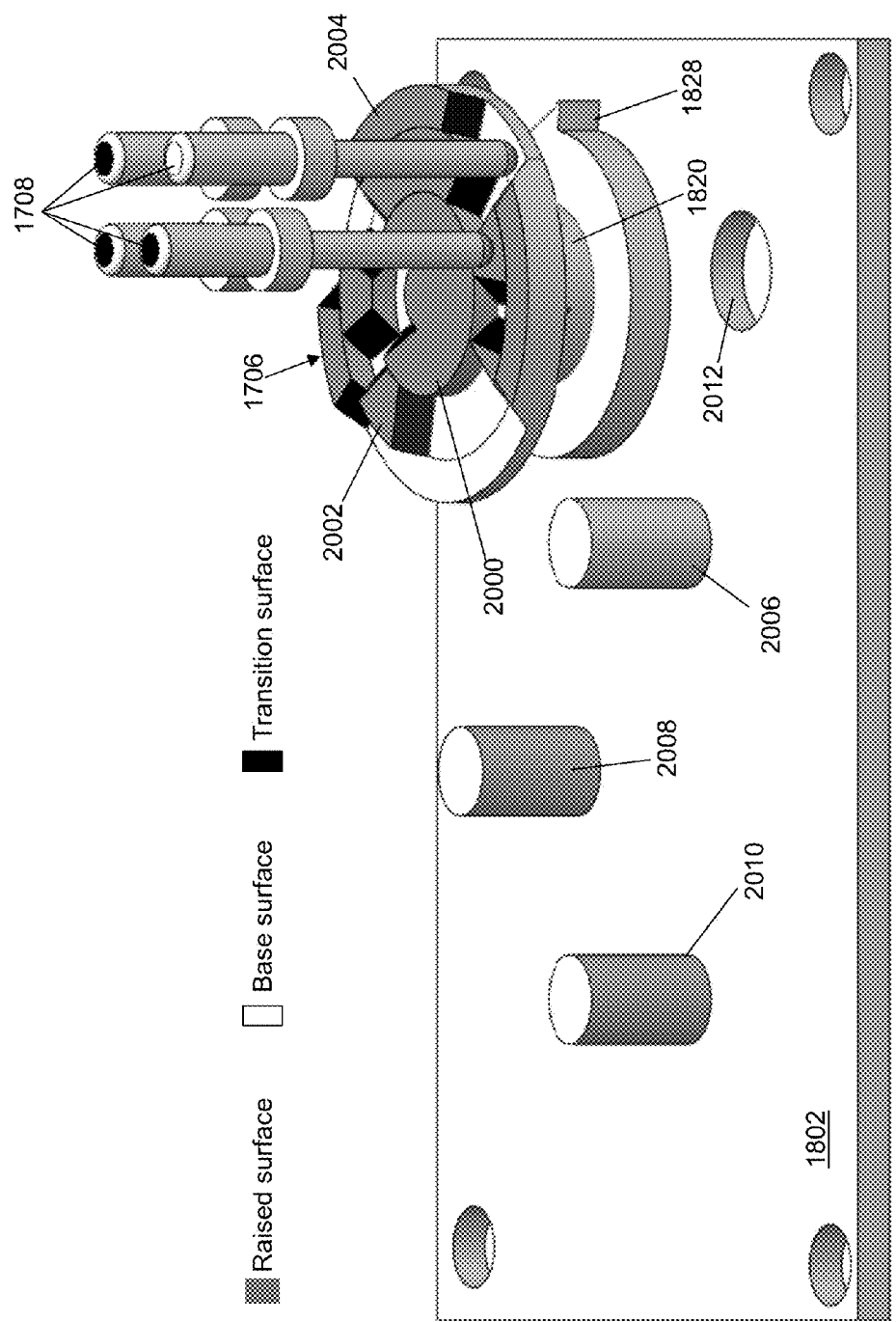
FIGS. 20e and 20f show a front perspective view and a top view of the first disk of FIGS. 20a, 20b, 20c, and 20d mounted on the Braille watch assembly of FIGS. 19a and 19b and rotated to indicate the Braille number "6" in accordance with the third illustrative embodiment.
Figure 20F:
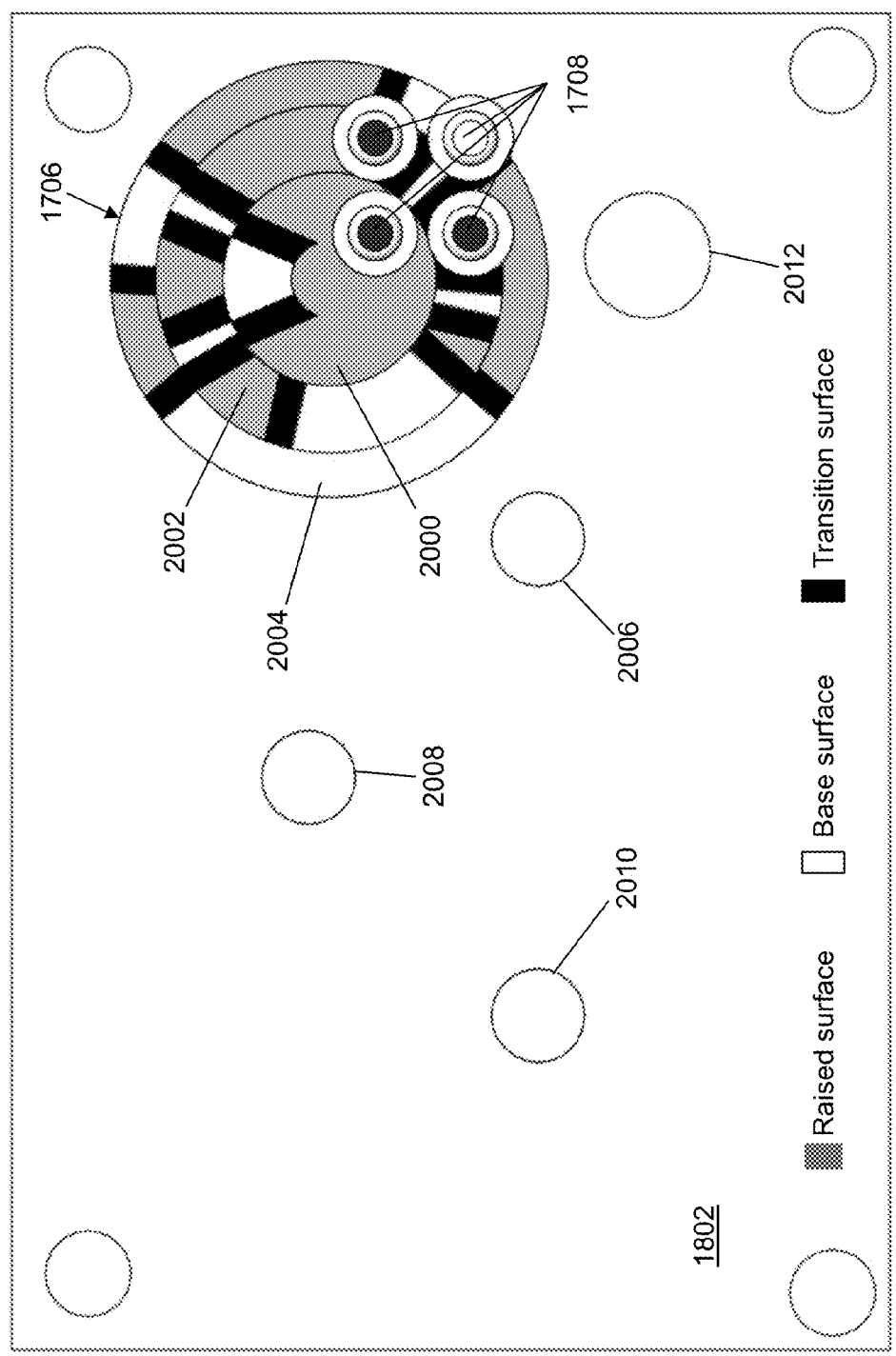

With reference to FIGS. 20e and 20f, a front perspective view and a top view of first disk 1706 of FIGS. 20a, 20b, 20c, and 20d mounted on the Braille watch assembly of FIGS. 19a and 19b and rotated to indicate the Braille number "6" in accordance with the third illustrative embodiment. Base plate 1802 includes a first mounting post 2006, a second mounting post 2008, and a third mounting post 2010. Second disk 1710 is mounted to rotate about first mounting post 2006. Third disk 1714 is mounted to rotate about second mounting post 2008. Fourth disk 1718 is mounted to rotate about third mounting post 2010. An aperture 2012 is formed in base plate 1802 to accommodate drive shaft 1850, but to be smaller in diameter than drive platform 1852.

With reference to FIGS. 21a, 21b, 21c, and 21d a perspective view, a side view, a top view, and a bottom view, respectively, of second disk 1710 are shown in accordance with the second illustrative embodiment. Second disk 1710 includes a first ring 2100, a second ring 2102, and a third ring 2104. First ring 2100 includes one or more first raised surfaces, one or more first base surfaces, and one or more first transitions surface between the one or more first raised surfaces and the one or more first base surfaces as discussed previously with reference to the first illustrative embodiment. Second ring 2104 includes one or more second raised surfaces, one or more second base surfaces, and one or more second transitions surface between the one or more second raised surfaces and the one or more second base surfaces as discussed previously with reference to the first illustrative embodiment. Third ring 2104 includes one or more third raised surfaces, one or more third base surfaces, and one or more third transitions surface between the one or more third raised surfaces and the one or more third base surfaces as discussed previously with reference to the first illustrative embodiment.

Figure 21A:
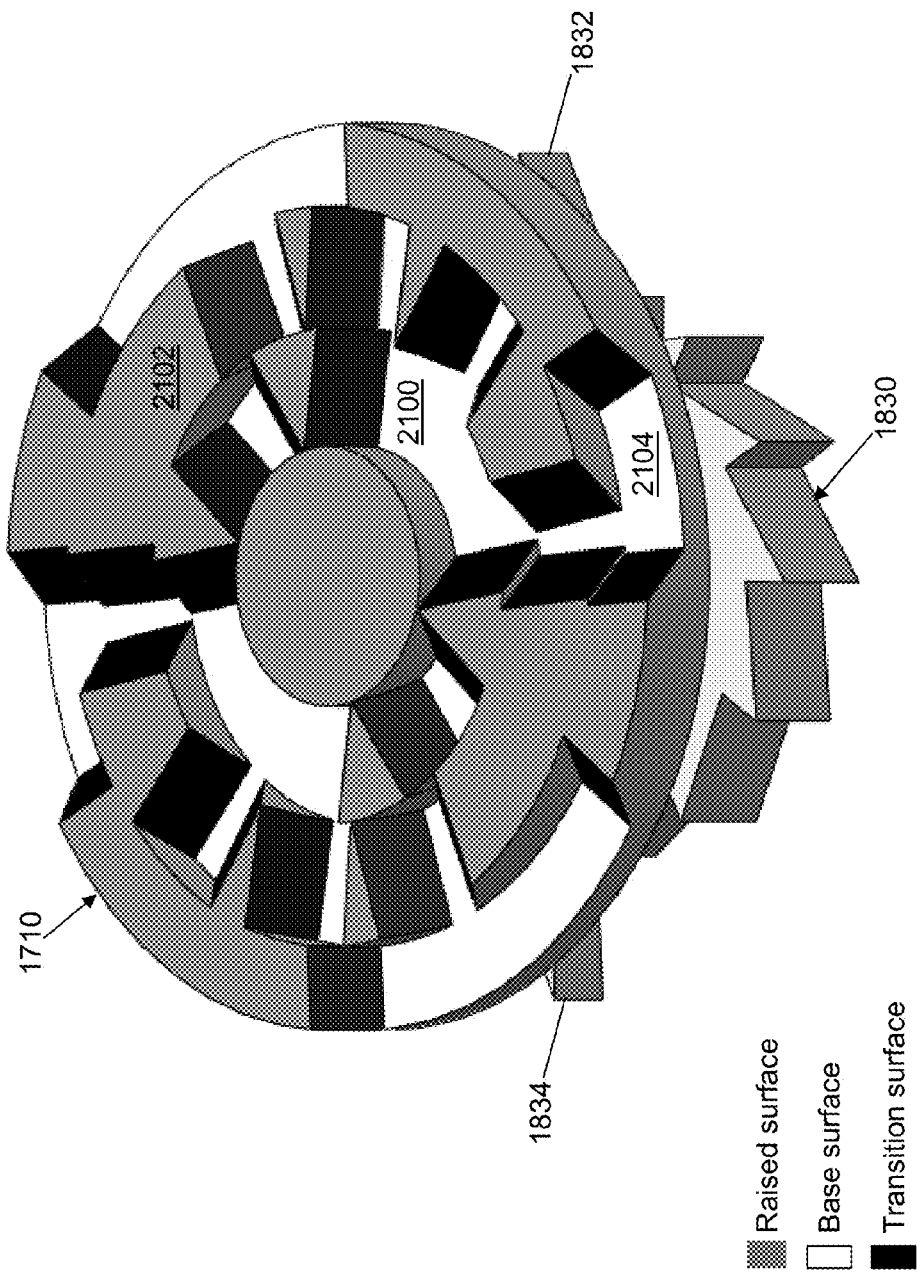
FIGS. 21a, 21b, 21c, and 21d show a perspective view, a side view, a top view, and a bottom view, respectively, of a second disk of the four disk and pin assemblies of FIG. 17 in accordance with the third illustrative embodiment.
Figure 21B:
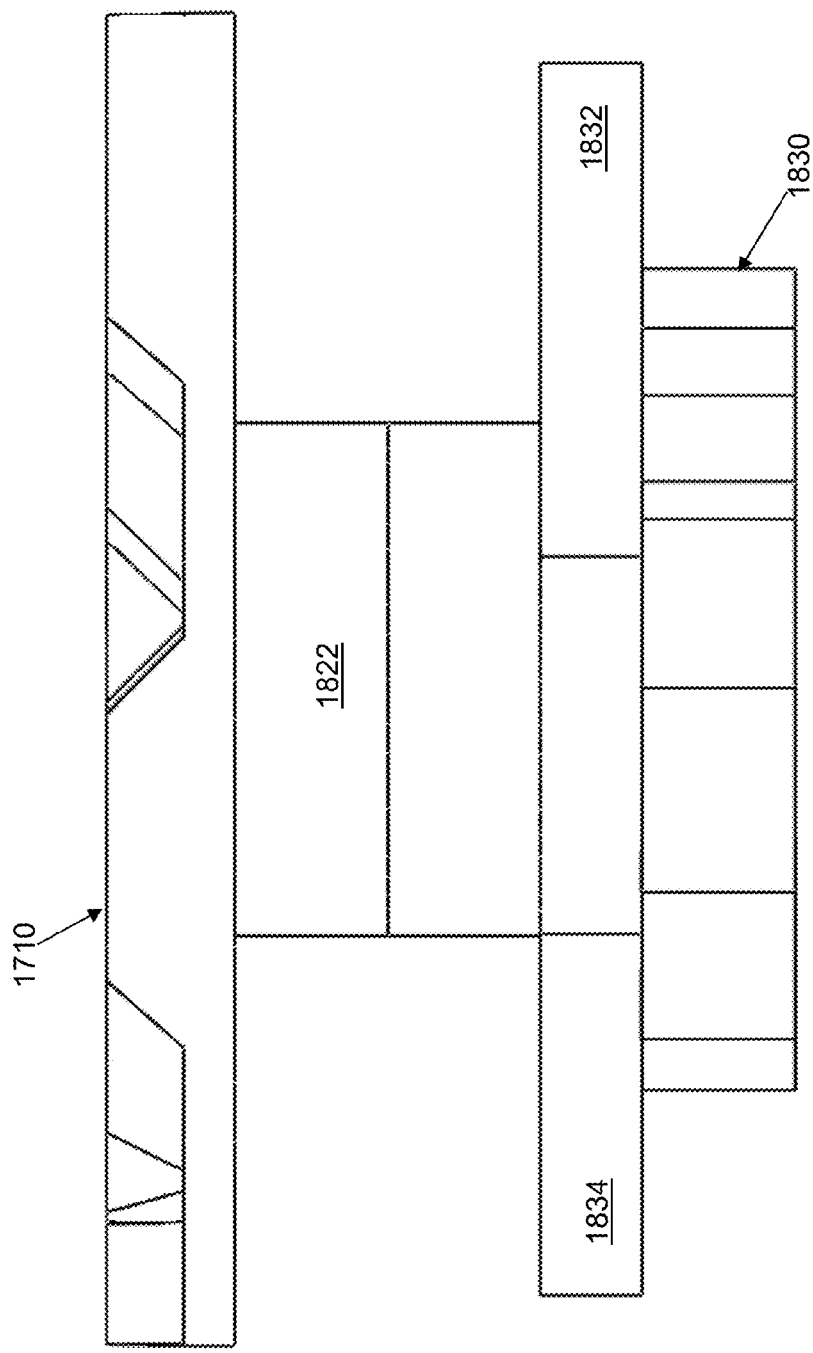
Figure 21C:
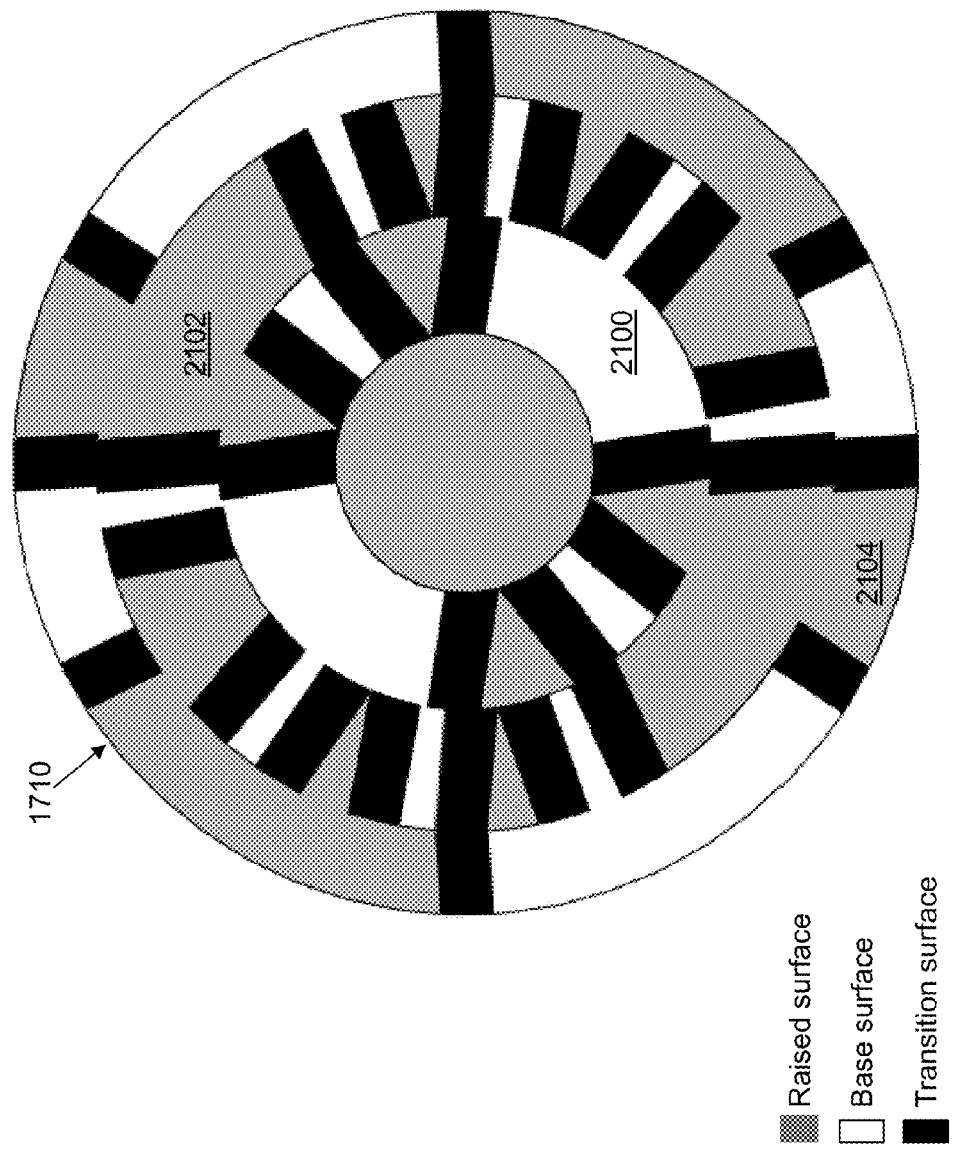
Figure 21D:
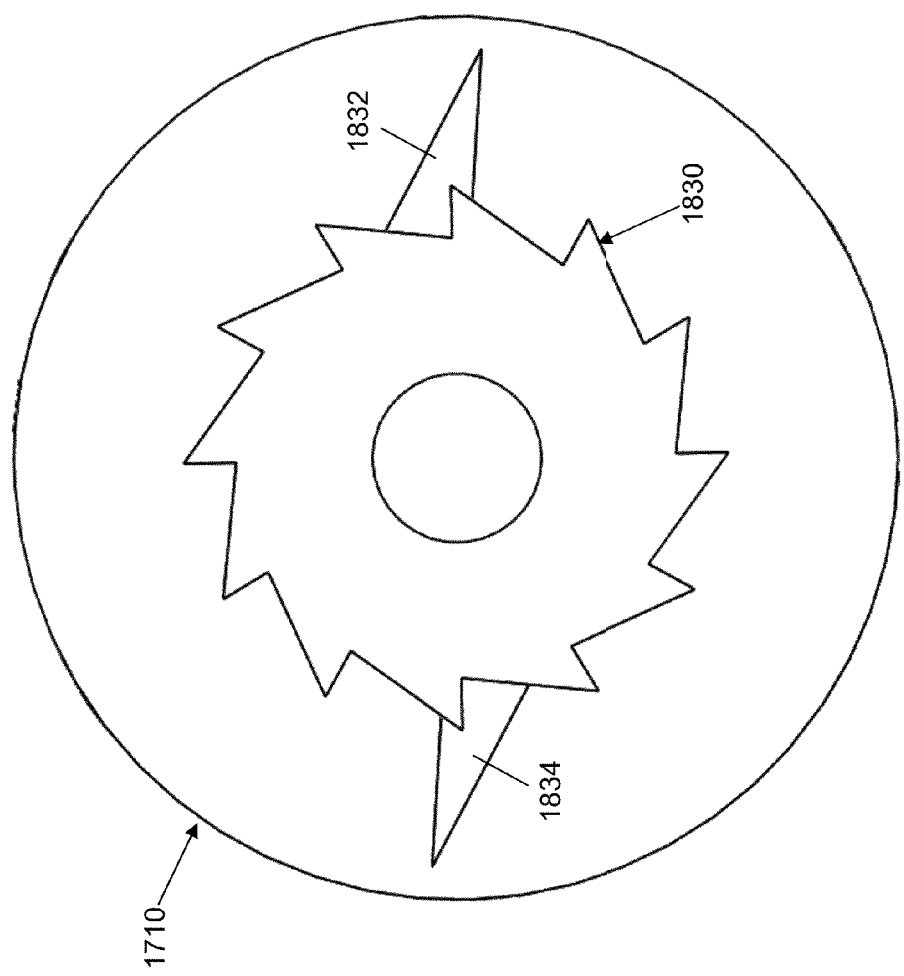
Figure 21E:
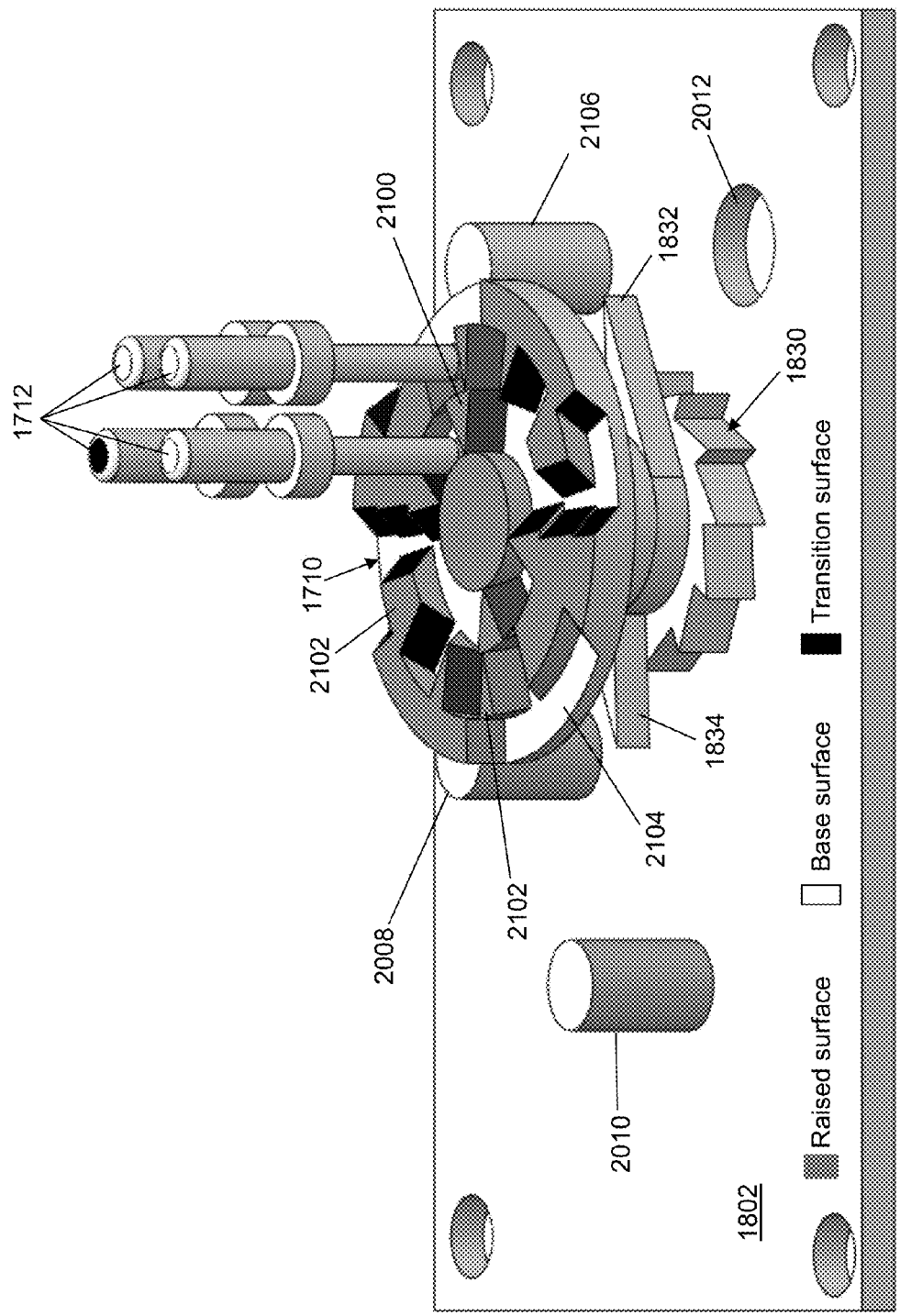
FIGS. 21e and 21f show a front perspective view and a top view of the second disk of FIGS. 21a, 21b, 21c, and 21d mounted on the Braille watch assembly of FIGS. 19a and 19b and rotated to indicate the Braille number "1" in accordance with the third illustrative embodiment.
Figure 21F:
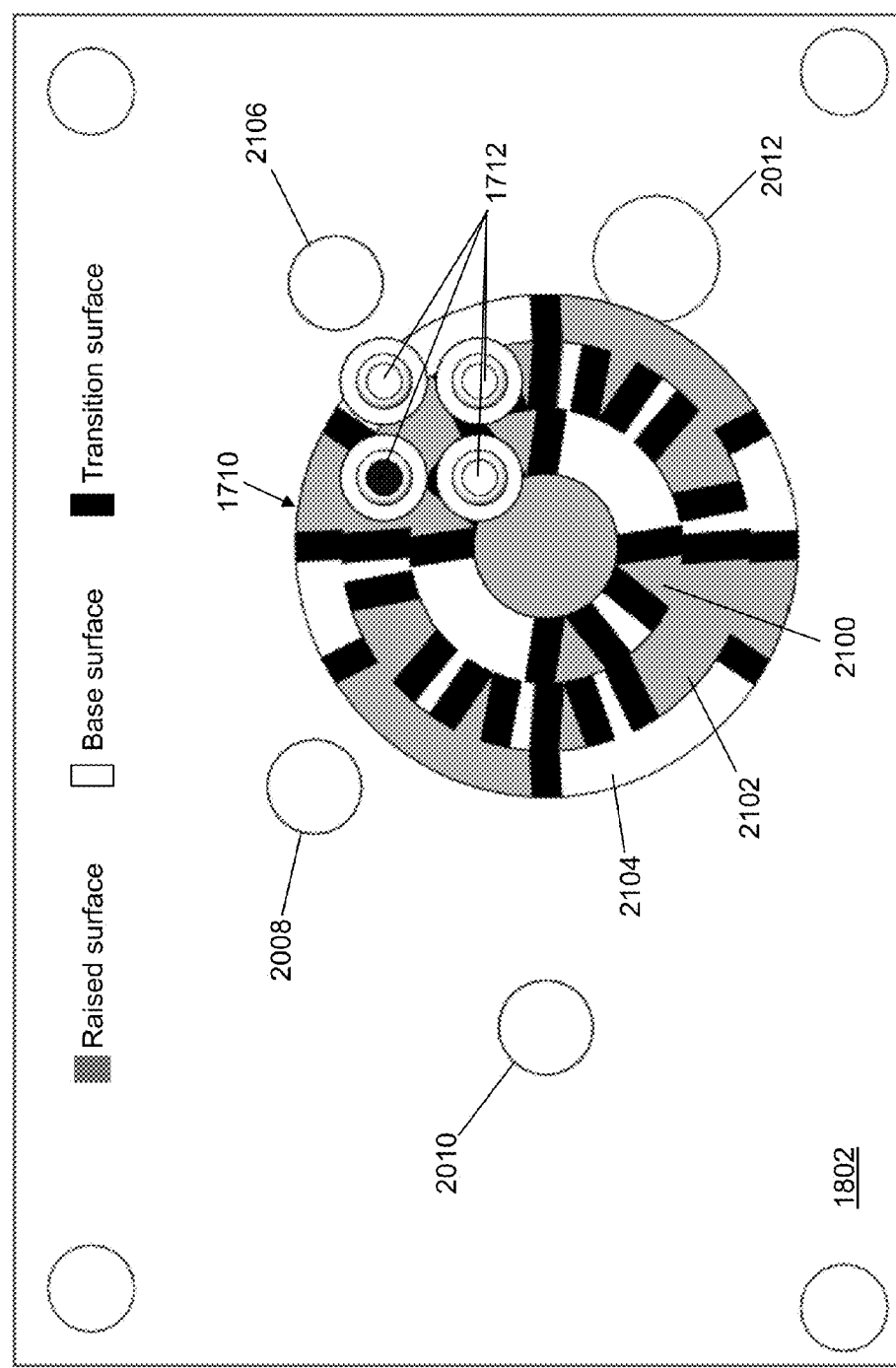

With reference to FIGS. 21e and 21f, a front perspective view and a top view of second disk 1710 of FIGS. 21a, 21b, 21c, and 21d mounted on the Braille watch assembly of FIGS. 19a and 19b and rotated to indicate the Braille number "1" in accordance with the third illustrative embodiment. Base plate 1802 further includes a fourth mounting post 2106. First disk 1706 is mounted to rotate about fourth mounting post 2106.

With reference to FIGS. 22a, 22b, 22c, and 22d a perspective view, a side view, a top view, and a bottom view, respectively, of third disk 1714 are shown in accordance with the second illustrative embodiment. Third disk 1714 includes a first ring 2200, a second ring 2202, and a third ring 2204. First ring 2200 includes one or more first raised surfaces, one or more first base surfaces, and one or more first transitions surface between the one or more first raised surfaces and the one or more first base surfaces as discussed previously with reference to the first illustrative embodiment. Second ring 2204 includes one or more second raised surfaces, one or more second base surfaces, and one or more second transitions surface between the one or more second raised surfaces and the one or more second base surfaces as discussed previously with reference to the first illustrative embodiment. Third ring 2204 includes one or more third raised surfaces, one or more third base surfaces, and one or more third transitions surface between the one or more third raised surfaces and the one or more third base surfaces as discussed previously with reference to the first illustrative embodiment.

Figure 22A:
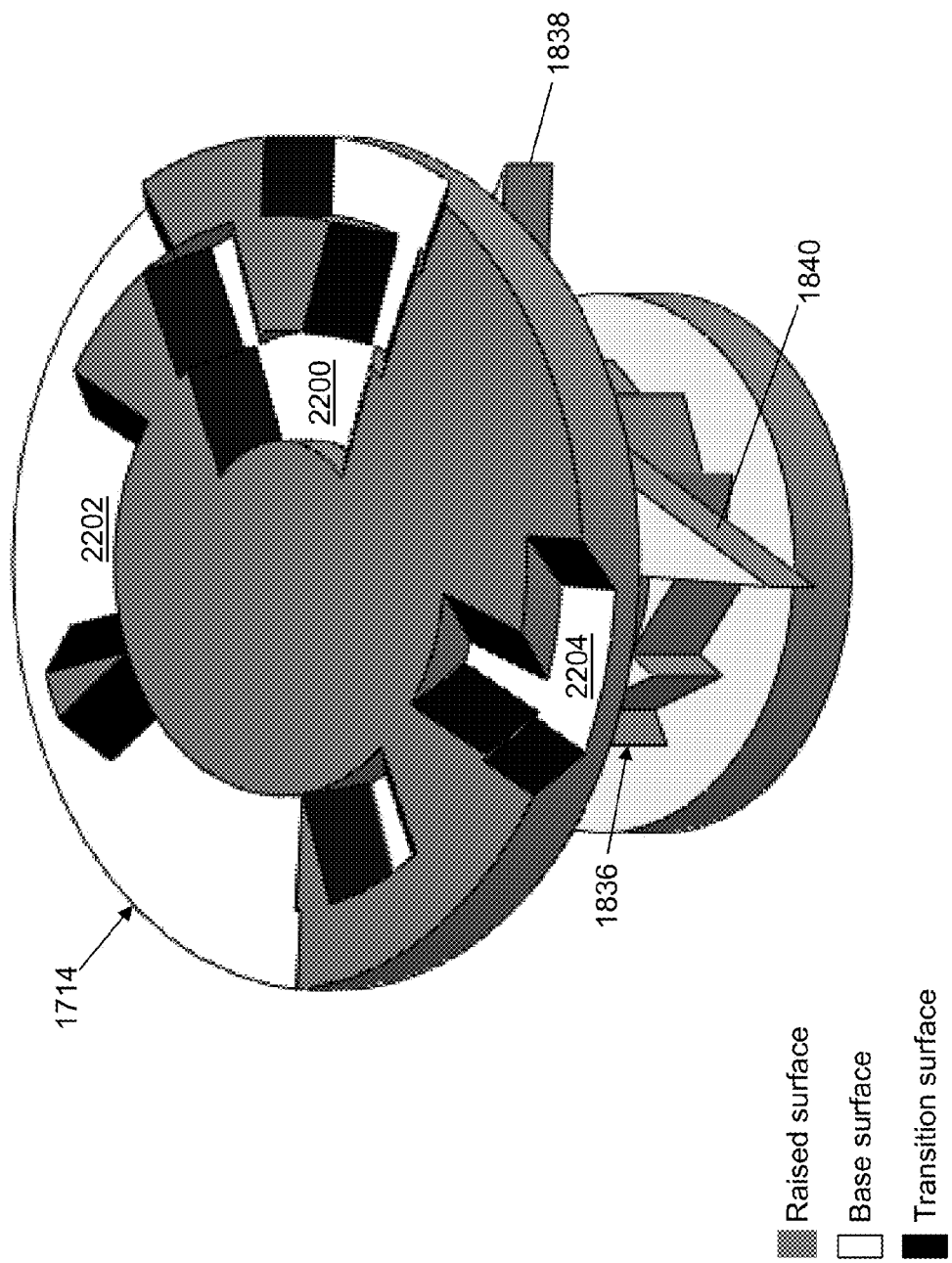
Figure 22B:
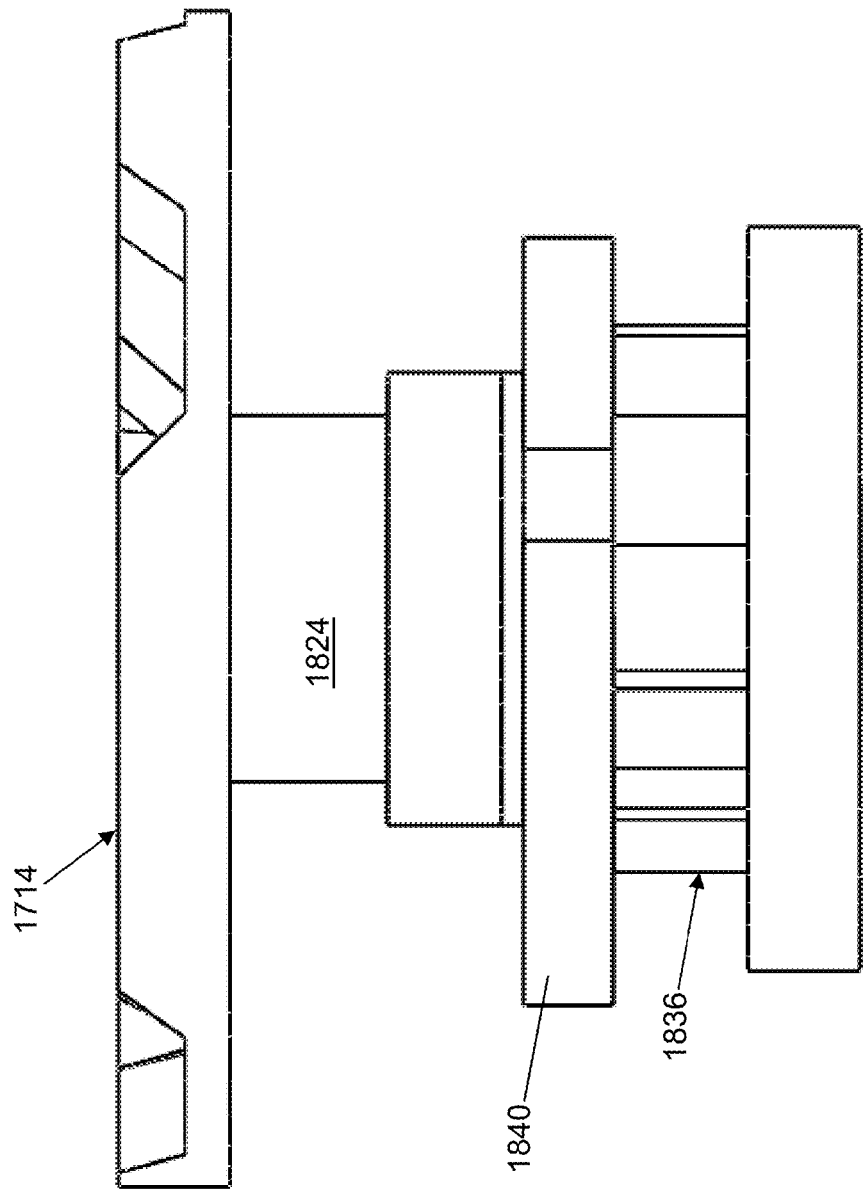
Figure 22D:
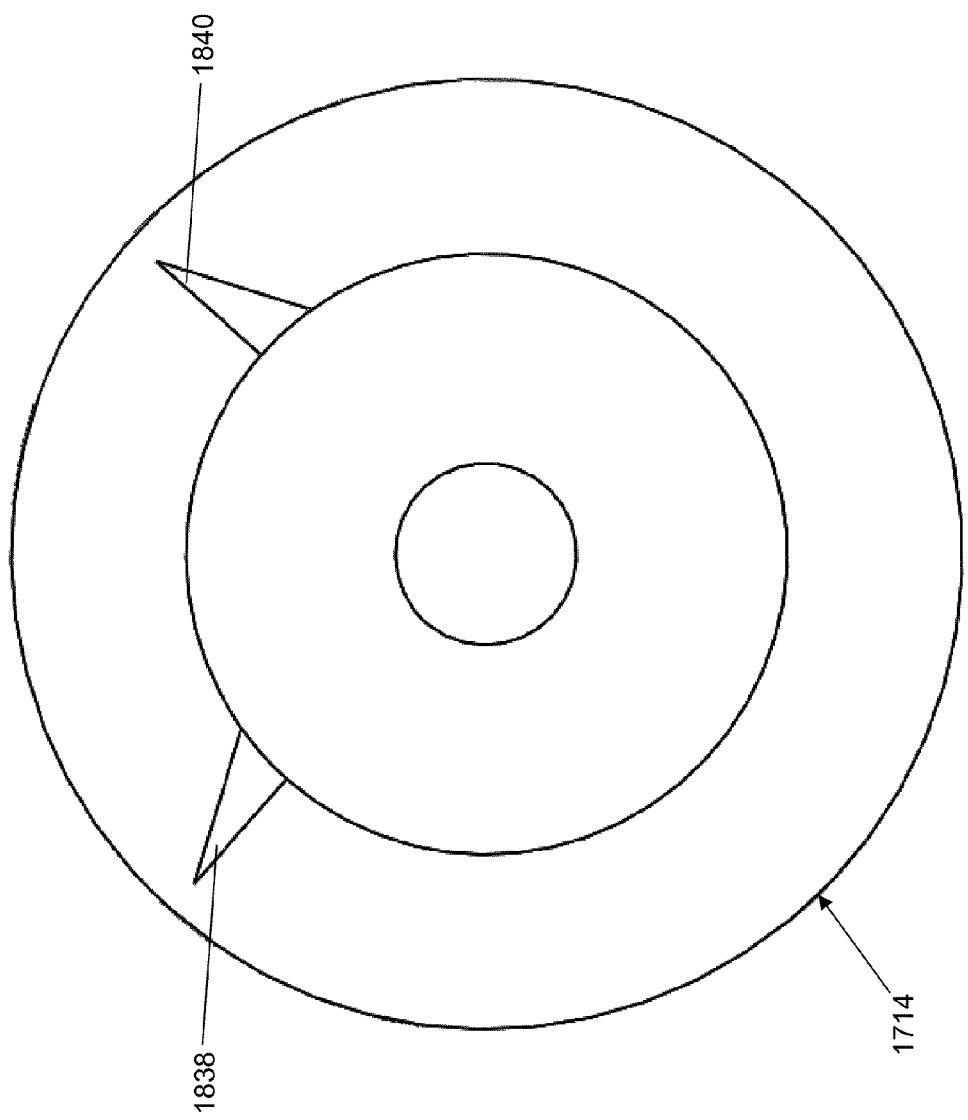
Figure 22E:
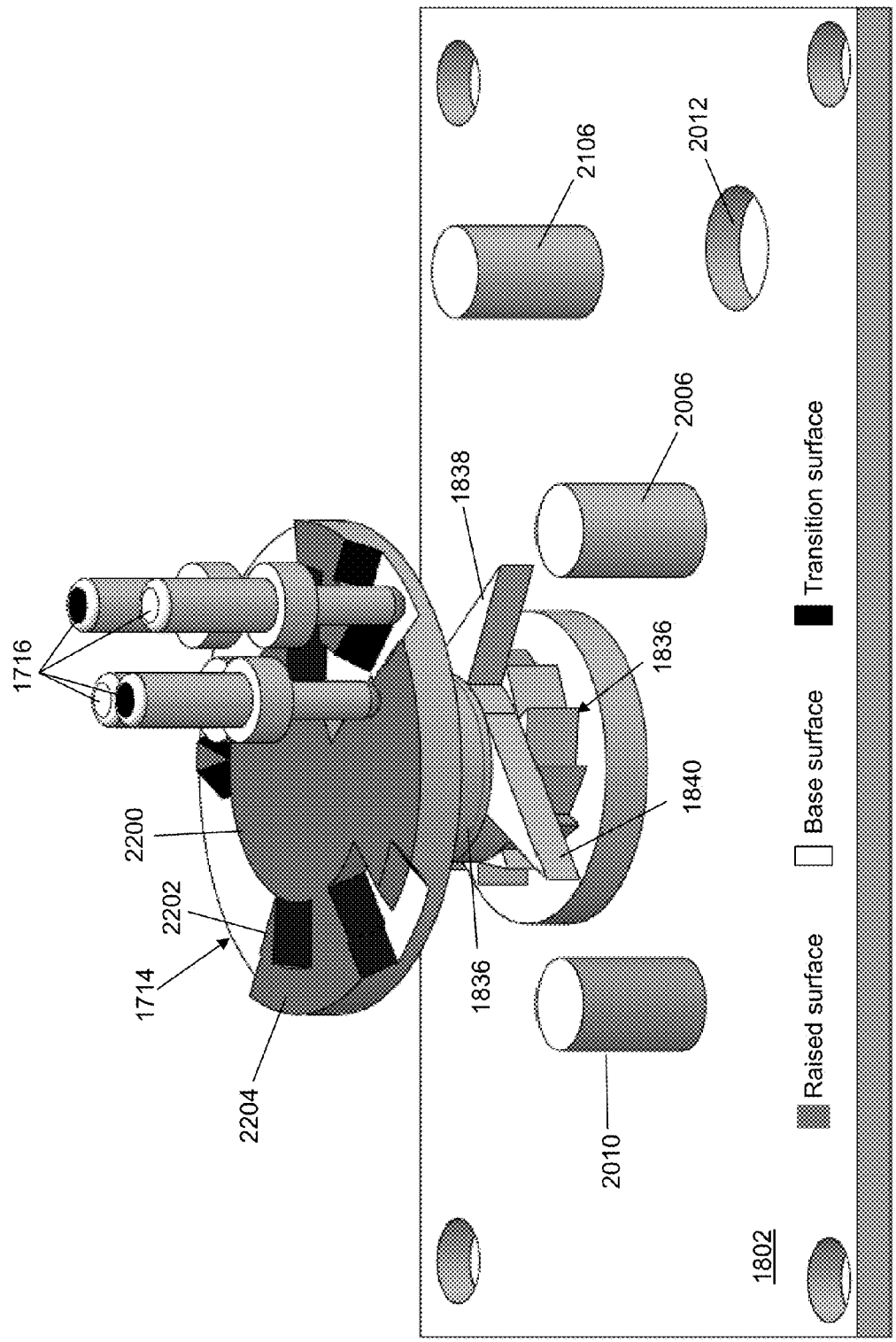
FIGS. 22e and 22f show a front perspective view and a top view of the third disk of FIGS. 22a, 22b, 22c, and 22d mounted on the Braille watch assembly of FIGS. 19a and 19b and rotated to indicate the Braille number "9" in accordance with the third illustrative embodiment.
Figure 22F:
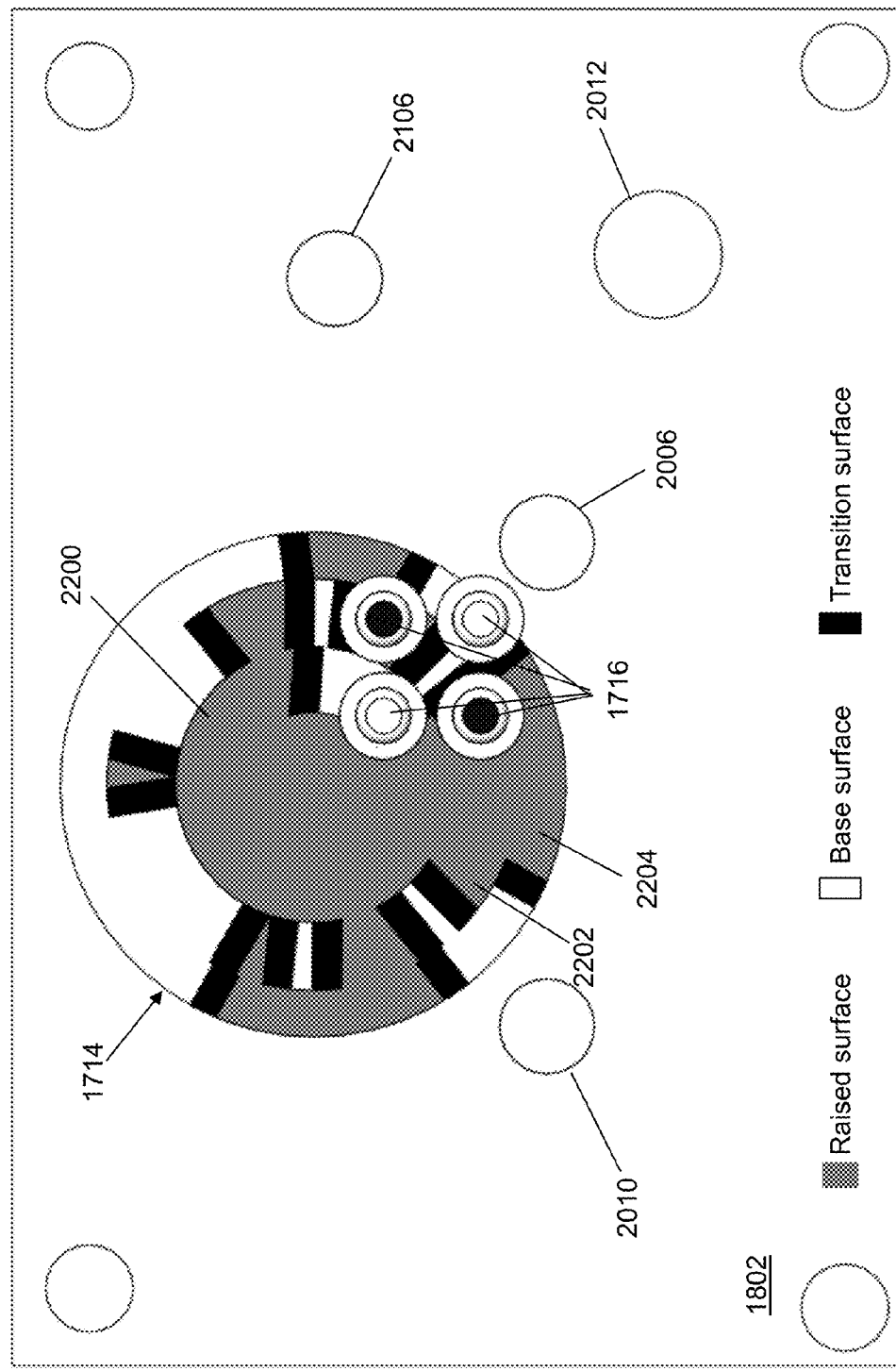

With reference to FIGS. 22e and 22f, a front perspective view and a top view of third disk 1714 of FIGS. 22a, 22b, 22c, and 22d mounted on the Braille watch assembly of FIGS. 19a and 19b and rotated to indicate the Braille number "9" in accordance with the third illustrative embodiment.

With reference to FIGS. 23a, 23b, 23c, and 23d a perspective view, a side view, a top view, and a bottom view, respectively, of fourth disk 1718 are shown in accordance with the second illustrative embodiment. Fourth disk 1718 includes a first ring 2300, a second ring 2302, a third ring 2304, and a fourth ring 2306. First ring 2300 includes one or more first raised surfaces, one or more first base surfaces, and one or more first transitions surface between the one or more first raised surfaces and the one or more first base surfaces as discussed previously with reference to the first illustrative embodiment. Second ring 2302 includes one or more second raised surfaces, one or more second base surfaces, and one or more second transitions surface between the one or more second raised surfaces and the one or more second base surfaces as discussed previously with reference to the first illustrative embodiment. Third ring 2304 includes one or more third raised surfaces, one or more third base surfaces, and one or more third transitions surface between the one or more third raised surfaces and the one or more third base surfaces as discussed previously with reference to the first illustrative embodiment. Fourth ring 2306 includes one or more third raised surfaces, one or more third base surfaces, and one or more third transitions surface between the one or more third raised surfaces and the one or more third base surfaces as discussed previously with reference to the first illustrative embodiment.

Figure 23A:
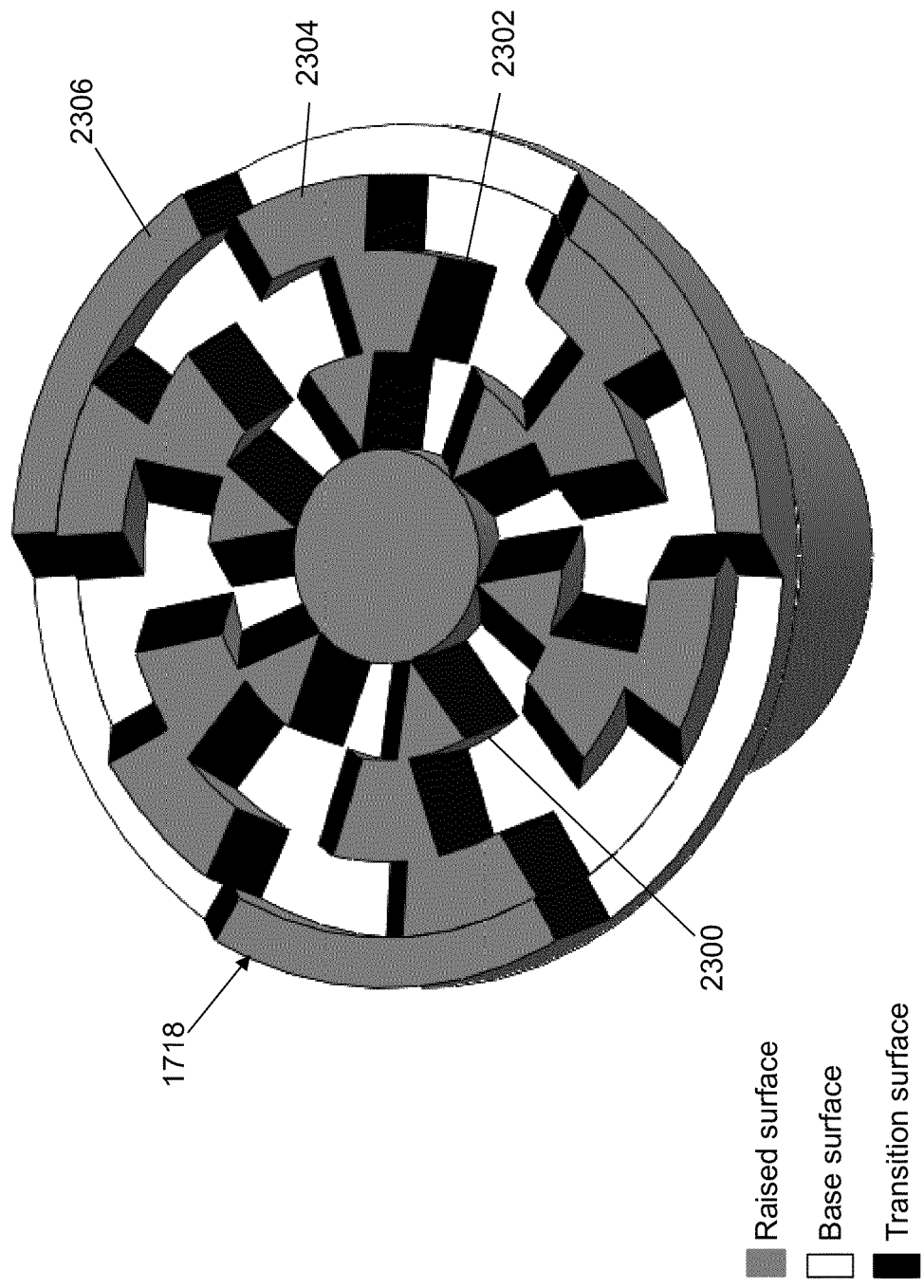
Figure 23C:
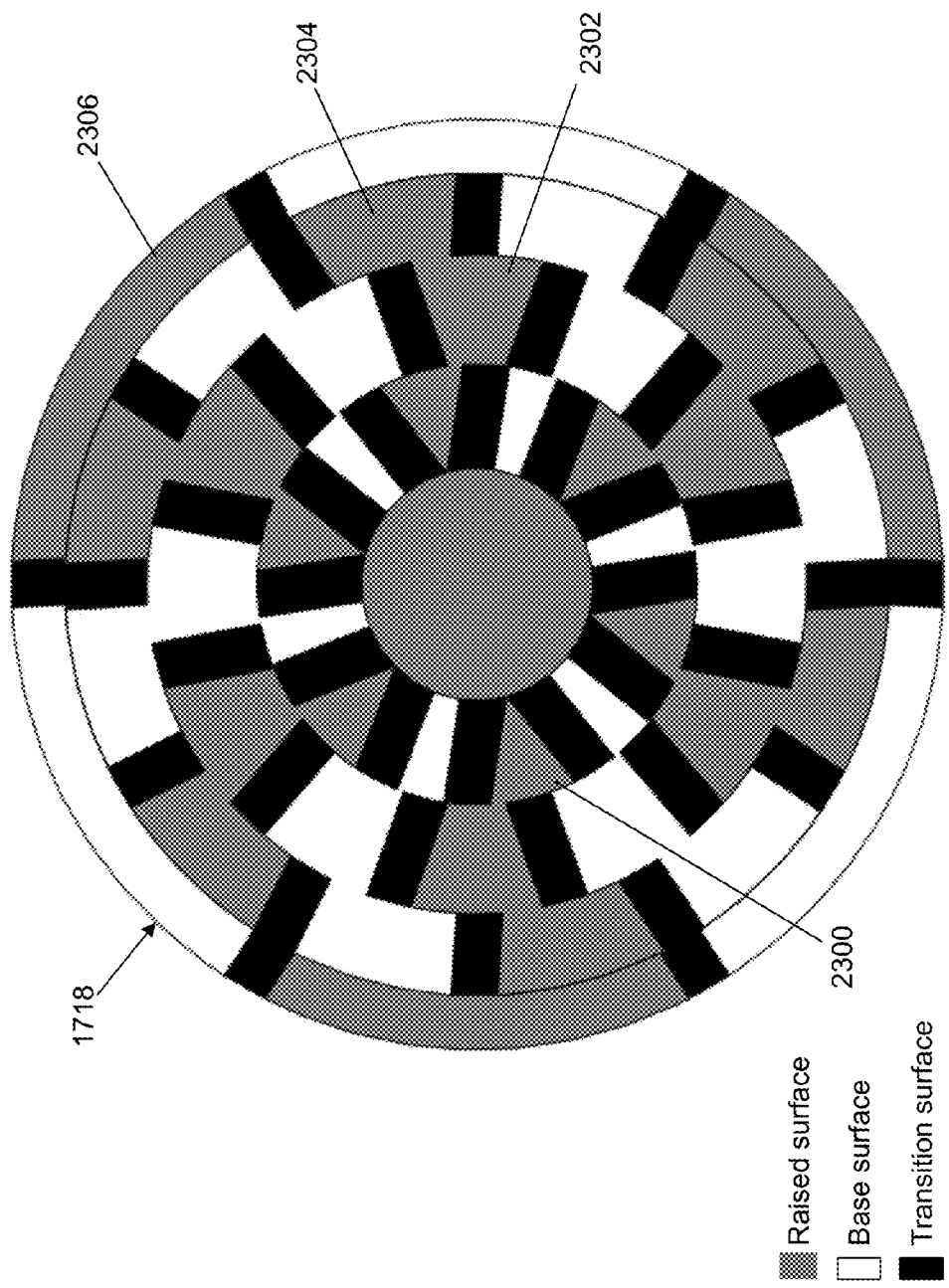
Figure 23D:
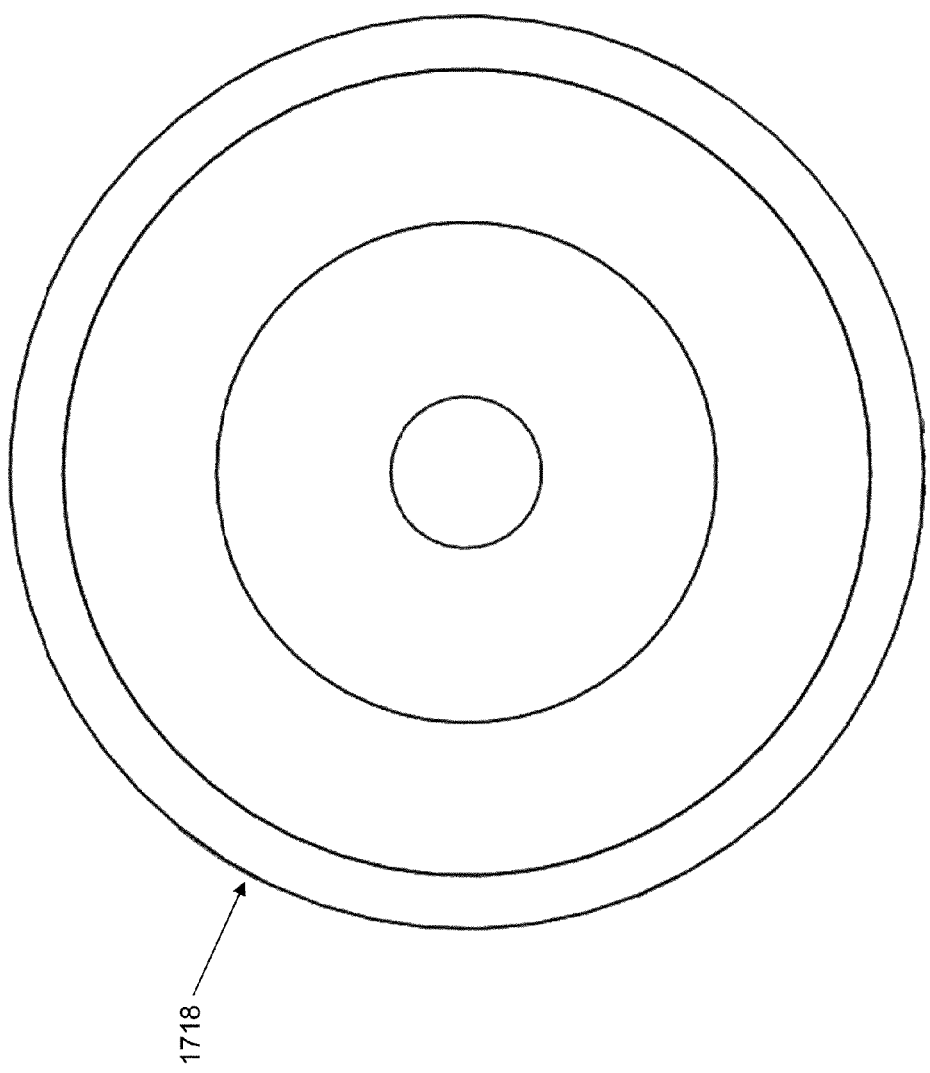
Figure 23E:
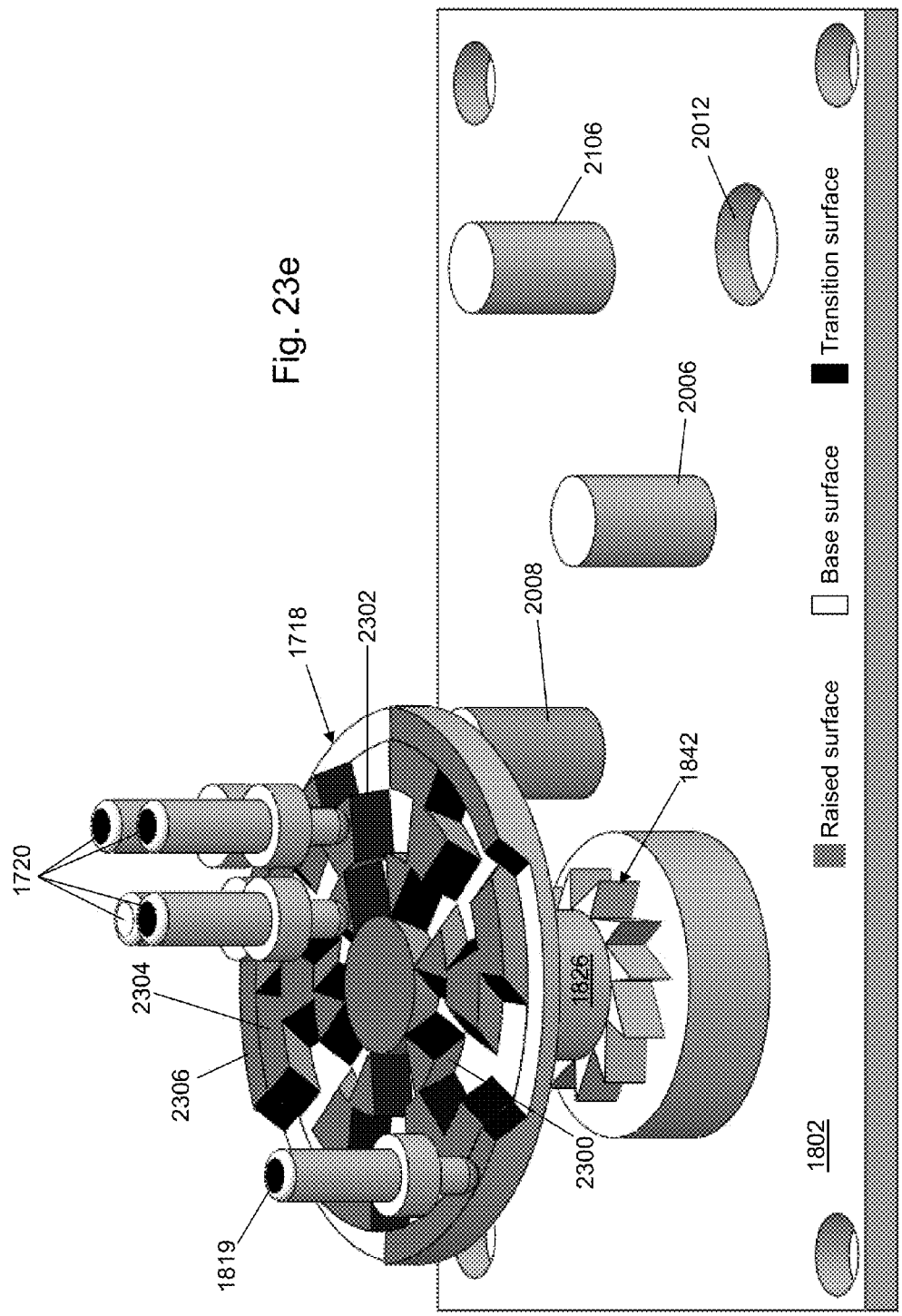
FIGS. 23e and 23f show a front perspective view and a top view of the fourth disk of FIGS. 23a, 23b, 23c, and 23d mounted on the Braille watch assembly of FIGS. 19a and 19b and rotated to indicate the Braille number "0" and "PM" in accordance with the third illustrative embodiment.
Figure 23F:
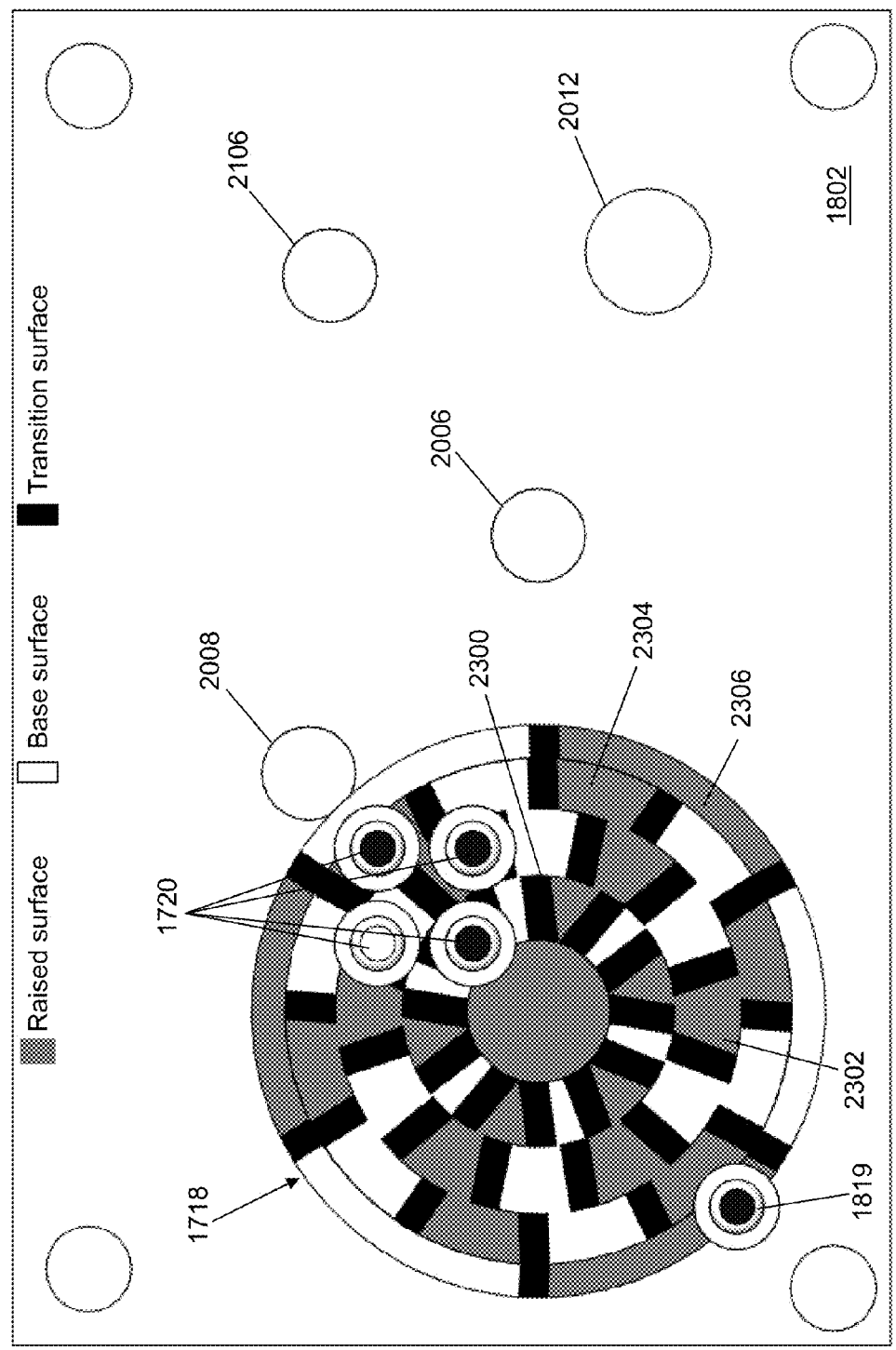

With reference to FIGS. 23e and 23f, a front perspective view and a top view of fourth disk 1718 of FIGS. 23a, 23b, 23c, and 23d mounted on the Braille watch assembly of FIGS. 19a and 19b and rotated to indicate the Braille number "0" in accordance with the third illustrative embodiment.

With reference to FIGS. 24a, 24b, and 24c show a side view, a top view, and a bottom view, respectively, of drive gear 1704 of the four disk and pin assemblies of FIG. 17 is shown in accordance with the third illustrative embodiment.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, the use of "and" or "or" is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A Braille watch comprising:
a first disk, wherein the first disk comprises a first raised surface;
a first plurality of pins comprising a first pin, a second pin, a third pin, and a fourth pin;
a top plate comprising a first hole, a second hole, a third hole, and a fourth hole;
wherein the first pin is mounted to slide within the first hole, the second pin is mounted to slide within the second hole, the third pin is mounted to slide within the third hole, and the fourth pin is mounted to slide within the fourth hole;
and further wherein the first pin is mounted above the first disk to extend above a top surface of the top plate when a first portion of the first raised surface is positioned below the first pin, the second pin is mounted above the first disk to extend above the top surface of the top plate when a second portion of the first raised surface is positioned below the second pin, the third pin is mounted above the first disk to extend above the top surface of the top plate when a third portion of the first raised surface is positioned below the third pin, and the fourth pin is mounted above the first disk to extend above the top surface of the top plate when a fourth portion of the first raised surface is positioned below the fourth pin; and
an actuator mounted to the first disk and configured to rotate the first disk to form a Braille number with one or more of the first plurality of pins.

2. The Braille watch of claim 1, further comprising:
a platform mounted to encircle a shaft of the first pin; and
a spring mounted around a portion of the shaft of the first pin between the platform and a bottom surface of the top plate.

3. The Braille watch of claim 1, further comprising:
a second disk, wherein the second disk comprises a second raised surface; and
a second plurality of pins comprising a fifth pin, a sixth pin, a seventh pin, and an eighth pin;
wherein the top plate further comprises a fifth hole, a sixth hole, a seventh hole, and an eighth hole;
wherein the fifth pin is mounted to slide within the fifth hole, the sixth pin is mounted to slide within the sixth hole, the seventh pin is mounted to slide within the seventh hole, and the eighth pin is mounted to slide within the eighth hole;
and further wherein the fifth pin is mounted above the second disk to extend above the top surface of the top plate when a first portion of the second raised surface is positioned below the fifth pin, the sixth pin is mounted above the second disk to extend above the top surface of the top plate when a second portion of the second raised surface is positioned below the sixth pin, the seventh pin is mounted above the second disk to extend above the top surface of the top plate when a third portion of the second raised surface is positioned below the seventh pin, and the eighth pin is mounted above the second disk to extend above the top surface of the top plate when a fourth portion of the second raised surface is positioned below the eighth pin.

4. The Braille watch of claim 3, wherein the first raised surface and the second raised surface have the same shape.

5. The Braille watch of claim 3, further comprising a second actuator mounted to the second disk and configured to rotate the second disk to form a second Braille number with one or more of the second plurality of pins.

6. The Braille watch of claim 3, further comprising:
a first shaft mounted for rotation by the actuator, wherein the first disk is mounted to the first shaft;
a second shaft, wherein the second disk is mounted to the second shaft;
a gear arm mounted to the first shaft, wherein the gear arm and the first disk rotate with the first shaft; and
a plurality of gear teeth mounted to the second shaft, wherein the gear arm is mounted to contact a tooth of the plurality of gear teeth to rotate the second disk through a first angle.

7. The Braille watch of claim 6, further comprising a second gear arm mounted to the first shaft, wherein the second gear arm rotates with the first shaft, and further wherein the second gear arm is mounted to contact a second tooth of the plurality of gear teeth to rotate the second disk through a second angle.

8. The Braille watch of claim 7, wherein the first angle is approximately equal to the second angle.

9. The Braille watch of claim 6, further comprising:
a drive shaft mounted to the actuator for rotation by the actuator;
a drive arm mounted to the drive shaft, wherein the drive arm rotates with the drive shaft; and
a second plurality of gear teeth mounted to the first shaft, wherein the drive arm is mounted to contact a tooth of the second plurality of gear teeth to rotate the first disk through a second angle.

10. The Braille watch of claim 9, wherein the actuator rotates the drive shaft at a constant angular velocity.

11. The Braille watch of claim 6, wherein the second disk is mounted to spatially overlap with the first disk when viewed from above the second raised surface.

12. The Braille watch of claim 11, wherein the first raised surface has a first quadrant area, a second quadrant area, a third quadrant area, and a fourth quadrant area, wherein the first quadrant area, the second quadrant area, the third quadrant area, and the fourth quadrant area are non-overlapping, and further wherein the first pin, the second pin, the third pin, and the fourth pin are mounted above the first quadrant area; and
further wherein the second raised surface has a corresponding first quadrant area, a corresponding second quadrant area, a corresponding third quadrant area, and a corresponding fourth quadrant area, and further wherein the fifth pin, the sixth pin, the seventh pin, and the eighth pin are mounted above the corresponding second quadrant area.

13. The Braille watch of claim 1, wherein the first plurality of pins further comprises a fifth pin, wherein the fifth pin indicates a time is am or pm.

14. The Braille watch of claim 1, wherein the first raised surface comprises a first ring, a second ring, and a third ring, wherein the first ring is closest to a center of the first disk, the second ring encircles the first ring, and the third ring encircles the second ring;
and further wherein the first ring comprises the first portion of the first raised surface, the second ring comprises the second portion of the first raised surface and the third portion of the first raised surface, and the third ring comprises the fourth portion of the first raised surface.

15. The Braille watch of claim 1, wherein the first raised surface has a first quadrant area, a second quadrant area, a third quadrant area, and a fourth quadrant area, wherein the first quadrant area, the second quadrant area, the third quadrant area, and the fourth quadrant area are non-overlapping, and further wherein the first pin is mounted above the first quadrant area, the second pin is mounted above the second quadrant area, the third pin is mounted above the third quadrant area, and the fourth pin is mounted above the fourth quadrant area.

16. The Braille watch of claim 1, further comprising:
a microprocessor;
a clock operably coupled to the microprocessor; and
a computer-readable medium operably coupled to the microprocessor, the computer-readable medium having computer-readable instructions stored thereon that, when executed by the microprocessor, cause the microprocessor to
in response to receipt of an indicator indicating a request to display a time parameter, request the time parameter from the clock;
in response to receipt of the time parameter, calculate an angle to rotate the first disk to form the Braille number representing the time parameter; and
send a signal to the actuator to rotate the first disk to the calculated angle.

17. The Braille watch of claim 16, further comprising:
a button;
wherein the computer-readable instructions further cause the microprocessor to receive a mode indicator in response to selection of the button; and in response to receipt of the mode indicator, to determine the time parameter to be displayed.

18. The Braille watch of claim 17, wherein the time parameter is one or more of a second, a minute, an hour, a day, a month, and a year.

19. The Braille watch of claim 1, wherein the first disk further comprises a base surface, wherein the first raised surface is elevated above the base surface, and further wherein the first pin is mounted to be approximately flush with the top surface of the top plate when the base surface is positioned below the first pin, the second pin is mounted to be approximately flush with the top surface of the top plate when the base surface is positioned below the second pin, the third pin is mounted to be approximately flush with the top surface of the top plate when the base surface is positioned below the third pin, and the fourth pin is mounted to be approximately flush with the top surface of the top plate when the base surface is positioned below the fourth pin.

20. The Braille watch of claim 19, wherein the first disk further comprises a transition surface, wherein the transition surface provides a sloped surface between the first raised surface and the base surface.

* * * * *